(12) United States Patent
Bortsov et al.

(10) Patent No.: US 12,533,341 B2
(45) Date of Patent: Jan. 27, 2026

(54) SMALL MOLECULE INHIBITORS OF VOLTAGE-GATED SODIUM CHANNEL 1.7 AND METHODS OF USING SAME

(71) Applicant: Duke University, Durham, NC (US)

(72) Inventors: Andrey Bortsov, Durham, NC (US); Sharat Chandra, Durham, NC (US); Ru-Rong Ji, Durham, NC (US)

(73) Assignee: Duke University, Durham, NC (US)

( * ) Notice: Subject to any disclaimer, the term of this patent is extended or adjusted under 35 U.S.C. 154(b) by 695 days.

(21) Appl. No.: 17/783,531

(22) PCT Filed: Dec. 9, 2020

(86) PCT No.: PCT/US2020/064059
§ 371 (c)(1),
(2) Date: Jun. 8, 2022

(87) PCT Pub. No.: WO2021/119157
PCT Pub. Date: Jun. 17, 2021

(65) Prior Publication Data
US 2023/0090372 A1    Mar. 23, 2023

Related U.S. Application Data

(60) Provisional application No. 62/946,527, filed on Dec. 11, 2019.

(51) Int. Cl.
*A61K 31/4045* (2006.01)
*A61K 9/00* (2006.01)
*A61P 17/04* (2006.01)

(52) U.S. Cl.
CPC ........ *A61K 31/4045* (2013.01); *A61K 9/0019* (2013.01); *A61P 17/04* (2018.01)

(58) Field of Classification Search
CPC .... A61K 31/4045; A61K 9/0019; A61P 17/04
See application file for complete search history.

(56) References Cited

U.S. PATENT DOCUMENTS

| | | | |
|---|---|---|---|
| 8,309,543 B2 | 11/2012 | Gonzalez, III et al. | |
| 8,992,927 B1 | 3/2015 | Clube | |
| 9,212,139 B2 * | 12/2015 | Kyle | A61P 27/16 |
| 9,340,590 B2 | 5/2016 | Murray et al. | |
| 10,179,781 B2 | 1/2019 | Babich et al. | |
| 2009/0203707 A1 | 8/2009 | Rajamani et al. | |
| 2016/0237153 A1 | 8/2016 | Lee et al. | |
| 2018/0297948 A1 | 10/2018 | Kim et al. | |
| 2018/0369226 A1 | 12/2018 | Weiss et al. | |

FOREIGN PATENT DOCUMENTS

| | | |
|---|---|---|
| WO | 2012007883 A1 | 1/2012 |
| WO | 2013177224 A1 | 11/2013 |
| WO | 2018235851 A1 | 12/2018 |
| WO | 2019088910 A1 | 5/2019 |

OTHER PUBLICATIONS

PCT Application No. PCT/US2020/064059, International Search Report and Written Opinion, mailed on Apr. 6, 2021, 12 pages.
"3-(1-Benzylindol-3-yl)-n-[5-(Diethylamino)Pentan-2-yl]-3-(3-Phenoxyphenyl)Propanamide", Pubmed Compound Record for CID 3649240, Available Online at: https://pubchem.ncbi.nlm.nih.gov/compound/3649240, Sep. 9, 2005, 7 pages.
"3-(3-Chlorophenyl)-n~1~- [2-(Dimethylamino)Ethyl]-3-[1-(4-Fluorobenzyl)-1h-Indol-3-yl] Propanamide", Pubmed Compound Record for CID 3384768, Available Online at: https://pubchem.ncbi.nlm.nih.gov/compound/3384768, Sep. 8, 2005, 8 pages.
"Explore Substances by SIMILARITY_2D_EXACT", SciFinder®, American Chemical Society (ACS), Search Report Part 1, Nov. 22, 2020, 58 pages.
"Explore Substances by SIMILARITY_2D_EXACT", SciFinder®, American Chemical Society (ACS), Search Report Part 2, Nov. 22, 2020, 57 pages.
"Explore Substances by SIMILARITY_2D_EXACT", SciFinder®, American Chemical Society (ACS), Search Report Part 3, Nov. 22, 2020, 57 pages.
"Explore Substances by SIMILARITY_2D_EXACT", SciFinder®, American Chemical Society (ACS), Search Report Part 4, Nov. 22, 2020, 59 pages.
"Explore Substances by SIMILARITY_2D_EXACT", SciFinder®, American Chemical Society (ACS), Search Report Part 5, Nov. 22, 2020, 57 pages.
"Explore Substances by SIMILARITY_2D_EXACT", SciFinder®, American Chemical Society (ACS), Search Report Part 6, Nov. 22, 2020, 57 pages.
"Explore Substances by SIMILARITY_2D_EXACT", SciFinder®, American Chemical Society (ACS), Search Report Part 7, Nov. 22, 2020, 58 pages.
"Explore Substances by SIMILARITY_2D_EXACT", SciFinder®, American Chemical Society (ACS), Search Report Part 8, Nov. 22, 2020, 28 pages.
"Indole-Containing Compound Search Transcript", American Chemical Society (ACS), Nov. 24, 2020, 26 pages.
Ahuja et al., "Structural Basis of Nav1.7 Inhibition by an Isoform-Selective Small-Molecule Antagonist", Science, vol. 350, No. 6267, Dec. 18, 2015, pp. 1-10.
Alexandrou et al., "Subtype-Selective Small Molecule Inhibitors Reveal a Fundamental Role for Nav1.7 in Nociceptor Electrogenesis, Axonal Conduction and Presynaptic Release", PLOS One, vol. 11, No. 4, Apr. 6, 2016, pp. 1-22.

(Continued)

Primary Examiner — Marcos L Sznaidman
(74) Attorney, Agent, or Firm — Kilpatrick Townsend & Stockton LLP

(57) ABSTRACT

Methods for treating conditions including itch and pain are described. The methods include administering a therapeutically effective amount of an N-substituted indole Nav1.7 inhibitor to a subject in need thereof. New N-substituted indole compounds, useful as Nav1.7 inhibitors for the treatment of itch and/or pain are also provided, as well as pharmaceutical compositions containing the Nav1.7 inhibitors.

15 Claims, 15 Drawing Sheets

(56) References Cited

OTHER PUBLICATIONS

Bang et al., "Differential Inhibition of Nav1.7 and Neuropathic Pain by Hybridoma-Produced and Recombinant Monoclonal Antibodies that Target Nav1.7 : Differential Activities of Nav1.7-Targeting Monoclonal Antibodies", Neuroscience Bulletin, vol. 34, No. 1, Feb. 2018, pp. 22-41.

Berne et al., "Virtual Screening Yields Inhibitors of Novel Antifungal Drug Target, Benzoate 4-Monooxygenase", Journal of Chemical Information and Modeling, vol. 52, No. 11, Nov. 26, 2012, pp. 3053-3063.

Berta et al., "Extracellular Caspase-6 Drives Murine Inflammatory Pain via Microglial TNF-α Secretion", Journal of Clinical Investigation, vol. 124, No. 3, Mar. 2014, pp. 1173-1186.

Black et al., "Expression of Nav1.7 in DRG Neurons Extends from Peripheral Terminals in the Skin to Central Preterminal Branches and Terminals in the Dorsal Horn", Molecular Pain, vol. 8, No. 82, Nov. 7, 2012, pp. 1-11.

Cao et al., "Pharmacological Reversal of a Pain Phenotype in iPSC-Derived Sensory Neurons and Patients with Inherited Erythromelalgia", Science Translational Medicine, vol. 8, No. 335, Apr. 20, 2016, p. 335ra56.

Catterall et al., "Inherited Neuronal Ion Channelopathies: New Windows on Complex Neurological Diseases", The Journal of Neuroscience, vol. 28, No. 46, Nov. 12, 2008, pp. 11768-11777.

Catterall et al., "International Union of Pharmacology. XLVII. Nomenclature and Structure-Function Relationships of Voltage-Gated Sodium Channels", Pharmacological Reviews, vol. 57, No. 4, Dec. 2005, pp. 397-409.

Catterall, "Structure and Function of Voltage-Gated Ion Channels", Annual Review of Biochemistry, vol. 64, 1995, pp. 493-531.

Chandra et al., "Computer-Aided Discovery of a New Nav1.7 Inhibitor for Treatment of Pain and Itch", Anesthesiology, vol. 133, No. 3, Sep. 2020, pp. 611-627.

Chang et al., "Expression and Role of Voltage-Gated Sodium Channels in Human Dorsal Root Ganglion Neurons with Special Focus on Nav1.7, Species Differences, and Regulation by Paclitaxel", Neuroscience Bulletin, vol. 34, No. 1, Feb. 2018, pp. 4-12.

Chen et al., "PD-L1 Inhibits Acute and Chronic Pain by Suppressing Nociceptive Neuron Activity via PD-1", Nature Neuroscience, vol. 20, No. 7, Jul. 2017, pp. 917-926.

Chen et al., "Sex-Dependent Glial Signaling in Pathological Pain: Distinct Roles of Spinal Microglia and Astrocytes", Neuroscience Bulletin, vol. 34, No. 1, Feb. 2018, pp. 98-108.

Cox et al., "An SCN9A Channelopathy Causes Congenital Inability to Experience Pain", Nature, vol. 444, No. 7121, Dec. 14, 2006, pp. 894-898.

Cummins et al., "The Roles of Sodium Channels in Nociception: Implications for Mechanisms of Pain", Pain, vol. 131, No. 3, Oct. 2007, pp. 243-257.

Devigili et al., "Paroxysmal Itch Caused by Gain-of-Function Nav1.7 Mutation", Pain, vol. 155, No. 9, Sep. 2014, pp. 1702-1707.

Elder, "Non-Opioid Pain Treatment: Global Markets to 2022", BCC Research Report Overview, Mar. 2018, 15 pages.

Fertleman et al., "SCN9a Mutations in Paroxysmal Extreme Pain Disorder: Allelic Variants Underlie Distinct Channel Defects and Phenotypes", Neuron, vol. 52, No. 5, Dec. 7, 2006, pp. 767-774.

Flinspach et al., "Insensitivity to Pain Induced by a Potent Selective Closed-State Nav1.7 Inhibitor", Scientific Reports, vol. 7, No. 39662, Jan. 3, 2017, pp. 1-16.

Focken et al., "Discovery of Aryl Sulfonamides as Isoform-Selective Inhibitors of NaV1.7 with Efficacy in Rodent Pain Models", ACS Medicinal Chemistry Letters, vol. 7, No. 3, Jan. 19, 2016, pp. 277-282.

Frost et al., "Substituted Indazoles as Nav1.7 Blockers for the Treatment of Pain", Journal of Medicinal Chemistry, vol. 59, No. 7, Apr. 14, 2016, pp. 3373-3391.

Gingras et al., "Global Nav1.7 Knockout Mice Recapitulate the Phenotype of Human Congenital Indifference to Pain", PLOS One, vol. 9, No. 9, Sep. 4, 2014, pp. 1-14.

Goldberg et al., "Treatment of Na(v)1.7-Mediated Pain in Inherited Erythromelalgia Using a Novel Sodium Channel Blocker", Pain, vol. 153, No. 1, Jan. 2012, pp. 80-85.

Han et al., "miRNA-711 Binds and Activates TRPA1 Extracellularly to Evoke Acute and Chronic Pruritus", Neuron, vol. 99, No. 3, Aug. 8, 2018, pp. 449-463.

Huang et al., "Characterization of Voltage-Gated Sodium-Channel Blockers by Electrical Stimulation and Fluorescence Detection of Membrane Potential", Nature Biotechnology, vol. 24, No. 4, Apr. 2006, pp. 439-446.

Isensee et al., "Synergistic Regulation of Serotonin and Opioid Signaling Contributes to Pain Insensitivity in Nav1.7 Knockout Mice", Science Signaling, vol. 10, No. 461, Jan. 10, 2017, 27 pages.

Jones et al., "Clinical Micro-Dose Studies to Explore the Human Pharmacokinetics of Four Selective Inhibitors of Human Nav1.7 Voltage-Dependent Sodium Channels", Clinical Pharmacokinetics, vol. 55, No. 7, Jul. 2016, pp. 875-887.

Lee et al., "A Monoclonal Antibody That Targets a NaV1.7 Channel Voltage Sensor for Pain and Itch Relief", Cell, vol. 157, No. 6, Jun. 5, 2014, pp. 1393-1404.

Li et al., "DRG Voltage-Gated Sodium Channel 1.7 is Upregulated in Paclitaxel-Induced Neuropathy in Rats and in Humans with Neuropathic Pain", The Journal of Neuroscience, vol. 38, No. 5, Jan. 31, 2018, pp. 1124-1136.

Liu et al., "Toll-Like Receptor 7 Mediates Pruritus", Nature Neuroscience, vol. 13, No. 12, Dec. 2010, pp. 1460-1462.

Lomize et al., "OPM Database and PPM Web Server: Resources for Positioning of Proteins in Membranes", Nucleic Acids Research, vol. 40, Jan. 2012, pp. D370-D376.

Mccormack et al., "Voltage Sensor Interaction Site for Selective Small Molecule Inhibitors of Voltage-Gated Sodium Channels", Proceedings of the National Academy of Sciences of the United States of America, vol. 110, No. 29, Jul. 16, 2013, pp. E2724-E2732.

Mcdonnell et al., "Efficacy of the Nav1.7 Blocker PF-05089771 in a Randomised, Placebo-Controlled, Double-Blind Clinical Study in Subjects with Painful Diabetic Peripheral Neuropathy", Pain, vol. 159, No. 8, Aug. 2018, pp. 1465-1476.

Mckerrall et al., "Nav1.7 Inhibitors for the Treatment of Chronic Pain", Bioorganic & Medicinal Chemistry Letters, vol. 28, No. 19, Oct. 15, 2018, pp. 3141-3149.

Mckerrall et al., "Structure- and Ligand-Based Discovery of Chromane Arylsulfonamide Nav1.7 Inhibitors for the Treatment of Chronic Pain", Journal of Medicinal Chemistry, vol. 62, No. 8, Apr. 25, 2019, pp. 4091-4109.

Minett et al., "Distinct Nav1.7-Dependent Pain Sensations Require Different Sets of Sensory and Sympathetic Neurons", Nature Communications, vol. 3, No. 791, Apr. 24, 2012, pp. 1-9.

Minett et al., "Endogenous Opioids Contribute to Insensitivity to Pain in Humans and Mice Lacking Sodium Channel Nav1.7", Nature Communications, vol. 6, No. 8967, Dec. 4, 2015, pp. 1-8.

Motulsky et al., "Detecting Outliers When Fitting Data with Nonlinear Regression—A New Method Based on Robust Nonlinear Regression and the False Discovery Rate", BMC Bioinformatics, vol. 7, No. 123, Mar. 9, 2006, pp. 1-20.

Mulroy, "Systemic Toxicity and Cardiotoxicity from Local Anesthetics: Incidence and Preventive Measures", Regional Anesthesia & Pain Medicine, vol. 27, No. 6, Nov.-Dec. 2002, pp. 556-561.

Nassar et al., "Nociceptor-Specific Gene Deletion Reveals a Major Role for Nav1.7 (PN1) in Acute and Inflammatory Pain", Proceedings of the National Academy of Sciences of the United States of America, vol. 101, No. 34, Aug. 24, 2004, pp. 12706-12711.

Offord, "Targeting Sodium Channels for Pain Relief", Available Online at: https://erythromelalgia.org/wp-content/uploads/2018/10/Targeting-Sodium-Channels-for-Pain-Relief.pdf, Jan. 1, 2018, 9 pages.

Park et al., "Resolving TRPV1- and TNF-α-Mediated Spinal Cord Synaptic Plasticity and Inflammatory Pain with Neuroprotectin D1", The Journal of Neuroscience, vol. 31, No. 42, Oct. 19, 2011, pp. 15072-15085.

(56) References Cited

OTHER PUBLICATIONS

Schenkel et al., "Discovery of a Biarylamide Series of Potent, State-Dependent Nav1.7 Inhibitors", Bioorganic & Medicinal Chemistry Letters, vol. 27, No. 16, Aug. 15, 2017, pp. 3817-3824.

Schneider et al., "A Consistent Description of Hydrogen Bond and Dehydration Energies in Protein-Ligand Complexes: Methods Behind the Hyde Scoring Function", Journal of Computer-Aided Molecular Design, vol. 27, No. 1, Jan. 2013, pp. 15-29.

Shcherbatko et al., "Engineering Highly Potent and Selective Microproteins Against Nav1.7 Sodium Channel for Treatment of Pain", The Journal of Biological Chemistry, vol. 291, No. 27, Jul. 1, 2016, pp. 13974-13986.

Swain et al., "Discovery of Clinical Candidate 4-[2-(5-Amino-1H-pyrazol-4-I)-4-chlorophenoxy]-5-chloro-2-fluoro-N-1,3-thiazol-4-ylbenzenesulfonamide (PF-05089771): Design and Optimization of Diaryl Ether Aryl Sulfonamides as Selective Inhibitors of NaV1.7", Journal of Medicinal Chemistry, vol. 60, No. 16, Aug. 24, 2017, pp. 7029-7042.

Tfelt-Hansen et al., "Inherited Cardiac Diseases Caused by Mutations in the Nav1.5 Sodium Channel", Journal of Cardiovascular Electrophysiology, vol. 21, No. 1, Jan. 2010, pp. 107-115.

Webb et al., "Comparative Protein Structure Modeling Using Modeller", Current Protocols in Bioinformatics, vol. 54, Jun. 20, 2016, pp. 5.6.1-5.6.37.

Xie et al., "Blockade of Persistent Sodium Currents Contributes to the Riluzole-Induced Inhibition of Spontaneous Activity and Oscillations in Injured DRG Neurons", PLOS One, vol. 6, No. 4, Apr. 25, 2011, pp. 1-10.

Xu et al., "Inhibition of Mechanical Allodynia in Neuropathic Pain by TLR5-Mediated A-Fiber Blockade", Nature Medicine, vol. 21, No. 11, Nov. 2015, pp. 1326-1331.

Xu et al., "Neuroprotectin/Protectin D1 Protects Against Neuropathic Pain in Mice After Nerve Trauma", Annals of Neurology, vol. 74, No. 3, Sep. 2013, pp. 490-495.

Yang et al., "Mutations in SCN9A, Encoding a Sodium Channel Alpha Subunit, in Patients with Primary Erythermalgia", Journal of Medical Genetics, vol. 41, No. 3, Mar. 2004, pp. 171-174.

Yekkirala et al., "Breaking Barriers to Novel Analgesic Drug Development", Nature Reviews Drug Discovery, vol. 16, No. 8, Aug. 2017, pp. 545-564.

Zakrzewska et al., "Novel Design for a Phase IIa Placebo-Controlled, Double-Blind Randomized Withdrawal Study to Evaluate the Safety and Efficacy of CNV1014802 in Patients with Trigeminal Neuralgia", Trials, vol. 14, No. 402, Nov. 23, 2013, pp. 1-11.

Application No. EP20899273.5 , Extended European Search Report, Mailed on Nov. 28, 2023, 7 pages.

Wu et al., "Discovery of New Indole-Based Acylsulfonamide Nav1.7 Inhibitors", Bioorganic & Medicinal Chemistry Letters, vol. 29, No. 4, Feb. 15, 2019, pp. 659-663.

* cited by examiner

Compound 1

Compound 2

Compound 3

Compound 4

Compound 5

Compound 6

Compound 7

Compound 8

Compound 9 (DA-0218)

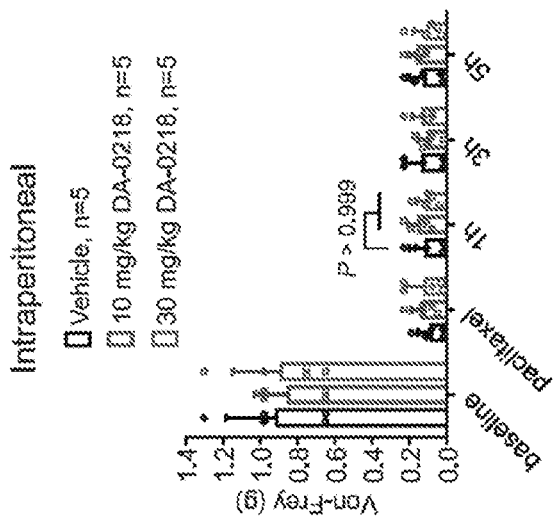
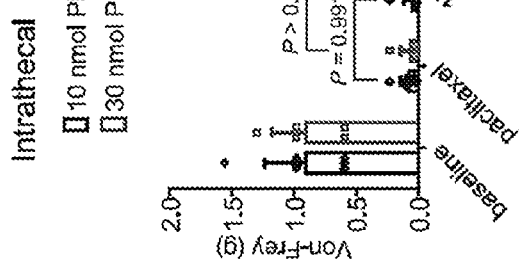
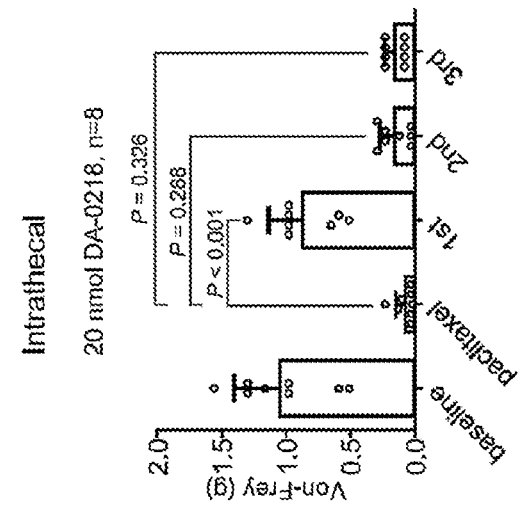

SMALL MOLECULE INHIBITORS OF VOLTAGE-GATED SODIUM CHANNEL 1.7 AND METHODS OF USING SAME

CROSS-REFERENCES TO RELATED APPLICATIONS

The present application is a 371 U.S. National Stage of PCT Application No. PCT/US2020/064059, filed on Dec. 9, 2020, which claims priority to U.S. Provisional Pat. Appl. No. 62/946,527, filed on Dec. 11, 2019, both of which are incorporated herein by reference in their entirety.

BACKGROUND OF THE INVENTION

In the U.S., around 100 million people live with chronic pain. Therapeutic approaches for chronic pain have limited effectiveness, which leads to an epidemic of opioid prescription, opioid abuse and addiction. Itch is an uncomfortable sensation on the skin that causes a desire to scratch. Pruritus, defined as a sensation driving the urge to scratch, may be acute or chronic and can significantly impair the quality of life and sleep of affected patients. Moreover, the cumulative effect of such disruptions may influence mortality. New analgesics targeting voltage-gated sodium channels could help to treat people with conditions involving itch and pain.

BRIEF SUMMARY OF THE INVENTION

Provided herein are methods for the treatment of itch and pain. The methods include administering a therapeutically effective amount of a Nav1.7 inhibitor to a subject in need thereof. The Nav1.7 inhibitor may be an N-substituted indole, or a pharmaceutically acceptable salt thereof.

New N-substituted indole compounds, useful as Nav1.7 inhibitors for the treatment of itch and/or pain are also provided, as well as pharmaceutical compositions containing the Nav1.7 inhibitors.

Exemplary embodiments provided in accordance with the presently disclosed subject matter include, but are not limited to, the claims set forth herein and the following embodiments:

1. A method of treating a condition selected from the group consisting of itch, pain, and combinations thereof, the method comprising administering a therapeutically effective amount of a Nav1.7 inhibitor to a subject in need thereof, wherein the Nav1.7 inhibitor is an N-substituted indole.
2. The method of embodiment 1, wherein the N-substituted indole is a compound according to Formula I:

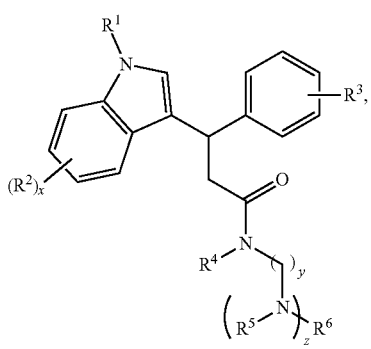

(I)

or a pharmaceutically acceptable salt thereof, wherein:
$R^1$ is -$L^1$-$R^{1a}$;
-$L^1$- is selected from the group consisting of —$(CH_2)_n$—, —$NHS(O)_2$—, —$NHC(O)$—, and —$S(O)_2$—, wherein subscript n is 1, 2, 3, 4, 5, or 6;
$R^{1a}$ is selected from the group consisting of $C_{6-14}$ aryl, $C_{3-8}$ cycloalkyl, 5- to 10-membered heteroaryl, 3- to 10-membered heterocyclyl, ($C_{6-14}$ aryl)sulfonyl, ($C_{1-8}$ alkyl)sulfonyl, ($C_{3-8}$ cycloalkyl)sulfonyl, $C_{2-8}$ alkyl, $C_{2-8}$ alkenyl, and $C_{2-8}$ alkynyl, each of which is optionally substituted with one or more $R^{1b}$;
each $R^{1b}$ is independently selected from the group consisting of halogen, —CN, —$NO_2$, —$NHR^{1c}$, —N═C(OH)$R^{1d}$, —$N_3$, —OH, —SH, —$SO_3H$, $C_{1-8}$ alkyl, $C_{1-8}$ alkoxy, $C_{2-8}$ alkenyl, $C_{2-8}$ alkynyl, $C_{3-10}$ cycloalkyl, —$COOR^{1c}$, —$C(O)NHR^{1c}$, and —$C(O)R^{1d}$, wherein each $R^{1c}$ is independently selected from the group consisting of H and $C_{1-4}$ alkyl and each $R^{1d}$ is independently $C_{1-4}$ alkyl;
subscript x is 0, 1, 2, 3, or 4;
each $R^2$ is independently selected from the group consisting of halogen, —CN, —$NO_2$, —$NHR^{1c}$, —$N_3$, —OH, —SH, —$SO_3H$, $C_{1-8}$ alkyl, $C_{1-8}$ alkoxy, —$COOR^{1c}$, —$C(O)NHR^{1c}$, and —$C(O)R^{1d}$;
$R^3$ is -$L^3$-$R^{3a}$;
-$L^3$- is selected from the group consisting of a bond, —O—, —$O(CH_2)_n$—, —$(CH_2)_n$—, —$NHC(O)$—, —$NHS(O)_2$—, and —$S(O)_2$—, wherein subscript n is 1, 2, 3, 4, 5, or 6;
$R^{3a}$ is selected from the group consisting of $C_{6-14}$ aryl, $C_{3-8}$ cycloalkyl, 5- to 10-membered heteroaryl, 3- to 10-membered heterocyclyl, ($C_{6-14}$ aryl)sulfonyl, ($C_{1-8}$ alkyl)sulfonyl, ($C_{3-8}$ cycloalkyl)sulfonyl, $C_{1-8}$ alkyl, $C_{2-8}$ alkenyl, and $C_{2-8}$ alkynyl, each of which is optionally substituted with one or more $R^{3b}$;
each $R^{3b}$ is independently selected from the group consisting of halogen, —CN, —$NO_2$, —$NHR^{3c}$, —$N_3$, —OH, —SH, —$SO_3H$, $C_{1-8}$ alkyl, $C_{1-8}$ alkoxy, —$COOR^{3c}$, —$C(O)NHR^{3c}$, and —$C(O)R^{3d}$, wherein each $R^{3c}$ is independently selected from the group consisting of H and $C_{1-4}$ alkyl and each $R^{3d}$ is independently $C_{1-4}$ alkyl;
$R^4$ is selected from the group consisting of H and $C_{1-6}$ alkyl;
subscript y is 1, 2, 3, 4, 5, or 6;
subscript z is 0 or 1;
$R^5$ is selected from the group consisting of H and $C_{1-6}$ alkyl;
alternatively, $R^4$ and $R^5$ are taken together to form 4- to 10-membered heterocyclylene;
$R^6$ is selected from the group consisting of 3- to 10-membered heterocyclyl, 5- to 10-membered heteroaryl, $C_{3-8}$ cycloalkyl, $C_{6-14}$ aryl, and $C_{7-22}$ arylalkyl, each of which is optionally substituted with one or more $R^{6a}$; and
each $R^{6a}$ is independently selected from the group consisting of halogen, —CN, —$NO_2$, —$NHR^{6b}$, —$N_3$, —OH, —SH, —$SO_3H$, $C_{1-8}$ alkyl, $C_{1-8}$ alkoxy, —$COOR^{6b}$, —$C(O)NHR^{6b}$, and —$C(O)R^{6c}$, wherein each $R^{6b}$ is independently selected from the group consisting of H and $C_{1-4}$ alkyl and each $R^{6c}$ is independently $C_{1-4}$ alkyl.

3. The method of embodiment 2, wherein -$L^1$- is —$CH_2$—, and $R^{1a}$ is phenyl which is optionally substituted with one or more $R^{1b}$.
4. The method of embodiment 2 or embodiment 3, wherein -$L^3$- is selected from the group consisting of —O— and —OCH$_2$—, and R$^{3a}$ is phenyl which is optionally substituted with one or more R$^{3b}$.

5. The method of any one of embodiments 2-4, wherein subscript y is 1 or 2.
6. The method of any one of embodiments 2-5, wherein R$^4$ is H.
7. The method of any one of embodiments 2-5, wherein subscript z is 1 and R$^4$ and R$^5$ are taken together to form piperazin-1,4-diyl.
8. The method of any one of embodiments 2-7, wherein R$^6$ is selected from the group consisting of furan-2-yl, phenyl, pyridin-4-yl, pyrrolidin-1-yl, and benzhydryl, each of which is optionally substituted with one or more R$^{6a}$.
9. The method of any one of embodiments 2-8, wherein subscript x is 0.
10. The method of embodiment 1, wherein the Nav1.7 inhibitor is selected from the group consisting of.

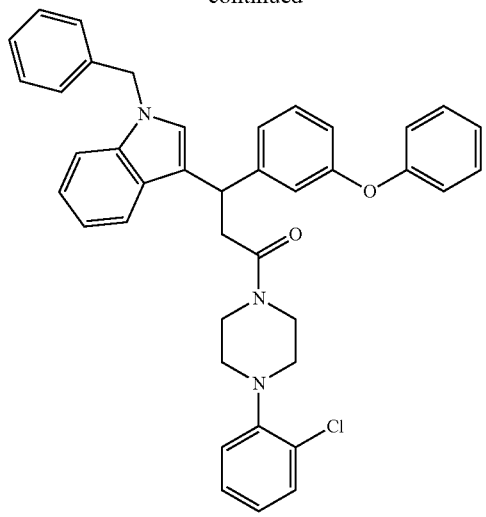

,

-continued

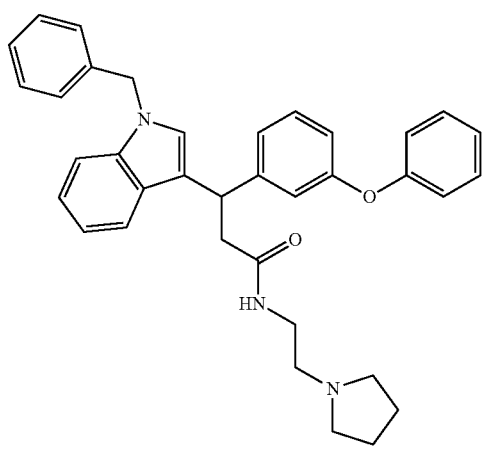

,

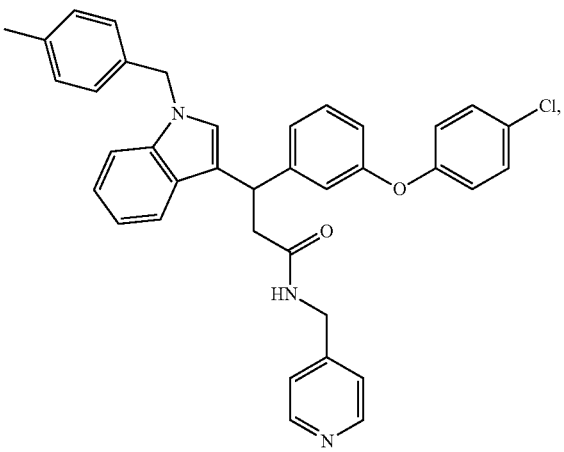

,

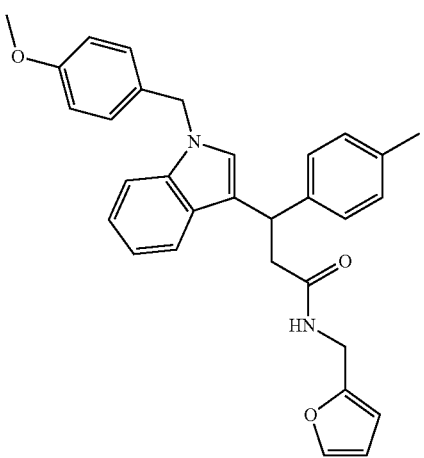

,

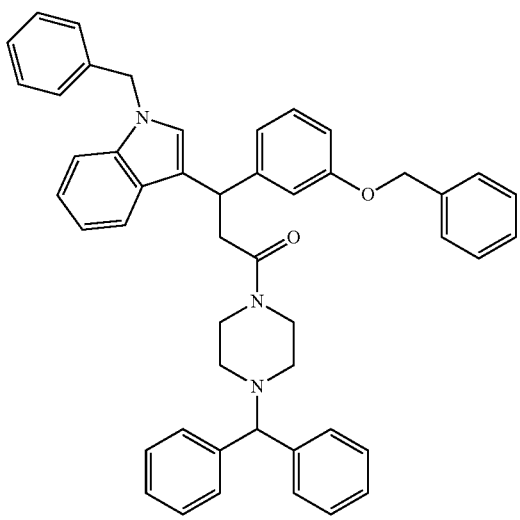

,

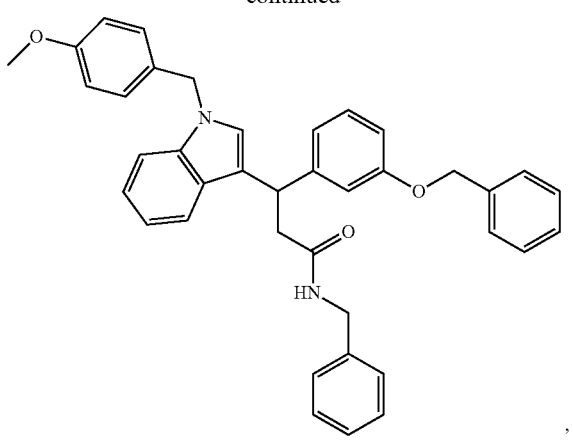

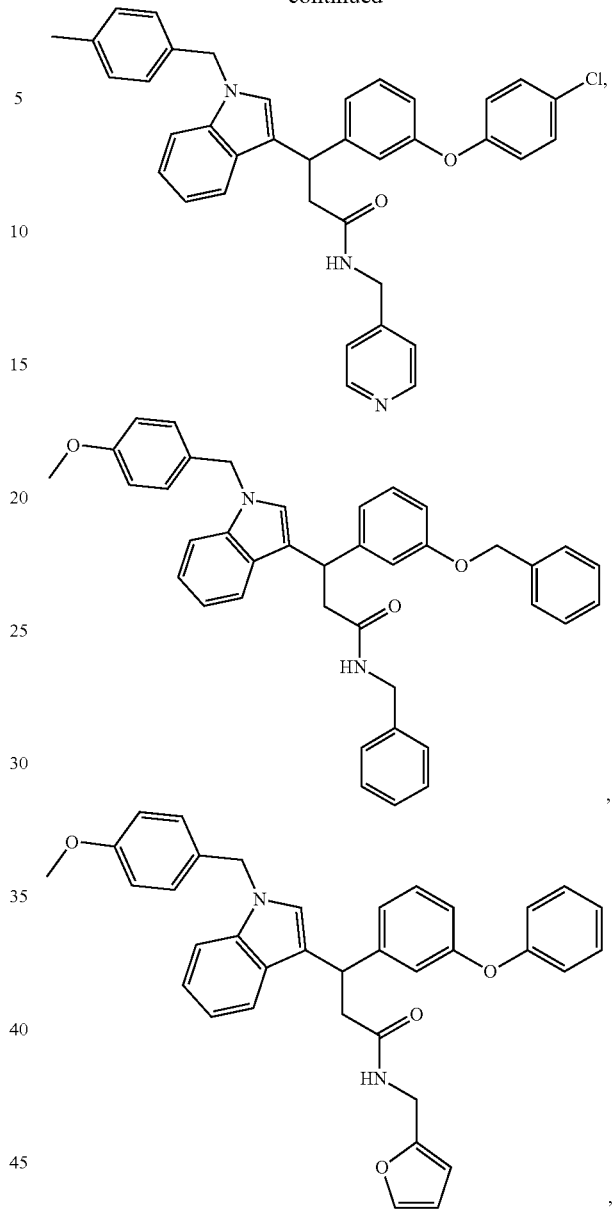

and pharmaceutically acceptable salts thereof.

11. The method of embodiment 1, wherein the Nav1.7 inhibitor is selected from the group consisting of

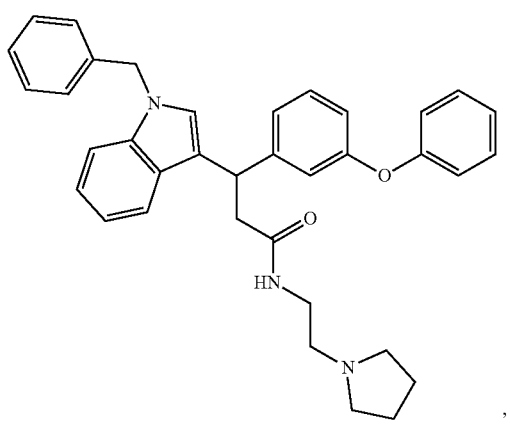

and pharmaceutically acceptable salts thereof.

12. The method of any one of embodiments 1-11, wherein the condition is itch.

13. The method of any one of embodiments 1-12, wherein the itch comprises histamine-induced acute itch, lymphoma-induced chronic itch, allergic itch, infection-induced itch, liver- or kidney-induced itch, diabetes-induced itch, skin disorder-induced itch, opioid-induced itch, itch associated with Nav1.7 gain-of function mutations, or a combination thereof.

14. The method of any one of embodiments 1-11, wherein the condition is pain.

15. The method of any one of embodiments 1-11 and 14, wherein the pain comprises neuropathic pain, inflammatory pain, cancer pain, or a combination thereof.

16. The method of any one of embodiments 1-15, wherein the Nav1.7 inhibitor is administered intrathecally or intraperitoneally.

17. A compound according to Formula II:

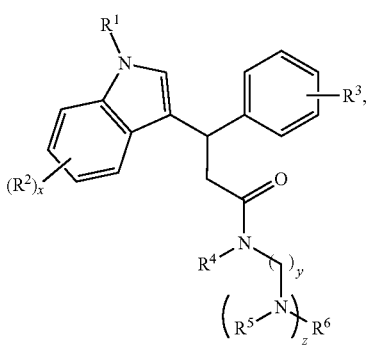

or a pharmaceutically acceptable salt thereof, wherein:
$R^1$ is $-L^1-R^{1a}$.
$-L^1-$ is selected from the group consisting of $-(CH_2)_n-$, $-NHS(O)_2-$, $-NHC(O)-$, and $-S(O)_2-$, wherein subscript n is 1, 2, 3, 4, 5, or 6;
$R^{1a}$ is selected from the group consisting of $C_{6-14}$ aryl, $C_{3-8}$ cycloalkyl, 5- to 10-membered heteroaryl, 3- to 10-membered heterocyclyl, ($C_{6-14}$ aryl)sulfonyl, ($C_{1-8}$ alkyl)sulfonyl, ($C_{3-8}$ cycloalkyl)sulfonyl, $C_{2-8}$ alkyl, $C_{2-8}$ alkenyl, and $C_{2-8}$ alkynyl, each of which is optionally substituted with one or more $R^{1b}$;
each $R^{1b}$ is independently selected from the group consisting of halogen, $-CN$, $-NO_2$, $-NHR^{1c}$, $-N=C(OH)R^{1d}$, $-N_3$, $-OH$, $-SH$, $-SO_3H$, $C_{1-8}$ alkyl, $C_{1-8}$ alkoxy, $C_{2-8}$ alkenyl, $C_{2-8}$ alkynyl, $C_{3-10}$ cycloalkyl, $-COOR^{1c}$, $-C(O)NHR^{1c}$, and $-C(O)R^{1d}$, wherein each $R^{1c}$ is independently selected from the group consisting of H and $C_{1-4}$ alkyl and each $R^{1d}$ is independently $C_{1-4}$ alkyl;
subscript x is 0, 1, 2, 3, or 4;
each $R^2$ is independently selected from the group consisting of halogen, $-CN$, $-NO_2$, $-NHR^{1c}$, $-N_3$, $-OH$, $-SH$, $-SO_3H$, $C_{1-8}$ alkyl, $C_{1-8}$ alkoxy, $-COOR^{1c}$, $-C(O)NHR^{1c}$, and $-C(O)R^{1d}$;
$R^3$ is $-L^3-R^{3a}$;
$-L^3-$ is selected from the group consisting of a bond, $-O-$, $-O(CH_2)_n-$, $-(CH_2)_n-$, $-NHC(O)-$, $-NHS(O)_2-$, and $-S(O)_2-$, wherein subscript n is 1, 2, 3, 4, 5, or 6;
$R^{3a}$ is selected from the group consisting of $C_{6-14}$ aryl, $C_{3-8}$ cycloalkyl, 5- to 10-membered heteroaryl, 3- to 10-membered heterocyclyl, ($C_{6-14}$ aryl)sulfonyl, ($C_{1-8}$ alkyl)sulfonyl, ($C_{3-8}$ cycloalkyl)sulfonyl, $C_{1-8}$ alkyl, $C_{2-8}$ alkenyl, and $C_{2-8}$ alkynyl, each of which is optionally substituted with one or more $R^{3b}$;
each $R^{3b}$ is independently selected from the group consisting of halogen, $-CN$, $-NO_2$, $-NHR^{3c}$, $-N_3$, $-OH$, $-SH$, $-SO_3H$, $C_{1-8}$ alkyl, $C_{1-8}$ alkoxy, $-COOR^{3c}$, $-C(O)NHR^{3c}$, and $-C(O)R^{3d}$, wherein each $R^{3c}$ is independently selected from the group consisting of H and $C_{1-4}$ alkyl and each $R^{3d}$ is independently $C_{1-4}$ alkyl;
$R^4$ is selected from the group consisting of H and $C_{1-6}$ alkyl;
subscript y is 1, 2, 3, 4, 5, or 6;
subscript z is 0 or 1;
$R^5$ is selected from the group consisting of H and $C_{1-6}$ alkyl;
alternatively, $R^4$ and $R^5$ are taken together to form 4- to 10-membered heterocyclylene;
$R^6$ is selected from the group consisting of 3- to 10-membered heterocyclyl, 5- to 10-membered heteroaryl, $C_{3-8}$ cycloalkyl, $C_{6-14}$ aryl, and $C_{7-22}$ arylalkyl, each of which is optionally substituted with one or more $R^{6b}$; and
each $R^{6b}$ is independently selected from the group consisting of halogen, $-CN$, $-NO_2$, $-NHR^{6c}$, $-N_3$, $-OH$, $-SH$, $-SO_3H$, $C_{1-8}$ alkyl, $C_{1-8}$ alkoxy, $-COOR^{6c}$, $-C(O)NHR^{6c}$, and $-C(O)R^{6d}$, wherein each $R^{6c}$ is independently selected from the group consisting of H and $C_{1-4}$ alkyl and each $R^{6d}$ is independently $C_{1-4}$ alkyl;
provided that $R^6$ is substituted with at least one $R^{6b}$ when: $-L^1-$ is $-CH_2-$; $R^{1a}$ is phenyl, 4-fluorophenyl, 4-methylphenyl, or 4-methoxyphenyl; subscript w is 0; $R^3$ is 3-phenoxy or 3-(4-chlorophenoxy); subscript y is 2 or 3; and $R^6$ is pyrrolidin-1-yl, morpholin-4-yl, piperidin-1-yl, or 2-methyl-piperidin-1-yl.

18. The compound of embodiment 17, wherein $-L^1-$ is selected from the group consisting of $-NHS(O)_2-$ and $-S(O)_2-$.

19. The compound of embodiment 18, wherein $R^{1a}$ is selected from the group consisting of 1,3,4-thiadiazol-2-yl and 1,3-thiazol-2-yl, each of which is optionally substituted with one or more $R^{1b}$.

20. The compound of embodiment 17, wherein $-L^1-$ is $-NHC(O)-$.

21. The compound of embodiment 20, wherein $R^{1a}$ is ($C_{1-8}$ alkyl)sulfonyl which is optionally substituted with one or more $R^{1b}$.

22. The compound of embodiment 17, wherein $-L^3-$ is $-O-$, and $R^{3a}$ is phenyl which is optionally substituted with one or more $R^{3b}$.

23. The compound of any one of embodiments 17-22, wherein subscript y is 1 and subscript z is 0.

24. The compound of any one of embodiments 17-23, wherein $R^6$ is pyrrolidin-1-yl which is optionally substituted with one or more $R^{6a}$.

25. A pharmaceutical composition comprising a compound according to any one of embodiments 17-24 and one or more pharmaceutically acceptable excipients.

26. A method of treating a condition selected from the group consisting of pain, itch, and combinations thereof, the method comprising administering a therapeutically effective amount of a compound according to any one of embodiments 17-24.

BRIEF DESCRIPTION OF THE DRAWINGS

FIG. 7B shows graphs indicating that repeated intrathecal injections of DA-0218 induced acute tolerance.

FIG. 7C shows graphs indicating that intrathecal administration of PF-05089771 did not produce anti-allodynia effects in the paclitaxel-induced neuropathic pain model.

FIG. 7D shows graphs indicating that intraperitoneal DA-0218 did not produce any anti-allodynia effects in paclitaxel-induced neuropathic pain model.

DETAILED DESCRIPTION OF THE INVENTION

Figure 1:
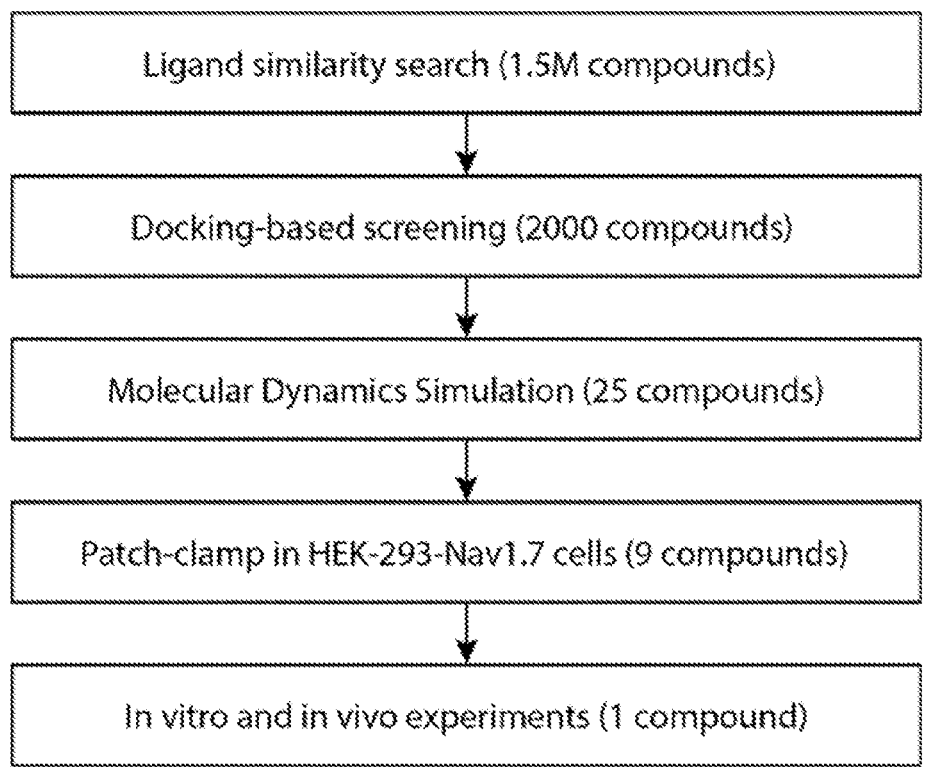
FIG. 1 shows an overview of the screening pipeline to identify a new Nav1.7 inhibitor in accordance with one embodiment of the present disclosure.
Figure 2:
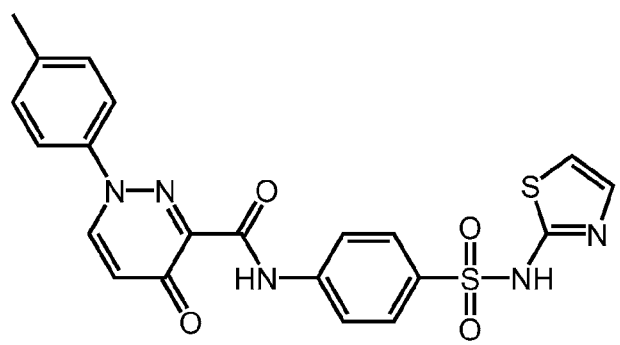
FIG. 2 shows the chemical structures of nine compounds selected for in vitro and in vivo experiments in accordance with one embodiment of the present disclosure.
Figure 2:
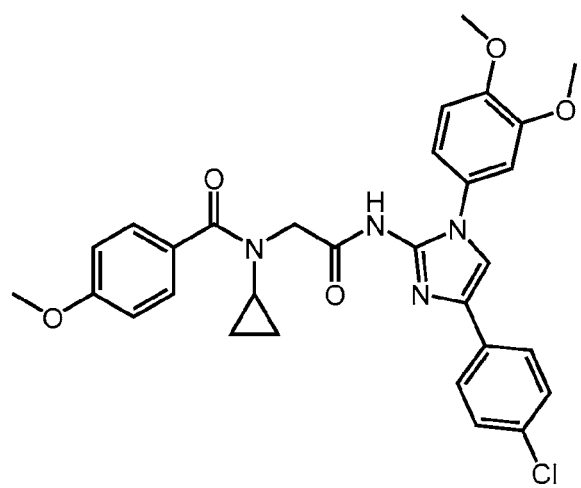
Figure 2:
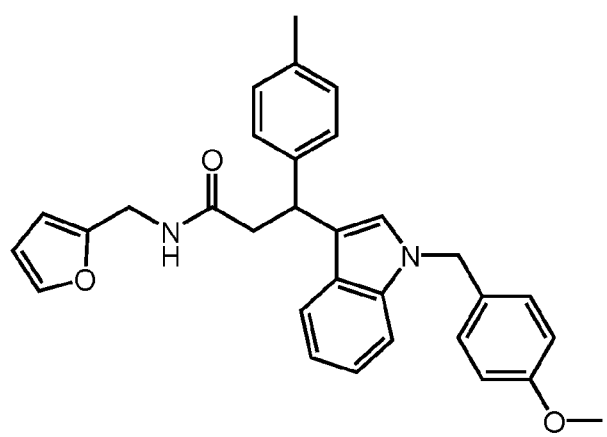
Figure 2:
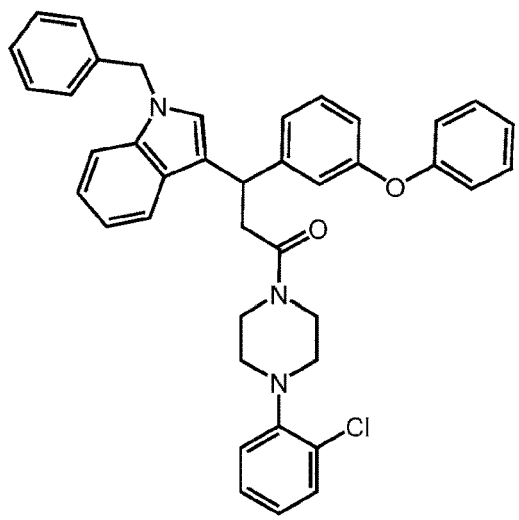
Figure 2:
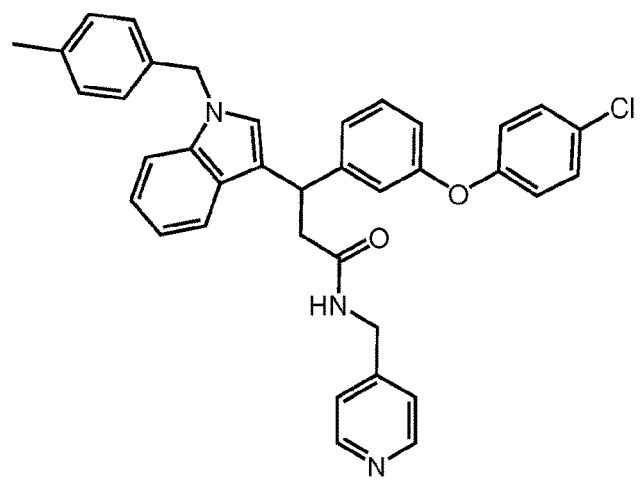
Figure 2:
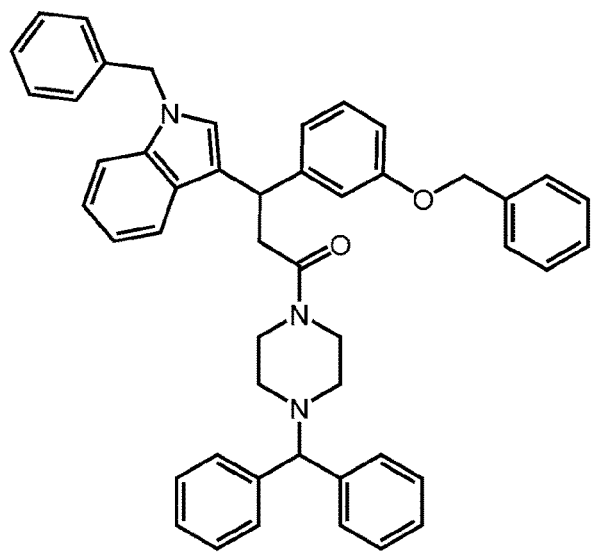
Figure 2:
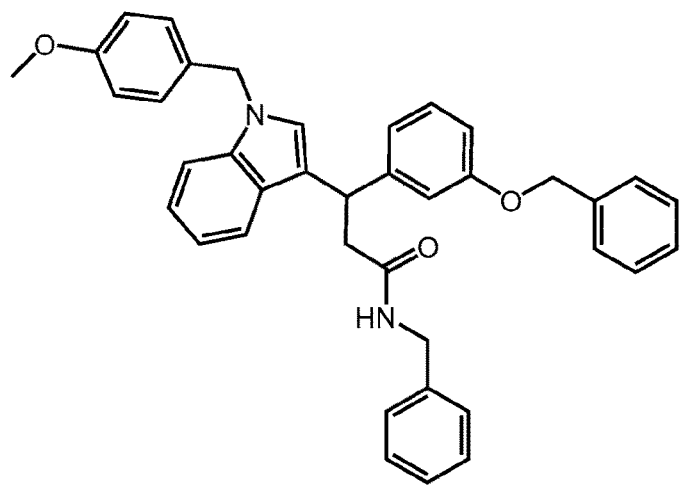
Figure 2:
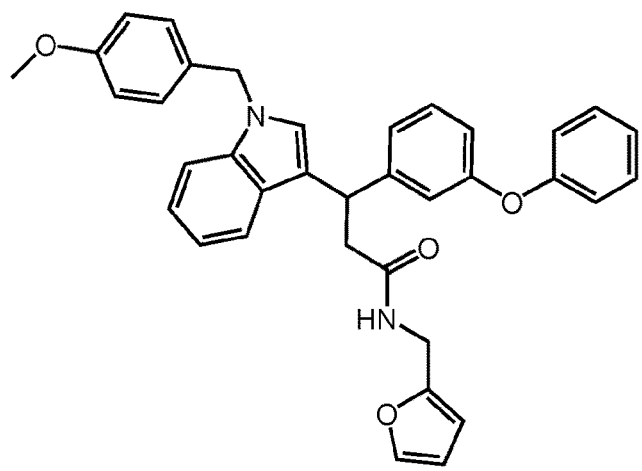
Figure 2:
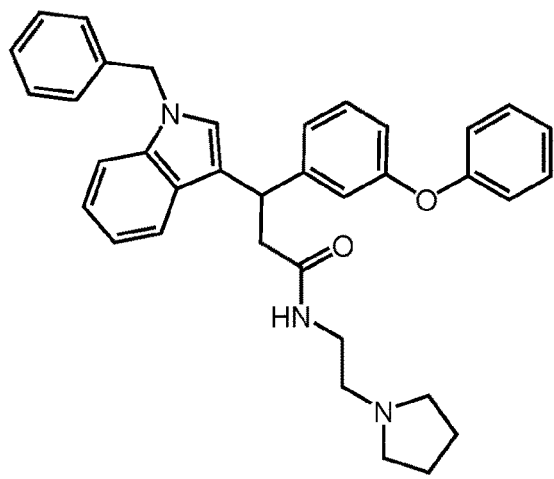

The present disclosure is based, in part, on the development by the inventors of isoform-selective inhibitors of Nav1.7 that can be used as new analgesics in a range of clinical applications. These compounds are shown to bind with high affinity to an isoform selective and extracellularly accessible site on the voltage-sensor domain of Nav1.7.

For the purposes of promoting an understanding of the principles of the present disclosure, reference will now be made to preferred embodiments and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

I. Definitions

Articles "a" and "an" are used herein to refer to one or to more than one (i.e., at least one) of the grammatical object of the article. By way of example, "an element" means at least one element and can include more than one element.

"About" is used to provide flexibility to a numerical range endpoint by providing that a given value may be "slightly above" or "slightly below" the endpoint without affecting the desired result.

The use herein of the terms "including," "comprising," or "having," and variations thereof, is meant to encompass the elements listed thereafter and equivalents thereof as well as additional elements. As used herein, "and/or" refers to and encompasses any and all possible combinations of one or more of the associated listed items, as well as the lack of combinations where interpreted in the alternative ("or").

As used herein, the transitional phrase "consisting essentially of" (and grammatical variants) is to be interpreted as encompassing the recited materials or steps "and those that do not materially affect the basic and novel characteristic(s)" of the claimed invention. Thus, the term "consisting essentially of" as used herein should not be interpreted as equivalent to "comprising."

Moreover, the present disclosure also contemplates that in some embodiments, any feature or combination of features set forth herein can be excluded or omitted. To illustrate, if the specification states that a complex comprises components A, B and C, it is specifically intended that any of A, B or C, or a combination thereof, can be omitted and disclaimed singularly or in any combination.

Recitation of ranges of values herein are merely intended to serve as a shorthand method of referring individually to each separate value falling within the range, unless otherwise indicated herein, and each separate value is incorporated into the specification as if it were individually recited herein. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this disclosure.

As used herein, "treatment," "therapy" and/or "therapy regimen" refer to the clinical intervention made in response to a disease, disorder or physiological condition manifested by a patient or to which a patient may be susceptible. The aim of treatment includes the alleviation or prevention of symptoms, slowing or stopping the progression or worsening of a disease, disorder, or condition and/or the remission of the disease, disorder or condition.

As used herein, the term "ameliorate" refers to the ability to make better, or more tolerable, or reduce, a disease, condition, or disorder, and may encompass "limiting progression," which refers to the lessening or limiting of the scope or severity of the disease or disorder or condition. The term "prevent" refers to the ability to keep a condition, disease, or disorder from developing, happening or existing.

The term "effective amount" or "therapeutically effective amount" refers to an amount sufficient to effect beneficial or desirable biological and/or clinical results.

The term "administering" or "administered" as used herein is meant to include parenteral, oral, sublingual, buccal, transnasal, transdermal, rectal, intramuscular, intravenous, intraventricular, intrathecal, interperitoneal, subcutaneous, and topical routes of administration, all of which are described in more detail provided below. By "parenteral" is meant intravenous administration, subcutaneous administration, intramuscular administration, intradermal administration, intrathecal administration, or peri-neural administration (e.g., via peri-sciatic nerve injection). In the methods of the subject disclosure, the compounds and/or compositions of the present disclosure may be administered alone, simultaneously with one or more other agents, or the compounds and/or compositions may be administered sequentially, in either order. It will be appreciated that the actual preferred method and order of administration will vary according to, inter alia, the particular preparation of interfering molecules being utilized, the particular formulation(s) of the one or more other interfering molecules being utilized. The optimal method and order of administration of the compounds and/or compositions of the disclosure for a given set of conditions can be ascertained by those skilled in the art using conventional techniques and in view of the information set out herein. In accordance with good clinical practice, it is preferred to administer the instant compounds and/or compositions at a concentration level which will produce effective beneficial effects without causing any harmful or untoward side effects.

As used herein, the terms "subject" and "patient" are used interchangeably herein and refer to both human and nonhuman animals. The term "nonhuman animals" of the disclosure includes all vertebrates, e.g., mammals and non-mammals, such as nonhuman primates, sheep, dog, cat, horse, cow, chickens, amphibians, reptiles, and the like. The methods and compositions disclosed herein can be used on a sample either in vitro (for example, on isolated cells or tissues) or in vivo in a subject (i.e., living organism, such as a patient). The compounds and compositions provided herein may be used in medical (i.e., used to treat a human subject) and veterinary (i.e., used to treat non-human subjects) settings.

"Alkyl," by itself or as part of another substituent, refers to a straight or branched, saturated, aliphatic radical having the number of carbon atoms indicated. Alkyl can include any number of carbons, such as $C_{1-2}$, $C_{1-3}$, $C_{1-4}$, $C_{1-5}$, $C_{1-6}$, $C_{1-7}$, $C_{1-8}$, $C_{1-9}$, $C_{1-10}$, $C_{2-3}$, $C_{2-4}$, $C_{2-5}$, $C_{2-6}$, $C_{3-4}$, $C_{3-5}$, $C_{3-6}$, $C_{4-5}$, $C_{4-6}$ and $C_{5-6}$. For example, $C_{1-6}$ alkyl includes, but is not limited to, methyl, ethyl, propyl, isopropyl, butyl, isobutyl, sec-butyl, tert-butyl, pentyl, isopentyl, hexyl, etc. Alkyl can also refer to alkyl groups having up to 20 carbons atoms, such as, but not limited to heptyl, octyl, nonyl, decyl, etc. Alkyl groups can be substituted or unsubstituted. Unless otherwise specified, "substituted alkyl" groups can be substituted with one or more groups selected from halo, hydroxy, amino, alkylamino, amido, acyl, nitro, cyano, and alkoxy.

"Alkoxy," by itself or as part of another substituent, refers to a moiety having the formula —OR, wherein R is an alkyl group as defined herein. Examples of alkoxy groups include, but are not limited to, methoxy, ethoxy, and isopropyloxy.

As used herein, the term "alkenyl" refers to an alkyl group, as defined herein, having one or more carbon-carbon double bonds.

As used herein, the term "alkynyl" refers to an alkyl group, as defined herein, having one or more carbon-carbon triple bonds.

"Cycloalkyl," by itself or as part of another substituent, refers to a saturated or partially unsaturated, monocyclic, fused bicyclic or bridged polycyclic ring assembly containing from 3 to 12 ring atoms, or the number of atoms indicated. Cycloalkyl can include any number of carbons, such as $C_{3-6}$, $C_{4-6}$, $C_{5-6}$, $C_{3-8}$, $C_{4-8}$, $C_{5-8}$, $C_{6-8}$, $C_{3-9}$, $C_{3-10}$, $C_{3-11}$, and $C_{3-12}$. Saturated monocyclic cycloalkyl rings include, for example, cyclopropyl, cyclobutyl, cyclopentyl, cyclohexyl, and cyclooctyl. Saturated bicyclic and polycyclic cycloalkyl rings include, for example, norbomane, [2.2.2] bicyclooctane, decahydronaphthalene and adamantane. Cycloalkyl groups can also be partially unsaturated, having one or more double or triple bonds in the ring. Representative cycloalkyl groups that are partially unsaturated include, but are not limited to, cyclobutene, cyclopentene, cyclohexene, cyclohexadiene (1,3- and 1,4-isomers), cycloheptene, cycloheptadiene, cyclooctene, cyclooctadiene (1,3-, 1,4- and 1,5-isomers), norbornene, and norbornadiene. When cycloalkyl is a saturated monocyclic $C_{3-8}$ cycloalkyl, exemplary groups include, but are not limited to cyclopropyl, cyclobutyl, cyclopentyl, cyclohexyl, cycloheptyl and cyclooctyl. When cycloalkyl is a saturated monocyclic $C_{3-6}$ cycloalkyl, exemplary groups include, but are not limited to cyclopropyl, cyclobutyl, cyclopentyl, and cyclohexyl. Cycloalkyl groups can be substituted or unsubstituted. Unless otherwise specified, "substituted cycloalkyl" groups can be substituted with one or more groups selected from halo, hydroxy, amino, alkylamino, amido, acyl, nitro, cyano, and alkoxy.

"Aryl," by itself or as part of another substituent, refers to an aromatic ring system having any suitable number of ring atoms and any suitable number of rings. Aryl groups can include any suitable number of ring atoms, such as 6, 7, 8, 9, 10, 11, 12, 13, 14, 15 or 16 ring atoms, as well as from 6 to 10, 6 to 12, or 6 to 14 ring members. Aryl groups can be monocyclic, fused to form bicyclic (e.g., benzocyclohexyl) or tricyclic groups, or linked by a bond to form a biaryl group. Representative aryl groups include phenyl, naphthyl and biphenyl. Other aryl groups include benzyl, having a methylene linking group. Some aryl groups have from 6 to 12 ring members, such as phenyl, naphthyl or biphenyl. Other aryl groups have from 6 to 10 ring members, such as phenyl or naphthyl. Some other aryl groups have 6 ring members, such as phenyl. Aryl groups can be substituted or unsubstituted. Unless otherwise specified, "substituted aryl" groups can be substituted with one or more groups selected from halo, hydroxy, amino, alkylamino, amido, acyl, nitro, cyano, and alkoxy.

"Heteroaryl," by itself or as part of another substituent, refers to a monocyclic or fused bicyclic or tricyclic aromatic ring assembly containing the number of carbon atoms indicated (e.g., 5 to 16 carbon ring atoms), where from 1 to 5 of the carbon ring atoms are replaced by a heteroatom such as N, O or S. Additional atoms can also be useful, including, but not limited to, B, Al, Si and P. The heteroatoms can be oxidized to form moieties such as, but not limited to, —S(O)— and —S(O)$_2$—. Heteroaryl groups can include any number of carbon ring atoms, such as 3 to 6, 4 to 6, 5 to 6, 3 to 8, 4 to 8, 5 to 8, 6 to 8, 3 to 9, 3 to 10, 3 to 11, or 3 to 12 carbon ring members. Any suitable number of carbon ring atoms can be replaced with heteroatoms, such as 1, 2, 3, 4, or 5, or 1 to 2, 1 to 3, 1 to 4, 1 to 5, 2 to 3, 2 to 4, 2 to 5, 3 to 4, or 3 to 5. Heteroaryl groups can have from 5 to 8 carbon ring members where 1 to 4 carbon ring atoms are replaced with heteroatoms; or from 5 to 8 carbon ring members where 1 to 3 carbon ring atoms are replaced with heteroatoms; or from 5 to 6 carbon ring members where 1 to 4 carbon ring atoms are replaced with heteroatoms; or from 5 to 6 ring members where 1 to 3 carbon ring atoms are replaced with heteroatoms. The heteroaryl group can include groups such as pyrrole, pyridine, imidazole, pyrazole, triazole, tetrazole, pyrazine, pyrimidine, pyridazine, triazine (1,2, 3-, 1,2,4- and 1,3,5-isomers), thiophene, furan, thiazole, isothiazole, oxazole, and isoxazole. The heteroaryl groups can also be fused to aromatic ring systems, such as a phenyl ring, to form members including, but not limited to, benzopyrroles such as indole and isoindole, benzopyridines such as quinoline and isoquinoline, benzopyrazine (quinoxaline), benzopyrimidine (quinazoline), benzopyridazines such as phthalazine and cinnoline, benzothiophene, and benzofuran. Other heteroaryl groups include heteroaryl rings linked by a bond, such as bipyridine. Heteroaryl groups can be substituted or unsubstituted. Unless otherwise specified, "substituted heteroaryl" groups can be substituted with one or more groups selected from halo, hydroxy, amino, alkylamino, amido, acyl, nitro, cyano, and alkoxy.

The heteroaryl groups can be linked via any position on the ring. For example, pyrrole includes 1-, 2- and 3-pyrrole, pyridine includes 2-, 3- and 4-pyridine, imidazole includes 1-, 2-, 4- and 5-imidazole, pyrazole includes 1-, 3-, 4- and 5-pyrazole, triazole includes 1-, 4- and 5-triazole, tetrazole includes 1- and 5-tetrazole, pyrimidine includes 2-, 4-, 5- and 6- pyrimidine, pyridazine includes 3- and 4-pyridazine, 1,2,3-triazine includes 4- and 5-triazine, 1,2,4-triazine includes 3-, 5- and 6-triazine, 1,3,5-triazine includes 2-triazine, thiophene includes 2- and 3-thiophene, furan includes 2- and 3-furan, thiazole includes 2-, 4- and 5-thiazole, isothiazole includes 3-, 4- and 5-isothiazole, oxazole includes 2-, 4- and 5-oxazole, isoxazole includes 3-, 4- and 5-isoxazole, indole includes 1-, 2- and 3-indole, isoindole includes 1- and 2-isoindole, quinoline includes 2-, 3- and 4-quinoline, isoquinoline includes 1-, 3- and 4-isoquinoline, quinazoline includes 2- and 4-quinoazoline, cinnoline includes 3- and 4-cinnoline, benzothiophene includes 2- and 3-benzothiophene, and benzofuran includes 2- and 3-benzofuran.

Some heteroaryl groups include those having from 5 to 10 carbon ring members where 1 to 3 carbon ring atoms are replaced with heteroatoms, such as pyrrole, pyridine, imidazole, pyrazole, triazole, pyrazine, pyrimidine, pyridazine, triazine (1,2,3-, 1,2,4- and 1,3,5-isomers), thiophene, furan, thiazole, isothiazole, oxazole, isoxazole, indole, isoindole, quinoline, isoquinoline, quinoxaline, quinazoline, phthalazine, cinnoline, benzothiophene, and benzofuran. Other heteroaryl groups include those having from 5 to 8 carbon ring members where 1 to 3 carbon ring atoms are replaced with heteroatoms, such as pyrrole, pyridine, imidazole, pyrazole, triazole, pyrazine, pyrimidine, pyridazine, triazine (1,2,3-, 1,2,4- and 1,3,5-isomers), thiophene, furan, thiazole, isothiazole, oxazole, and isoxazole. Some other heteroaryl groups include those having from 9 to 12 carbon ring members where 1 to 3 carbon ring atoms are replaced with heteroatoms, such as indole, isoindole, quinoline, isoquinoline, quinoxaline, quinazoline, phthalazine, cinnoline, benzothiophene, benzofuran and bipyridine. Still other heteroaryl groups include those having from 5 to 6 carbon ring members where 1 to 2 carbon ring atoms are replaced with heteroatoms, such as pyrrole, pyridine, imidazole, pyrazole, pyrazine, pyrimidine, pyridazine, thiophene, furan, thiazole, isothiazole, oxazole, and isoxazole.

Some heteroaryl groups include from 5 to 10 carbon ring members wherein carbon ring atoms are replaced with only nitrogen atoms, such as pyrrole, pyridine, imidazole, pyrazole, triazole, pyrazine, pyrimidine, pyridazine, triazine (1,2, 3-, 1,2,4- and 1,3,5-isomers), indole, isoindole, quinoline, isoquinoline, quinoxaline, quinazoline, phthalazine, and cinnoline. Other heteroaryl groups include from 5 to 10 carbon ring members wherein carbon ring atoms are replaced with only oxygen atoms, such as furan and benzofuran. Some other heteroaryl groups include from 5 to 10 carbon ring members wherein carbon ring atoms are replaced with only sulfur atoms, such as thiophene and benzothiophene. Still other heteroaryl groups include from 5 to 10 carbon ring members wherein carbon ring atoms are replaced with at least two types of heteroatoms, such as imidazole, pyrazole, triazole, pyrazine, pyrimidine, pyridazine, triazine (1,2,3-, 1,2,4- and 1,3,5-isomers), thiazole, isothiazole, oxazole, isoxazole, quinoxaline, quinazoline, phthalazine, and cinnoline.

As used herein the term "heterocyclyl," by itself or as part of another substituent, refers to a saturated ring system having from 3 to 12 ring members and from 1 to 4 heteroatoms of N, O and S. Additional heteroatoms can also be useful, including, but not limited to, B, Al, Si and P. The heteroatoms can be oxidized to form moieties such as, but not limited to, —S(O)— and —S(O)$_2$—. Heterocyclyl groups can include any number of ring atoms, such as, $C_{3-6}$, $C_{4-6}$, $C_{5-6}$, $C_{3-8}$, $C_{4-8}$, $C_{5-8}$, $C_{6-8}$, $C_{3-9}$, $C_{3-10}$, $C_{3-11}$, or $C_{3-12}$, wherein at least one of the carbon atoms is replaced by a heteroatom. Any suitable number of carbon ring atoms can be replaced with heteroatoms in the heterocyclyl groups, such as 1, 2, 3, or 4, or 1 to 2, 1 to 3, 1 to 4, 2 to 3, 2 to 4, or 3 to 4. The heterocyclyl group can include groups such as aziridine, azetidine, pyrrolidine, piperidine, azepane, azocane, quinuclidine, pyrazolidine, imidazolidine, piperazine (1,2-, 1,3- and 1,4-isomers), oxirane, oxetane, tetrahydrofuran, oxane (tetrahydropyran), oxepane, thiirane, thietane, thiolane (tetrahydrothiophene), thiane (tetrahydrothiopyran), oxazolidine, isoxazolidine, thiazolidine, isothiazolidine, dioxolane, dithiolane, morpholine, thiomorpholine, dioxane, or dithiane. The heterocyclyl groups can also be fused to aromatic or non-aromatic ring systems to form members including, but not limited to, indoline. Heterocyclyl groups can be unsubstituted or substituted. Unless otherwise specified, "substituted heterocyclyl" groups can be substituted with one or more groups selected from halo, hydroxy, amino, oxo, alkylamino, amido, acyl, nitro, cyano, and alkoxy.

The heterocyclyl groups can be linked via any position on the ring. For example, aziridine can be 1- or 2-aziridine, azetidine can be 1- or 2- azetidine, pyrrolidine can be 1-, 2- or 3-pyrrolidine, piperidine can be 1-, 2-, 3- or 4-piperidine, pyrazolidine can be 1-, 2-, 3-, or 4-pyrazolidine, imidazolidine can be 1-, 2-, 3- or 4-imidazolidine, piperazine can be 1-, 2-, 3- or 4-piperazine, tetrahydrofuran can be 1- or 2-tetrahydrofuran, oxazolidine can be 2-, 3-, 4- or 5-oxazolidine, isoxazolidine can be 2-, 3-, 4- or 5-isoxazolidine, thiazolidine can be 2-, 3-, 4- or 5-thiazolidine, isothiazolidine can be 2-, 3-, 4- or 5- isothiazolidine, and morpholine can be 2-, 3- or 4-morpholine.

When heterocyclyl includes 3 to 8 ring members and 1 to 3 heteroatoms, representative members include, but are not limited to, pyrrolidine, piperidine, tetrahydrofuran, oxane, tetrahydrothiophene, thiane, pyrazolidine, imidazolidine, piperazine, oxazolidine, isoxazolidine, thiazolidine, isothiazolidine, morpholine, thiomorpholine, dioxane and dithiane. Heterocyclyl can also form a ring having 5 to 6 ring members and 1 to 2 heteroatoms, with representative members including, but not limited to, pyrrolidine, piperidine, tetrahydrofuran, tetrahydrothiophene, pyrazolidine, imidazolidine, piperazine, oxazolidine, isoxazolidine, thiazolidine, isothiazolidine, and morpholine.

"Halo" and "halogen," by themselves or as part of another substituent, refer to a fluorine, chlorine, bromine, or iodine atom.

"Sulfonyl" refers to a moiety —$SO_2$—, i.e., a sulfur atom double-bonded to two oxygen atoms and bonded to two other groups in the moiety having the sulfonyl.

As used herein, the term "carbonyl," by itself or as part of another substituent, refers to —C(O)—, i.e., a carbon atom double-bonded to oxygen and bonded to two other groups in the moiety having the carbonyl.

As used herein, the term "amino" refers to a moiety —$NR_2$, wherein each R group is H or alkyl. An amino moiety can be ionized to form the corresponding ammonium cation.

As used herein, the term "hydroxy" refers to the moiety —OH.

As used herein, the term "cyano" refers to a carbon atom triple-bonded to a nitrogen atom (i.e., the moiety —C≡N).

As used herein, the term "carboxy" refers to the moiety —C(O)OH. A carboxy moiety can be ionized to form the corresponding carboxylate anion.

As used herein, the term "amido" refers to a moiety —NRC(O)R or —C(O)$NR_2$, wherein each R group is H or alkyl.

As used herein, the term "nitro" refers to the moiety —$NO_2$.

As used herein, the term "oxo" refers to an oxygen atom that is double-bonded to a compound (i.e., O═).

As used herein, the term "salt" refers to acid or base salts of the compounds set forth herein. Illustrative examples of pharmaceutically acceptable salts are mineral acid salts (salts of hydrochloric acid, hydrobromic acid, phosphoric acid, or the like), organic acid salts (salts of acetic acid, propionic acid, glutamic acid, citric acid, fumaric acid, or the like) salts, and quaternary ammonium salts (salts formed via reaction with methyl iodide, ethyl iodide, or the like). It is understood that the pharmaceutically acceptable salts are non-toxic. Pharmaceutically acceptable salts of the acidic compounds of the present disclosure are salts formed with bases, namely cationic salts such as alkali and alkaline earth metal salts, such as sodium, lithium, potassium, calcium, magnesium, as well as ammonium salts, such as ammonium, trimethyl-ammonium, diethylammonium, and tris-(hydroxymethyl)-methyl-ammonium salts. The neutral forms of the compounds can be regenerated by contacting the salt with a base or acid, and optionally isolating the parent compound in the conventional manner. The parent form of the compound may differ from the various salt forms in certain physical properties, such as solubility in polar solvents, but otherwise the salts are equivalent to the parent form of the compound for the purposes of the present disclosure.

As used herein, the term "excipient" refers to a substance that aids the administration of an active agent to a subject. By "pharmaceutically acceptable," it is meant that the excipient is compatible with the other ingredients of the formulation and is not deleterious to the recipient thereof. Pharmaceutical excipients useful in the present disclosure include, but are not limited to, binders, fillers, disintegrants, lubricants, glidants, coatings, sweeteners, flavors and colors.

Unless otherwise defined, all technical terms used herein have the same meaning as commonly understood by one of ordinary skill in the art to which this disclosure belongs.

II. Nav 1.7 Inhibitors for the Treatment of Itch and Pain

Voltage-gated sodium channels (Nav) are a family of transmembrane ion channel proteins comprised of nine members (Nav1.1-Nav1.9). Navs respond to membrane depolarization by opening to allow sodium ions to flow into cells to create action potentials. Nav are mostly found in excitable cells, including peripheral and central neurons (Nav1.1-3, 1.6-9), skeletal muscle (Nav1.4), and cardiac muscle (Nav1.5), and are responsible for physiologic effects associated with these cells.

Nav1.7 is almost exclusively expressed in the peripheral nervous system, including nociceptor neurons in dorsal root ganglia (DRG). Its enrichment in DRG neurons corresponds to its critical role in pain signaling as evidenced from animal and human studies. Nav1.7 mutant mice showed significant reductions in nociceptive sensitivities. In humans, genetic studies of loss-of-function and gain-of-function mutations have strongly implicated Nav1.7 in pain sensation. Inherited erythromelalgia (IEM) is causally linked to missense mutations in Nav1.7. Loss-of-function mutations in both alleles of the gene encoding Nav1.7 channels cause complete loss of pain sensation (Congenital Indifference to Pain). Thus, Nav1.7 serves as a promising target for developing new non-opioid analgesics.

Non-selective Nav inhibitors (e.g., local anesthetic lidocaine) have long been used in clinic to control pain. Unfortunately, the analgesic effect of such non-selective Nav inhibitors is accompanied by serious side effects caused by interaction with other Nav subtypes. In particular, these include Nav1.5 in myocytes (resulting in cardiac arrhythmias) and Nav1.6 in central neurons (resulting in seizures). Therefore, development of a selective Nav inhibitor analgesic devoid of these side effects has become a priority. Structurally, all Navs have four distinct domains (D1-D4), each of which consists of six transmembrane helices (S1-S6). Two helices (S5-S6) from each domain form the channel pore which is responsible for Na ion conduction. The other four helices (S1-S4) from each domain form a voltage sensor domain (VSD1-VSD4) which works as a sensor of change in voltage across the cell membrane.

Compounds, salts, solvates, hydrates, prodrugs, and derivatives thereof as well as any pharmaceutical compositions thereof as described herein have many potential applications, such as treating and/or preventing pain and itch. Accordingly, an aspect of the present disclosure provides a method of treating and/or preventing pain in a subject, the method comprising, consisting of, or consisting essentially of administering to the subject a therapeutically effective amount of a compound or pharmaceutical composition as provided herein such that the pain is treated and/or prevented in the subject.

Some embodiments of the present disclosure provide methods for the treatment of pain, itch, or a combination thereof, comprising administering to a subject in need thereof a therapeutically effective amount of a Nav1.7 inhibitor, wherein the Nav1.7 inhibitor is an N-substituted indole or a pharmaceutically acceptable salt thereof.

As used herein, the term "pain" refers to the basic bodily sensation induced by a noxious stimulus, received by naked nerve endings, characterized by physical discomfort (e.g., pricking, throbbing, aching, etc.) and typically leading to an evasive action by the individual. As used herein, the term pain also includes chronic and acute neuropathic pain.

The terms "neuropathic pain" or "neurogenic pain" can be used interchangeably and refer to pain that arises from direct stimulation of nervous tissue itself, central or peripheral and can persist in the absence of stimulus. The sensations that characterize neuropathic pain vary and are often multiple and include burning, gnawing, aching, and shooting. (See, e.g., Rooper and Brown, (2005) Adams and Victor's Principles of Neurology, $8^{th}$ ed., NY, McGraw-Hill). These damaged nerve fibers send incorrect signals to other pain centers. The impact of nerve fiber injury includes a change in nerve function both at the site of injury and areas around the injury, as well as in the central nervous system. Chronic neuropathic pain often seems to have no obvious cause, however, some common causes may include, but are not limited to, alcoholism, amputation, back, leg and hip problems, chemotherapy, diabetes, facial nerve problems (e.g., trigeminal neuralgia), HIV infection or AIDS, multiple sclerosis, shingles, spine surgery, spinal cord injury, traumatic brain injury, and stroke. For example, one example of neuropathic pain is phantom limb syndrome, which occurs when an arm or leg has been removed because of illness or injury, but the brain still gets pain messages from the nerves that originally carried impulses from the missing limb. Also included within the definition of pain include inflammatory pain (pain as the result of the inflammation, e.g., inflammatory hyperalgesia such as arthritis) and "other pain" (e.g., cancer pain, muscle pain, and headache). Mechanical allodynia or tactile allodynia, pain induced by normally innocuous mechanical stimulation, is a common feature of chronic pain. Chronic pain due to arthritis and cancer are serious problems in pets and other companion animals.

In some embodiments, the pain comprises an inflammatory pain. In another embodiment, the pain comprises neuropathic pain. In yet other embodiments, cancer pain, headaches, or a combination thereof. In some embodiments, the pain comprises mechanical allodynia.

The compounds and compositions provided herein also have utility in the treating and preventing of itch in a subject. Itch is a major medical problem. Its impact on quality of life equals that of pain. It represents an unmet medical need as few effective therapies are available. Itch or pruritus is defined as an unpleasant sensation that evokes the desire or reflex to scratch. Itches are a common problem and can be localized (limited to one area of the body) or generalized (occurring all over the body or in several different areas). The medical term for itching is pruritus. Generalized itch, for obvious reasons, is more difficult to treat than localized itch. Itches can also occur with or without skin lesions (for example, bumps, blisters, or psoriasis). In some instances, subjects having Nav1.7-gain-of-function mutations can suffer from excessive itch.

Itch can originate in the peripheral nervous system (dermal or neuropathic) or in the central nervous system (neuropathic, neurogenic, or psychogenic). Itch originating in the skin is considered pruritoceptive and can be induced by a variety of stimuli, including mechanical, chemical, thermal, and electrical stimulation. Neuropathic itch can originate at any point along the afferent pathway as a result of damage of the nervous system. They could include diseases or disorders in the central nervous system or peripheral nervous system. Examples of neuropathic itch in origin are nostalgia paresthetica, brachioradial pruritus, brain tumors, multiple sclerosis, peripheral neuropathy, and nerve irritation. Neurogenic itch, which is itch induced centrally but with no neural damage, is often associated with increased accumulation of endogenous opioids and possibly synthetic opioids. Itch is also associated with some psychiatric disorders such as delusions of parasitosis or related obsessive-compulsive disorders, for example neurotic scratching.

Itching can be caused by many other conditions. For example, xerosis, is the most common cause, frequently seen in winters. It is associated with older age, frequent bathing in hot showers or baths, and high temperature and low humidity environments. Skin conditions (such as psoriasis, eczema, sunburn, athlete's foot, hidradenitis suppurativa and many others) are also other common causes. Most are of an inflammatory nature. Other causes include but are not limited to: insect bites, such as those from mosquitoes, fleas or chiggers; anaphylaxis or allergic reactions, e.g., to contact with specific chemicals, such as urushiol from poison ivy or poison oak; cancers of the blood such as Hodgkin's disease and lymphoma; jaundice where the built up of bilirubin is a skin irritant at high concentrations; polycythemia, which can cause generalized itching due to increased histamine; scabies or infection with lice or worms; liver, kidney, and thyroid illnesses; shaving, which can irritate the skin; diabetes mellitus; dandruff where there is an unusually large amount of epidermal flaking associated with this sensation; iron deficiency such as anemia; parasitic infections such as certain parasites of birds and mammals that are released from infected snails in fresh and saltwater and they cause swimmer's itch, also called cercarial dermatitis; allergy to psychiatric medication; fungal infections, e.g., of the crotch (tinea cruris) commonly known as jock itch, as well as vaginal itching and/or anal itching from sexually transmitted diseases (STDs) or other types of infections; photodermatitis-sunlight reacts with chemicals in the skin, leading to the formation of irritant metabolites, for example, sunburn; directly contact or ingestion of chemical compounds or drugs, e.g., morphine and other opiates; cholestasis related to pregnancy: pruritic urticarial papules and plaques of pregnancy (PUPPP); and gestational pemphigoid.

Cholestasis is a condition in which the flow of bile from the liver stops or slows, e.g., when bile cannot flow from the liver to the duodenum. The two basic distinctions are an obstructive type of cholestasis where there is a mechanical blockage in the duct system that can occur from a gallstone or malignancy, and metabolic types of cholestasis which are disturbances in bile formation that can occur because of genetic defects or acquired as a side effect of many medications. Pruritus (itchiness) is the primary symptom of cholestasis. Other symptoms include jaundice, pale stool (from obstructive cholestasis) and dark urine. Some of the causes of cholestasis are cirrhosis, pregnancy, and liver diseases. Pruritus can also occur in pruritus ani, cough, migraine, pain, and pain of apthous ulcers, mastocytosis, and mast cell activation syndrome. Pruritus ani (also known as anusitis), is a Latin term meaning "itchy anus" and is the irritation of the skin at the exit of the rectum, known as the anus, causing the desire to scratch. The intensity of anal itching increases from moisture, pressure, and rubbing caused by clothing and sitting. Causes of itch can also be psychological, that is, due to stress, anxiety, etc., and stress also can aggravate itch from other causes.

Accordingly, itch can be a sensation or symptom associated with a disease or disorder selected from anaphylaxis, pruritus ani, cough, migraine, pain, and pain of apthous ulcers, mastocytosis, and mast cell activation syndrome, cholestasis, eczema, atopic eczematous dermatitis, seborrheic dermatitis, atopic dermatitis, contact dermatitis, irritant dermatitis, xerosis (dry skin), psoriasis, fungal infections including athlete's foot, yeast infections including diaper rash and vaginal itch, parasitic infections, parasitic infestations including scabies and lice, lichen planus, lichen simplex, lichen simplex chronicus, lichen sclerosis, itch secondary to medications, senile itch, uremia, idiopathic itch, itch associated with liver cirrhosis, itch associated with inflammation, itch associated with allergies, itch associated with cancer, itch associated with liver, kidney disease, and hyperthyroidism; itch associated with haemodialysis, burns, scalds, sunburn, wound healing, insect bites, urticaria, sweat gland abnormalities, bullous pemphigoid, photodematoses, skin blisters, adult acne, chicken pox, seasonal allergy, summer seasonal recurrent dermatitis, prurigo nodularis, notalgia paresthetica, cutaneous T-cell lymphoma, dermatitis herpetiformis, X-linked ichthyosis, drug reactions, chronic renal failure, and Hodgkins lymphoma. Chronic itch due to skin lesions and infection are serious problems in pets and other companion animals.

Itching usually prompts scratching, which can sometimes lead to a vicious itch-scratch cycle. Scratching can initially feel so satisfying, but prolonged scratching just leaves one with irritated skin that can still itch and often causes itching itself. Since scratching provides only temporary relief and does not promote healing of the underlying problem, it is best to avoid scratching if at all possible. If scratching breaks open the skin, bacterial infection can set in. And if scratching continues for many months or years, the area that is scratched may develop thickened skin (lichenification) or pigmentation that darkens the area. Obviously, the best way to allow irritated skin to heal is to stop scratching it. However, will power often is not enough since the urge to scratch can be compelling.

Hence, another aspect of the present disclosure provides a method of treating and/or preventing itch in a subject, the method comprising, consisting of, or consisting essentially of administering to the subject a therapeutically effective amount of a compound or composition as provided herein such that the itch is treated and/or prevented. In one embodiment, the itch comprises histamine-induced acute itch. In another embodiment, the itch comprises lymphoma-induced chronic itch. Notably, chronic itch is frequently resistant to anti-histamine treatments.

In some embodiments, the Nav1.7 inhibitor is an N-substituted indole. The N-substituted indole may be, for example, an 1-benzyl-1H-indole, wherein the benzyl group is unsubstituted or substituted with one or more $R^{1b}$ groups as described herein. The N-substituted indole may be a 3-(1-substituted-TH-indol-3-yl)-3-(3-phenoxyphenyl) propanamide; in some such embodiments, the 1-substituent is a -$L^1$-$R^{1a}$ moiety as described herein and/or the propanamide nitrogen atom is substituted with —$(CH_2)_y(NR^5)_zR^6$ as described herein. In some embodiments, the N-substituted indole is a compound according to Formula I:

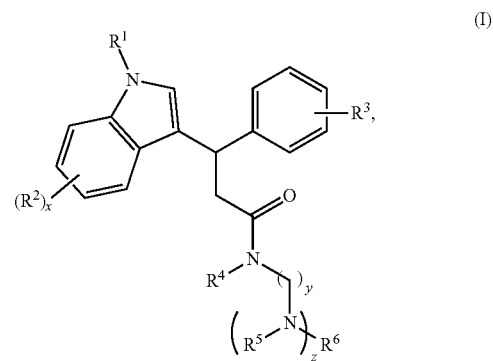

(I)

or a pharmaceutically acceptable salt thereof, wherein:
$R^1$ is -$L^1$-$R^{1a}$;
-$L^1$- is selected from the group consisting of —$(CH_2)_n$—, —$NHS(O)_2$—, —$NHC(O)$—, and —$S(O)_2$—, wherein subscript n is 1, 2, 3, 4, 5, or 6;
$R^{1a}$ is selected from the group consisting of $C_{6-14}$ aryl, $C_{3-8}$ cycloalkyl, 5- to 10-membered heteroaryl, 3- to 10-membered heterocyclyl, ($C_{6-14}$ aryl)sulfonyl, ($C_{1-8}$ alkyl)sulfonyl, ($C_{3-8}$ cycloalkyl)sulfonyl, $C_{2-8}$ alkyl, $C_{2-8}$ alkenyl, and $C_{2-8}$ alkynyl, each of which is optionally substituted with one or more $R^{1b}$;
each $R^{1b}$ is independently selected from the group consisting of halogen, —CN, —$NO_2$, —$NHR^{1c}$, —N=C(OH)$R^{1d}$, —$N_3$, —OH, —SH, —$SO_3H$, $C_{1-8}$ alkyl, $C_{1-8}$ alkoxy, $C_{2-8}$ alkenyl, $C_{2-8}$ alkynyl, $C_{3-10}$ cycloalkyl, —$COOR^{1c}$, —$C(O)NHR^{1c}$, and —$C(O)R^{1d}$, wherein each $R^{1c}$ is independently selected from the group consisting of H and $C_{1-4}$ alkyl and each $R^{1d}$ is independently $C_{1-4}$ alkyl;
subscript x is 0, 1, 2, 3, or 4;
each $R^2$ is independently selected from the group consisting of halogen, —CN, —$NO_2$, —$NHR^{1c}$, —$N_3$, —OH, —SH, —$SO_3H$, $C_{1-8}$ alkyl, $C_{1-8}$ alkoxy, —$COOR^{1c}$, —$C(O)NHR^{1c}$, and —$C(O)R^{1d}$;
$R^3$ is -$L^3$-$R^{3a}$;
-$L^3$- is selected from the group consisting of a bond, —O—, —$O(CH_2)_n$—, —$(CH_2)_n$—, —$NHC(O)$—, —$NHS(O)_2$—, and —$S(O)_2$—, wherein subscript n is 1, 2, 3, 4, 5, or 6;
$R^{3a}$ is selected from the group consisting of $C_{6-14}$ aryl, $C_{3-8}$ cycloalkyl, 5- to 10-membered heteroaryl, 3- to 10-membered heterocyclyl, ($C_{6-14}$ aryl)sulfonyl, ($C_{1-8}$ alkyl)sulfonyl, ($C_{3-8}$ cycloalkyl)sulfonyl, $C_{1-8}$ alkyl, $C_{2-8}$ alkenyl, and $C_{2-8}$ alkynyl, each of which is optionally substituted with one or more $R^{3b}$;
each $R^{3b}$ is independently selected from the group consisting of halogen, —CN, —$NO_2$, —$NHR^{3c}$, —$N_3$, —OH, —SH, —$SO_3H$, $C_{1-8}$ alkyl, $C_{1-8}$ alkoxy, —$COOR^{3c}$, —$C(O)NHR^{3c}$, and —$C(O)R^{3d}$, wherein each $R^{3c}$ is independently selected from the group consisting of H and $C_{1-4}$ alkyl and each $R^{3d}$ is independently $C_{1-4}$ alkyl;

$R^4$ is selected from the group consisting of H and $C_{1-6}$ alkyl;

subscript y is 1, 2, 3, 4, 5, or 6;

subscript z is 0 or 1;

$R^5$ is selected from the group consisting of H and $C_{1-6}$ alkyl;

alternatively, $R^4$ and $R^5$ are taken together to form 4- to 10-membered heterocyclylene;

$R^6$ is selected from the group consisting of 3- to 10-membered heterocyclyl, 5- to 10-membered heteroaryl, $C_{3-8}$ cycloalkyl, $C_{6-14}$ aryl, and $C_{7-22}$ arylalkyl, each of which is optionally substituted with one or more $R^{6a}$; and each $R^{6a}$ is independently selected from the group consisting of halogen, —CN, —NO$_2$, —NHR$^{6b}$, —N$_3$, —OH, —SH, —SO$_3$H, $C_{1-8}$ alkyl, $C_{1-8}$ alkoxy, —COOR$^{6b}$, —C(O)NHR$^{6b}$, and —C(O)R$^{6c}$, wherein each $R^{6b}$ is independently selected from the group consisting of H and $C_{1-4}$ alkyl and each $R^{6c}$ is independently $C_{1-4}$ alkyl.

In some embodiments, the N-substituted indole is a compound of Formula I wherein -L$^1$- is —CH$_2$—, and $R^{1a}$ is phenyl which is optionally substituted with one or more $R^{1b}$ (e.g., 1, 2, 3, 4, or 5 $R^{1b}$). Each $R^{1b}$ may independently be, for example, $C_{1-8}$ alkyl or $C_{1-8}$ alkoxy.

In some embodiments, each $R^{1b}$ is independently methyl, ethyl, n-propyl, isopropyl, n-butyl, isobutyl, sec-butyl, tert-butyl, n-pentyl, isopentyl, n-hexyl, or branched hexyl. In some embodiments, each $R^{1b}$ independently is methoxy, ethoxy, n-propoxy, isopropoxy, n-butoxy, isobutoxy, sec-butoxy, tert-butoxy, n-pentyloxy, isopentyloxy, n-hexyloxy, or branched hexyloxy. In some embodiments, each $R^{1b}$ independently is methyl or methoxy.

In some embodiments, -L$^3$- is selected from the group consisting of —O— and —OCH$_2$— in compounds of Formula I, and $R^{3a}$ is phenyl which is optionally substituted with one or more $R^{3b}$. For example, the compound may have the structure:

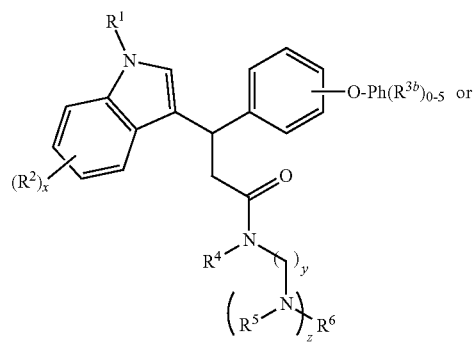

-continued

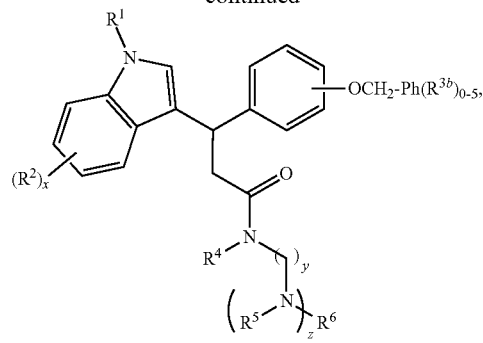

wherein the moiety —OPh(R$^{3b}$)$_{0-5}$ or —OPh(R$^{3b}$)$_{0-5}$ is bonded at the 2-, 3-, or 4-position of the phenyl ring to which it is connected. In some embodiments, the moiety —OPh(R$^{3b}$)$_{0-5}$ or —OPh(R$^{3b}$)$_{0-5}$ is bonded at the 3-position of the phenyl ring. In some embodiments $R^{3a}$ is unsubstituted phenyl, such that $R^3$ is phenoxy (e.g., 3-phenoxy) or benzyloxy (e.g., 3-benzyloxy).

In some embodiments, $R^4$ in compounds of Formula I is H or methyl. In some embodiments, subscript y in of Formula I is 1 or 2. In some embodiments, subscript z is 1 and $R^4$ and $R^5$ are taken together to form 4- to 10-membered heterocyclylene (e.g., $R^4$ and $R^5$ are taken together to form imidazolidin-1,3-diyl or piperazin-1,4-diyl).

In some embodiments, $R^6$ is selected from the group consisting of 3- to 6-membered heterocyclyl, 5- to 6-membered heteroaryl, $C_{6-10}$ aryl, and $C_{7-12}$ arylalkyl. $R^6$ may be, for example, furan-2-yl, phenyl, pyridin-4-yl, pyrrolidin-1-yl, and benzhydryl, each of which is optionally substituted with one or more $R^{6a}$. In some embodiments, $R^{6a}$ is halogen (e.g., F, Cl, or Br). In some embodiments, subscript x is 0 in compounds of Formula I.

In some embodiments, the N-substituted indole is selected from the group consisting of:

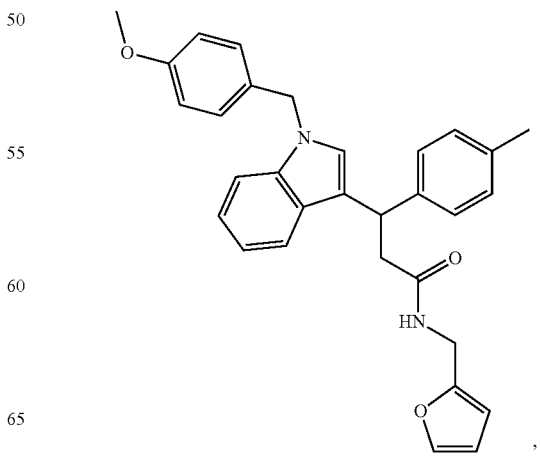

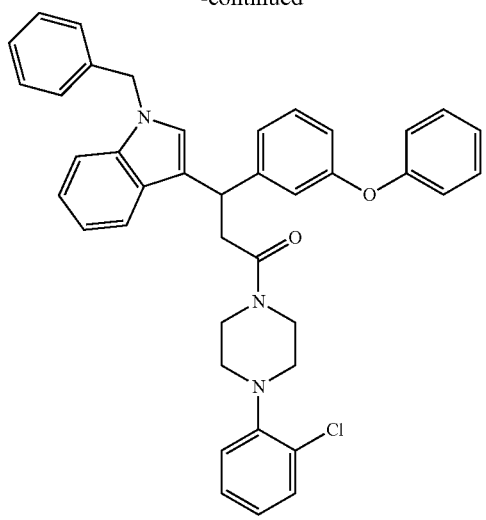
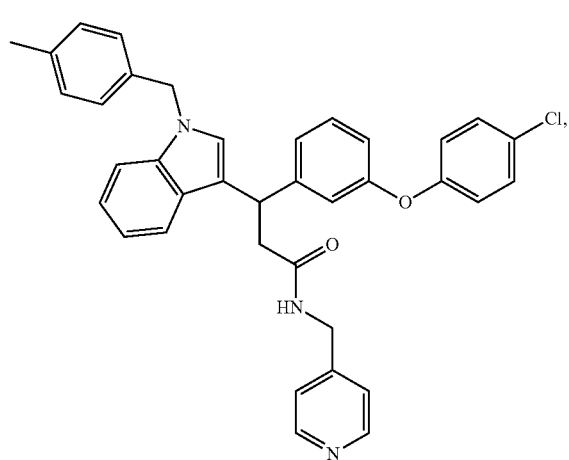
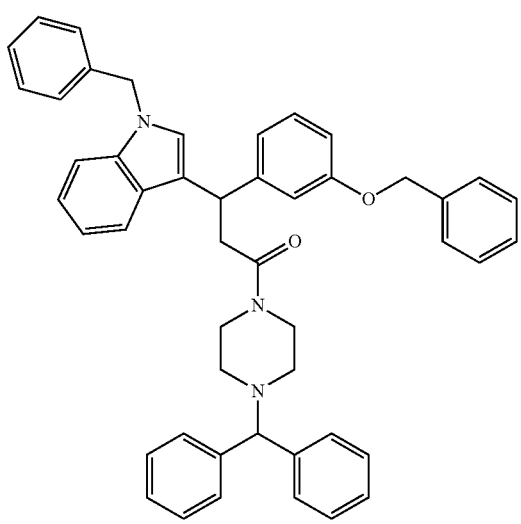
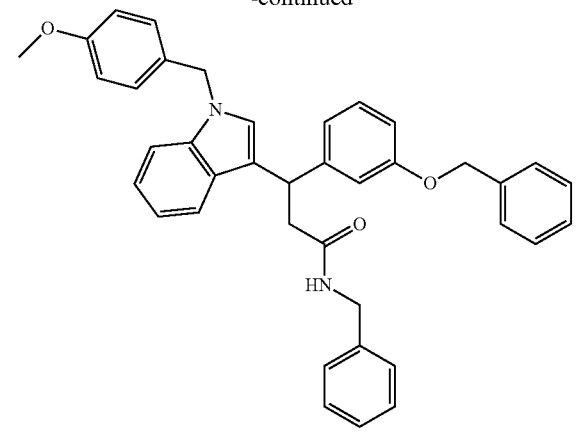
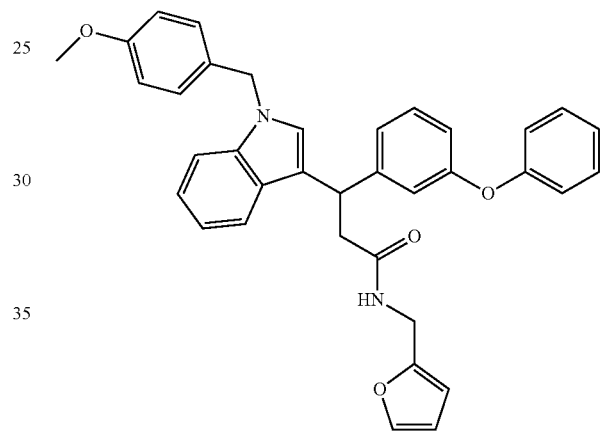
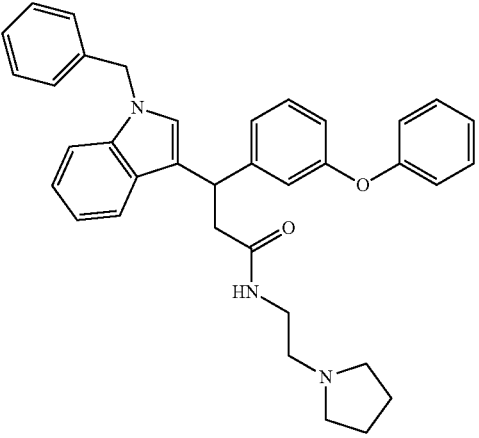
and
pharmaceutically acceptable salts thereof.

In certain embodiments, the compound and/or composition comprises the general formula (IX) (termed Compound 9, DA-0218):

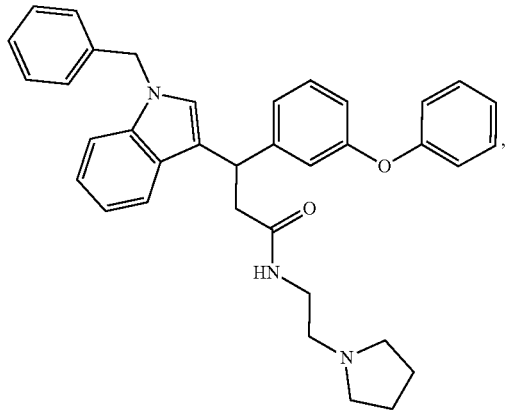

(IX)

or a pharmaceutically acceptable salt, solvate, hydrate, pro rug, or derivative thereof, and for pharmaceutical compositions, a pharmaceutically acceptable carrier and/or excipient.

Also provided herein are compounds according to Formula II:

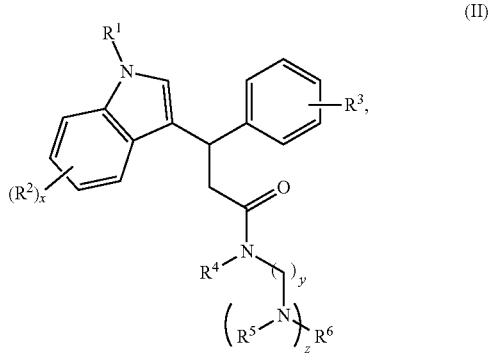

(II)

or a pharmaceutically acceptable salt thereof, wherein:
$R^1$ is -$L^1$-$R^{1a}$;
-$L^1$- is selected from the group consisting of —(CH$_2$)$_n$—, —NHS(O)$_2$—, —NHC(O)—, and —S(O)$_2$—, wherein subscript n is 1, 2, 3, 4, 5, or 6;
$R^{1a}$ is selected from the group consisting of C$_{6-14}$ aryl, C$_{3-8}$ cycloalkyl, 5- to 10-membered heteroaryl, 3- to 10-membered heterocyclyl, (C$_{6-14}$ aryl)sulfonyl, (C$_{1-8}$ alkyl)sulfonyl, (C$_{3-8}$ cycloalkyl)sulfonyl, C$_{2-8}$ alkyl, C$_{2-8}$ alkenyl, and C$_{2-8}$ alkynyl, each of which is optionally substituted with one or more $R^{1b}$;
each $R^{1b}$ is independently selected from the group consisting of halogen, —CN, —NO$_2$, —NHR$^{1c}$, —N═C(OH)R$^{1d}$, —N$_3$, —OH, —SH, —SO$_3$H, C$_{1-8}$ alkyl, C$_{1-8}$ alkoxy, C$_{2-8}$ alkenyl, C$_{2-8}$ alkynyl, C$_{3-10}$ cycloalkyl, —COOR$^{1c}$, —C(O)NHR$^{1c}$, and —C(O)R$^{1d}$, wherein each $R^{1c}$ is independently selected from the group consisting of H and C$_{1-4}$ alkyl and each $R^{1d}$ is independently C$_{1-4}$ alkyl;

subscript x is 0, 1, 2, 3, or 4;
each $R^2$ is independently selected from the group consisting of halogen, —CN, —NO$_2$, —NHR$^{1c}$, —N$_3$, —OH, —SH, —SO$_3$H, C$_{1-8}$ alkyl, C$_{1-8}$ alkoxy, —COOR$^{1c}$, —C(O)NHR$^{1c}$, and —C(O)R$^{1d}$;
$R^3$ is -$L^3$-$R^{3a}$;
-$L^3$- is selected from the group consisting of a bond, —O—, —O(CH$_2$)$_n$—, —(CH$_2$)$_n$—, —NHC(O)—, —NHS(O)$_2$—, and —S(O)$_2$—, wherein subscript n is 1, 2, 3, 4, 5, or 6;
$R^{3a}$ is selected from the group consisting of C$_{6-14}$ aryl, C$_{3-8}$ cycloalkyl, 5- to 10-membered heteroaryl, 3- to 10-membered heterocyclyl, (C$_{6-14}$ aryl)sulfonyl, (C$_{1-8}$ alkyl)sulfonyl, (C$_{3-8}$ cycloalkyl)sulfonyl, C$_{1-8}$ alkyl, C$_{2-8}$ alkenyl, and C$_{2-8}$ alkynyl, each of which is optionally substituted with one or more $R^{3b}$;
each $R^{3b}$ is independently selected from the group consisting of halogen, —CN, —NO$_2$, —NHR$^{3c}$, —N$_3$, —OH, —SH, —SO$_3$H, C$_{1-8}$ alkyl, C$_{1-8}$ alkoxy, —COOR$^{3c}$, —C(O)NHR$^{3c}$, and —C(O)R$^{3d}$, wherein each $R^{3c}$ is independently selected from the group consisting of H and C$_{1-4}$ alkyl and each $R^{3d}$ is independently C$_{1-4}$ alkyl;
$R^4$ is selected from the group consisting of H and C$_{1-6}$ alkyl;
subscript y is 1, 2, 3, 4, 5, or 6;
subscript z is 0 or 1;
$R^5$ is selected from the group consisting of H and C$_{1-6}$ alkyl;
alternatively, $R^4$ and $R^5$ are taken together to form 4- to 10-membered heterocyclylene;
$R^6$ is selected from the group consisting of 3- to 10-membered heterocyclyl, 5- to 10-membered heteroaryl, C$_{3-8}$ cycloalkyl, C$_{6-14}$ aryl, and C$_{7-22}$ arylalkyl, each of which is optionally substituted with one or more $R^{6b}$; and
each $R^{6b}$ is independently selected from the group consisting of halogen, —CN, —NO$_2$, —NHR$^6$C, —N$_3$, —OH, —SH, —SO$_3$H, C$_{1-8}$ alkyl, C$_{1-8}$ alkoxy, —COOR$^{6c}$, —C(O)NHR$^{6c}$, and —C(O)R$^{6d}$, wherein each $R^{6c}$ is independently selected from the group consisting of H and C$_{1-4}$ alkyl and each $R^{6d}$ is independently C$_{1-4}$ alkyl;
provided that $R^6$ is substituted with at least one $R^{1b}$ when: -$L^1$- is —CH$_2$—; $R^{1a}$ is phenyl, 4-fluorophenyl, 4-methylphenyl, or 4-methoxyphenyl; subscript w is 0; $R^3$ is 3-phenoxy or 3-(4-chlorophenoxy); subscript y is 2 or 3; and $R^6$ is pyrrolidin-1-yl, morpholin-4-yl, piperidin-1-yl, or 2-methyl-piperidin-1-yl.

In some embodiments, -$L^1$- is selected from the group consisting of —NHS(O)$_2$— and —S(O)$_2$—. In some such embodiments, Ria is a 5- or 6-membered, saturated, partially saturated, or unsaturated heterocycle comprising 1-3 heteroatoms independently selected from the group consisting of N, O, and S. In some embodiments, Ria is selected from the group consisting of 1,3,4-thiadiazol-2-yl and 1,3-thiazol-2-yl, each of which is optionally substituted with one or more $R^{1b}$. In some embodiments, $R^{1a}$ is unsubstituted 1,3-thiazol-2-yl. In some embodiments, $R^{1a}$ is 5-((1-hydroxyethylidene)amino)-1,3,4-thiadiazol-2-yl.

In some embodiments, -$L^1$- is —NHC(O)—. In some such embodiments, $R^{1a}$ is (C$_{1-8}$ alkyl)sulfonyl which is optionally substituted with one or more $R^{1b}$. $R^{1a}$ may be, for example, unsubstituted or substituted methanesulfonyl, ethanesulfonyl, n-propanesulfonyl, isopropanesulfonyl, n-butanesulfonyl, isobutanesulfonyl, sec-butanesulfonyl, or tert-butanesulfonyl. In some embodiments, $R^{1a}$ is unsubstituted methanesulfonyl.

In some embodiments, the compound of Formula II is selected from the group consisting of:

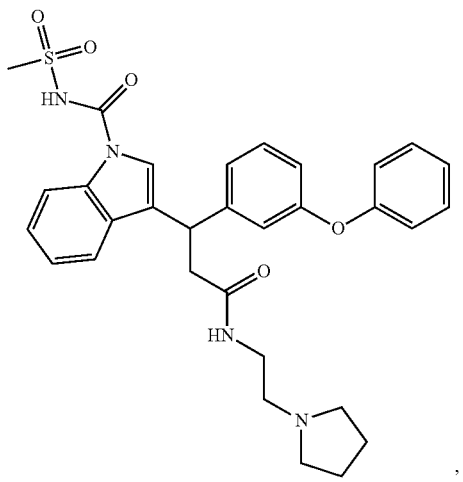

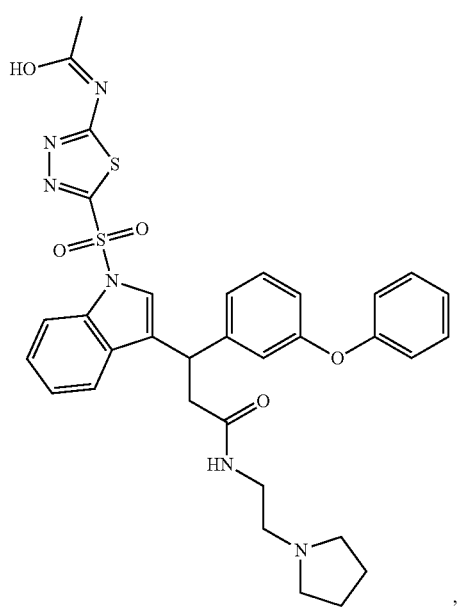

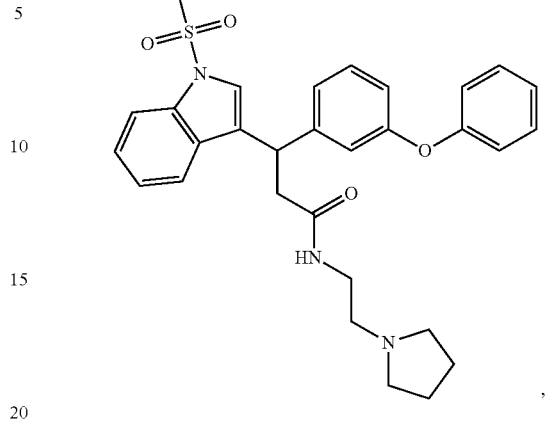

and
pharmaceutically acceptable salts thereof.

In some embodiments, -$L^3$- is —O—, and $R^{3a}$ is phenyl which is optionally substituted with one or more $R^{3b}$. In some embodiments, the moiety —OPh($R^{3b}$)$_{0-5}$ is bonded at the 2-, 3-, or 4-position of the phenyl ring to which it is connected. In some embodiments, the moiety —OPh($R^{3b}$)$_{0-5}$ is bonded at the 3-position of the phenyl ring. In some embodiments $R^{3a}$ is unsubstituted phenyl, such that $R^3$ is phenoxy (e.g., 3-phenoxy) in compounds of Formula II.

In some embodiments, subscript y is 1 and subscript z is 0.

In some embodiments, $R^6$ is pyrrolidin-1-yl which is optionally substituted with one or more $R^{6a}$.

The starting materials and reagents used in preparing N-substituted indoles according to the present disclosure are either available from commercial suppliers or are prepared by methods known to those skilled in the art following procedures set forth in references such as Fieser and Fieser's Reagents for Organic Synthesis, Vol. 1-28 (Wiley, 2016); March's Advanced Organic Chemistry, 7$^{th}$ Ed. (Wiley, 2013); and Larock's Comprehensive Organic Transformations, 2$^{nd}$ Ed. (Wiley, 1999). The starting materials and the intermediates of the reaction can be isolated and purified if desired using conventional techniques including, but not limited to, filtration, distillation, crystallization, chromatography and the like. Such materials can be characterized using conventional means, including measuring physical constants and obtaining spectral data.

Reactions employed for compound synthesis are generally conducted at atmospheric pressure over a temperature range of from about −78° C. to about 250° C. For example, reactions can be conducted at from about 0° C. to about 125° C., or at about room (or ambient) temperature, e.g., about 20° C. In some embodiments, reactions are conducted at about 0° C., 20° C., 25° C., 90° C., 100° C., 110° C., 125° C., 150° C., 175° C., or 200° C. In some embodiments, reactions are conducted starting at a first temperature (e.g., about −78° C. or about 0° C.), and allowed to warm to a higher second temperature (e.g., about 20° C. or about 25° C.).

An exemplary route for the preparation of N-substituted indoles according to the present disclosure is depicted in Scheme 1. Substituted benzaldehyde (i) is condensed with malonate (ii), wherein R is $C_{1-6}$ alkyl (e.g., ethyl), to provide benzylidene malonate (ii). Benzylidene malonate (ii) can then be reacted with a substituted indole to provide ((1H-indol-3-yl)methyl)malonate (iii). Decarboxylation and saponification of the malonate provides (1H-indol-3-yl)propanoic acid (iv), which can be coupled with a suitably functionalized amine to provide (1H-indol-3-yl)propanamide (v). The propanamide may then be reacted with $R^1$—X, wherein X is a suitable leaving group (e.g., chloride) to form the compound of Formula II. Compounds of Formula I may be prepared in similar fashion.

other disorders or maladies, such as steroids (e.g., cortisone, hydrocortisone), NSAIDS, analgesics, and opioids to name a few. The compounds may be administered in the form of compounds per se, or as pharmaceutical compositions comprising a compound as provided herein.

Pharmaceutical compositions comprising the compound(s) may be manufactured by means of conventional mixing, dissolving, granulating, dragee-making levigating, emulsifying, encapsulating, entrapping or lyophilization processes. The compositions may be formulated in conventional manner using one or more physiologically acceptable carriers, diluents, excipients or auxiliaries which facilitate processing of the compounds into preparations which can be used pharmaceutically.

The compounds may be formulated in the pharmaceutical composition per se, or in the form of a hydrate, solvate, N-oxide or pharmaceutically acceptable salt, as previously described. Typically, such salts are more soluble in aqueous solutions than the corresponding free acids and bases, but salts having lower solubility than the corresponding free acids and bases may also be formed.

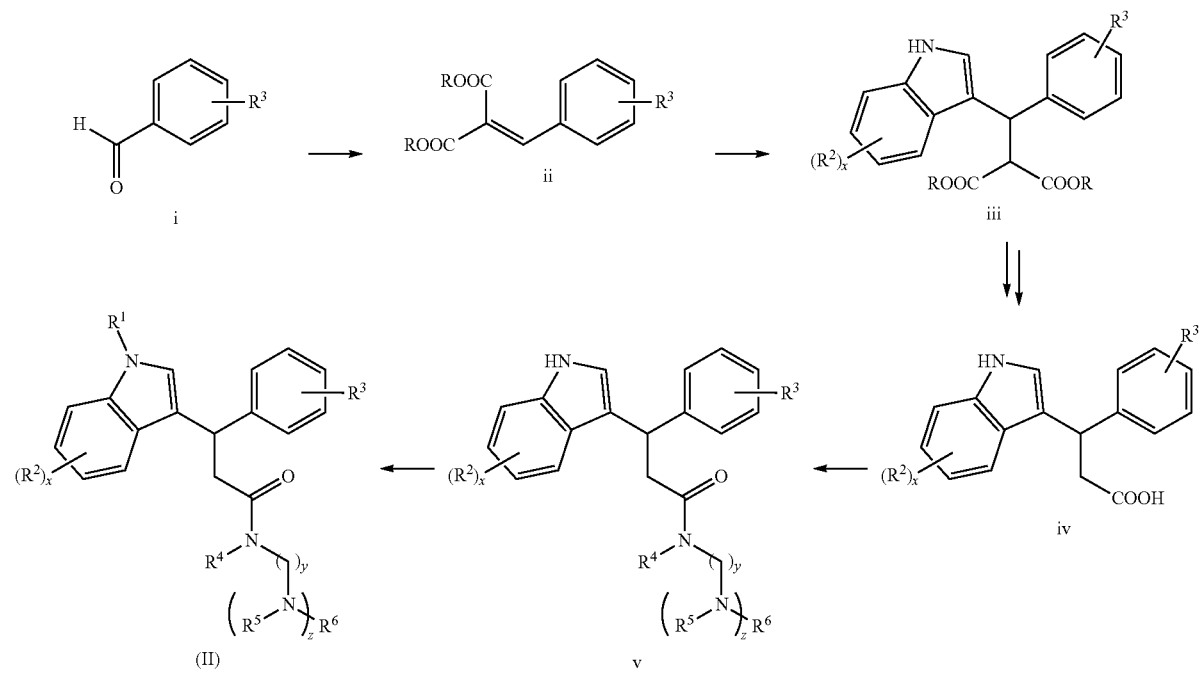

N-substituted indoles according to Formula I and Formula II as described herein may be formulated as pharmaceutical compositions containing an appropriate carrier, excipient or diluent. The exact nature of the carrier, excipient or diluent will depend upon the desired use for the composition and may range from being suitable or acceptable for veterinary uses to being suitable or acceptable for human use. The composition may optionally include one or more additional compounds.

When used to treat or prevent such diseases, the compounds described herein may be administered singly, as mixtures of one or more compounds or in mixture or combination with other agents useful for treating such diseases and/or the symptoms associated with such diseases. The compounds may also be administered in mixture or in combination with agents useful to treat the same and/or Pharmaceutical compositions may take a form suitable for virtually any mode of administration, including, for example, topical, ocular, oral, buccal, systemic, nasal, injection, transdermal, rectal, vaginal, etc., or a form suitable for administration by inhalation or insufflation.

For topical administration, the compound(s) may be formulated as solutions, gels, ointments, creams, suspensions, etc. as are well-known in the art. Systemic formulations include those designed for administration by injection, e.g., subcutaneous, intravenous, intramuscular, intrathecal, perineural, or intraperitoneal injection, as well as those designed for transdermal, transmucosal oral or pulmonary administration.

Useful injectable preparations include sterile suspensions, solutions or emulsions of the active compound(s) in aqueous or oily vehicles. The compositions may also contain formulating agents, such as suspending, stabilizing and/or dispersing agent. The formulations for injection may be presented in unit dosage form, e.g., in ampules or in multidose containers, and may contain added preservatives. Alternatively, the injectable formulation may be provided in powder form for reconstitution with a suitable vehicle, including but not limited to sterile pyrogen free water, buffer, dextrose solution, etc., before use. To this end, the active compound(s) may be dried by any art-known technique, such as lyophilization, and reconstituted prior to use.

For transmucosal administration, penetrants appropriate to the barrier to be permeated are used in the formulation. Such penetrants are known in the art.

For oral administration, the pharmaceutical compositions may take the form of, for example, lozenges, tablets or capsules prepared by conventional means with pharmaceutically acceptable excipients such as binding agents (e.g., pregelatinised maize starch, polyvinylpyrrolidone or hydroxypropyl methylcellulose); fillers (e.g., lactose, microcrystalline cellulose or calcium hydrogen phosphate); lubricants (e.g., magnesium stearate, talc or silica); disintegrants (e.g., potato starch or sodium starch glycolate); or wetting agents (e.g., sodium lauryl sulfate). The tablets may be coated by methods well known in the art with, for example, sugars, films or enteric coatings.

Liquid preparations for oral administration may take the form of, for example, elixirs, solutions, syrups or suspensions, or they may be presented as a dry product for constitution with water or other suitable vehicle before use. Such liquid preparations may be prepared by conventional means with pharmaceutically acceptable additives such as suspending agents (e.g., sorbitol syrup, cellulose derivatives or hydrogenated edible fats); emulsifying agents (e.g., lecithin or acacia); non-aqueous vehicles (e.g., almond oil, oily esters, ethyl alcohol, Cremophore™ or fractionated vegetable oils); and preservatives (e.g., methyl or propyl-p-hydroxybenzoates or sorbic acid). The preparations may also contain buffer salts, preservatives, flavoring, coloring and sweetening agents as appropriate.

Preparations for oral administration may be suitably formulated to give controlled release of the compound, as is well known. For buccal administration, the compositions may take the form of tablets or lozenges formulated in conventional manner. For rectal and vaginal routes of administration, the compound(s) may be formulated as solutions (for retention enemas) suppositories or ointments containing conventional suppository bases such as cocoa butter or other glycerides.

For nasal administration or administration by inhalation or insufflation, the compound(s) can be conveniently delivered in the form of an aerosol spray from pressurized packs or a nebulizer with the use of a suitable propellant, e.g., dichlorodifluoromethane, trichlorofluoromethane, dichlorotetrafluoroethane, fluorocarbons, carbon dioxide or other suitable gas. In the case of a pressurized aerosol, the dosage unit may be determined by providing a valve to deliver a metered amount. Capsules and cartridges for use in an inhaler or insufflator (for example capsules and cartridges comprised of gelatin) may be formulated containing a powder mix of the compound and a suitable powder base such as lactose or starch.

For ocular administration, the compound(s) may be formulated as a solution, emulsion, suspension, etc. suitable for administration to the eye. A variety of vehicles suitable for administering compounds to the eye are known in the art.

For prolonged delivery, the compound(s) can be formulated as a depot preparation for administration by implantation or intramuscular injection. The compound(s) may be formulated with suitable polymeric or hydrophobic materials (e.g., as an emulsion in an acceptable oil) or ion exchange resins, or as sparingly soluble derivatives, e.g., as a sparingly soluble salt. Alternatively, transdermal delivery systems manufactured as an adhesive disc or patch which slowly releases the compound(s) for percutaneous absorption may be used. To this end, permeation enhancers may be used to facilitate transdermal penetration of the compound(s).

Alternatively, other pharmaceutical delivery systems may be employed. Liposomes and emulsions are well-known examples of delivery vehicles that may be used to deliver compound(s). Certain organic solvents such as dimethyl sulfoxide (DMSO) may also be employed, although usually at the cost of greater toxicity.

The pharmaceutical compositions may, if desired, be presented in a pack or dispenser device which may contain one or more unit dosage forms containing the compound(s). The pack may, for example, comprise metal or plastic foil, such as a blister pack. The pack or dispenser device may be accompanied by instructions for administration.

The compound(s) described herein, or compositions thereof, will generally be used in an amount effective to achieve the intended result, for example in an amount effective to treat or prevent the particular disease being treated. By therapeutic benefit is meant eradication or amelioration of the underlying disorder being treated and/or eradication or amelioration of one or more of the symptoms associated with the underlying disorder such that the patient reports an improvement in feeling or condition, notwithstanding that the patient may still be afflicted with the underlying disorder. Therapeutic benefit also generally includes halting or slowing the progression of the disease, regardless of whether improvement is realized.

The amount of compound(s) administered will depend upon a variety of factors, including, for example, the particular indication being treated, the mode of administration, whether the desired benefit is prophylactic or therapeutic, the severity of the indication being treated and the age and weight of the patient, the bioavailability of the particular compound(s) the conversation rate and efficiency into active drug compound under the selected route of administration, etc.

Determination of an effective dosage of compound(s) for a particular use and mode of administration is well within the capabilities of those skilled in the art. Effective dosages may be estimated initially from in vitro activity and metabolism assays. For example, an initial dosage of compound for use in animals may be formulated to achieve a circulating blood or serum concentration of the metabolite active compound that is at or above an IC50 of the particular compound as measured in as in vitro assay. Calculating dosages to achieve such circulating blood or serum concentrations taking into account the bioavailability of the particular compound via the desired route of administration is well within the capabilities of skilled artisans. Initial dosages of compound can also be estimated from in vivo data, such as animal models. Animal models useful for testing the efficacy of the active metabolites to treat or prevent the various diseases described above are well-known in the art. Animal models suitable for testing the bioavailability and/or metabolism of compounds into active metabolites are also well-known. Ordinarily skilled artisans can routinely adapt such information to determine dosages of particular compounds suitable for human administration.

Dosage amounts will typically be in the range of from about 0.0001 mg/kg/day, 0.001 mg/kg/day or 0.01 mg/kg/ day to about 100 mg/kg/day, but may be higher or lower, depending upon, among other factors, the activity of the active compound, the bioavailability of the compound, its metabolism kinetics and other pharmacokinetic properties, the mode of administration and various other factors, discussed above. The dose of the Nav1.7 inhibitor can be, for example, about 0.01-750 mg/kg, or about 0.01-500 mg/kg, or about 0.01-250 mg/kg, or about 0.01-100 mg/kg, or about 0.1-50 mg/kg, or about 1-25 mg/kg, or about 1-10 mg/kg, or about 5-10 mg/kg, or about 1-5 mg/kg. The dose of the Nav1.7 inhibitor can be about 0.01, 0.05, 0.1, 0.5, 1, 5, 10, 15, 20, 25, 30, 35, 40, 45, 50, 55, 60, 65, 70, 75, 80, 85, 90, 95, or 100 mg/kg.

Dosage amount and interval may be adjusted individually to provide plasma levels of the compound(s) and/or active metabolite compound(s) which are sufficient to maintain therapeutic or prophylactic effect. For example, the compounds may be administered once per week, several times per week (e.g., every other day), once per day or multiple times per day, depending upon, among other things, the mode of administration, the specific indication being treated and the judgment of the prescribing physician. In cases of local administration or selective uptake, such as local topical administration, the effective local concentration of compound(s) and/or active metabolite compound(s) may not be related to plasma concentration. Skilled artisans will be able to optimize effective dosages without undue experimentation.

III. Examples

Example 1. Computer-Aided Discovery of a New Nav1.7 Inhibitor for Treatment of Itch and Pain Voltage-gated sodium channel subtype Nav1.7 has been previously validated as a perspective target for the development of new selective inhibitors with analgesic and anti-itch activity. The following example describes a virtual screening workflow that included a structure-based similarity search of a library of 1.5 million pre-synthetized compounds, followed by docking of the selected (structures) compounds, and molecular dynamics simulation of the ligand-protein complex. Patch clamp-experiments were performed in Nav1.7-expressing HEK-293 stable cell line and in mouse and human dorsal root ganglia (DRG) neuron cultures to test sodium current inhibition. Formalin-induced inflammatory pain model, paclitaxel-induced neuropathic pain model, histamine-induced itch model, and mouse lymphoma model of chronic itch were used to confirm in vivo activity of the selected compound. After in silico screening, nine compounds were selected for experimental assessment in vitro. Of those, four compounds inhibited sodium currents in Nav1.7-expressing human embryonic kidney 293 cells by 29% or greater (P<0.05). Compound 9 (3-(1-benzyl-1H-indol-3-yl)-3-(3-phenoxyphenyl)-N-(2-(pyrrolidin-1-yl) ethyl)propanamide, referred to as DA-0218) reduced sodium current by 80% with a 50% inhibition concentration of 0.74 µM (95% CI, 0.35 to 1.56 µM), but had no effects on Nav1.5-expressing human embryonic kidney 293 cells. In mouse and human dorsal root ganglion neurons, DA-0218 reduced sodium currents by 17% (95% CI, 6 to 28%) and 22% (95% CI, 9 to 35%), respectively. The inhibition was greatly potentiated in paclitaxel-treated mouse neurons. Intraperitoneal and intrathecal administration of the compound reduced formalin-induced phase II inflammatory pain behavior in mice by 76% (95% CI, 48 to 100%) and 80% (95% CI, 68 to 92%), respectively. Intrathecal administration of DA-0218 produced acute reduction in paclitaxel-induced mechanical allodynia, and inhibited histamine-induced acute itch and lymphoma-induced chronic itch. The computer-aided drug discovery approach yielded a new Nav1.7 inhibitor that shows analgesic and anti-itch activity in mouse models.

A. Materials and Methods

Virtual Screening of a Chemical Library.

To perform similarity search, two compounds with well documented selective inhibitor activity towards Nav1.7 were selected as query structures: PF-05089771 and GX-936. Both bind to the same site of VSD4 of Nav1.7 and exhibit a remarkably selective inhibition of Nav1.7 sodium currents. PF-05089771 was advanced to stage 2 clinical trial; GX-936 is characterized by available crystal structure of the ligand-protein complex. For virtual screening, a database of 1.5 million compounds was downloaded from the Chemdiv website (chemdiv.com, ChemDiv Inc., San Diego, CA). The downloaded structures were converted in a 3-dimensional SD format and were used for similarity search analysis.

Similarity searching was performed using the FTrees algorithm (FTrees 3.4 version 2.3.2; BioSolveIT GmbH, Sankt Augustin, Germany, 2017). The search for similarity using FTrees is made up of two main steps: (1) defining the compound of the input query and the database where the query compound is screened against the database compounds library and (2) calculating similarity by using the generated feature trees and specifying the compounds as hits with a specified threshold of similarity. The algorithm of FTrees uses the shape and pharmacophore properties of query molecule to represent them as the interconnected fragments. Several pharmacophore properties are considered in the similarity search, including hydrophobic features, the total number of ring closures, volume, hydrogen bond donors and acceptors, and aromatic properties. For assessing the "local" similarity of particular nodes in the form of Tanimoto coefficient, the values of each node are made with the properties and calculated as a numerical fingerprint. The similarity of the "global" feature tree is determined as the normalized sum of the local similarities of the mapped nodes by mapping the nodes of one feature tree onto the nodes of the other. A similarity threshold value of 0.5 against the compounds from the Chemdiv database was used to screen for potential Nav1.7 inhibitors.

Molecular docking studies were performed using the crystal structure of the Nav1.7 ion channel obtained from the Protein Database (PDB, protein code 5EK0). The missing side chains of partially resolved residues and the missing loop sequences were reconstructed by using the Modeller software (Webb et al. 2014; Current Protocols in Bioinformatics. 47: 5.6.1-5.6.32). The refined structure of the protein underwent energy minimization in an explicit water environment, being embedded in a lipid bilayer using an OPLS-2015 force field (Desmond module of Schrodinger suite; Desmond Molecular Dynamics System, version 3.8, D. E. Shaw Research, New York, NY, 2015). The VSD4 binding site in complex with the co-crystalized ligand (GX-936) was loaded into the protein preparation module of the BiosolveIT software (GmbH, St Augustin, Germany). The atomic coordinates for the binding site were converged and the resulting model was then used for docking. Binding positions of each ligand retrieved from similarity search were generated, scored for predicted binding affinity, and ranked using the FlexX algorithm (LeadIT software package version 2.3.2, BioSolveIT GmbH, St Augustin, Germany). Protein residues interacting with the ligand were noted in each docking simulation. Ten poses were generated for each ligand and scored using SeeSAR software which uses the HYDE scoring function (SeeSAR version 7.0; BioSolveIT GmbH, Sankt Augustin, Germany, 2018, biosolveit.de/SeeSAR). In HYDE, the values are estimated based on the difference between the bound and unbound state, based on an atomic log P-based mathematical kernel. The system has not been trained to specific targets; instead, H-bond contribution and dehydration ("desolvation") are intrinsically balanced without weighting parameters as seen in all force fields. By design, HYDE allows the visualization of ΔG on atoms.

Molecular dynamics simulations (MDS) with an explicit membrane model with OPLS_2005 force field were conducted using Desmond v3.8 (Desmond Molecular Dynamics System, version 3.8, D. E. Shaw Research, New York, NY, 2015). The cell membrane was built for the protein complex according to the membrane coordinates obtained from the membrane orientation (OPM) database (opm.phar.umich.edu; Lomize et al. 2012; *Nucleic Acids Res;* 40: D370-6), the system was then placed in a 10 Å side-length orthorhombic box solved with simple point charge (SPC) water and neutralized with a suitable amount of counter ions. OPLS_2005 force field was used for energy minimization of the complex system, with setting of the maximum interaction to 2000 and setting the convergence threshold to 1.0 kcal/mol/A. The system performed 10 ns of NPT simulation at a temperature of 300 K set by Nose-Hoover thermostat and 1,01325 bar pressure set by Martyna-Tobias-Klein barostats before the simulation started to relax the complexes. For the production run, the MDS was running for 100 ns, where the energy and trajectory have been recorded at 1.2 ps and 4.8 ps, respectively, and the statistical analysis was carried out using the data obtained. To describe and compare the stability of the docking complexes, root mean square deviation (RMSD), potential energy (U), ligand-protein interaction and root mean square fluctuation (RMSF) were used.

Animals.

C57BL/6 mice and NOD.CB-17-Prkdc$^{scid}$ mice (stock no.: 001303) were purchased from the Jackson Laboratory (Bar Harbor, Maine). Mice were group-housed on a 12-hour light/12-hour dark cycle at 22±1° C. with free access to food and water. Animals were randomly assigned to each group. Two to five mice were housed in each cage. All the animal experiments were conducted in accordance with the National Institutes of Health Guide for the Care and Use of Laboratory Animals and approved by Institutional Animal Care Use Committee of Duke University. For behavioral tests, mice were habituated to the testing environment daily for at least two days before testing. Animal behaviors were tested blindly.

Cell Culture and Transfection.

HEK-hNav1.7 stable cell line was purchased from SB Drug Discovery (Glasgow, United Kingdom). Human embryonic kidney 293 (HEK293) cells were obtained from the ATCC and maintained at the Duke cell culture facility. Cells were cultured in high-glucose (4.5 g/L) DMEM containing 10% (v/v) FBS (Gibco) and streptomycin/penicillin. For Nav1.7-expressing HEK293 cells, an additional antibiotic, blasticidin, was included. hNav1.5 transfection was performed by Lipofectamine 2000 at 70% confluence using 2 μg cDNA. The transfected cells were cultured in the same growth medium for 48 h before biochemical or electrophysiological studies.

Mouse and Human Dorsal Root Ganglia (DRG) Neurons Culture.

Mouse DRGs were removed aseptically from mice (4-6 weeks) and incubated with collagenase (1.25 mg/mL, Roche)/dispase-II (2.4 units/mL, Roche) in HBSS buffer at 37° C. for 90 min. Cells were mechanically dissociated with a flame polished Pasteur pipette in the presence of 0.05% DNAse I (Sigma). DRG cells were plated on 0.5 mg/mL poly-D-lysine-coated glass cover slips and grown in a neurobasal defined medium (with 10% FBS, 2% B27 supplement, Invitrogen) with 5 μM AraC and 5% carbon dioxide at 36.5° C. DRG neurons were grown for 24 hours before use. Patch clamp recordings were conducted in small-diameter (<25 μm) DRG neurons.

Non-diseased human DRGs were obtained from donors through NDRI with permission of exemption from Duke IRB. Postmortem L3-L5 DRGs were dissected and delivered in ice-cold culture medium to the laboratory at Duke University within 24-72 hours of donor's death. Upon the delivery, DRGs were rapidly dissected from nerve roots and minced in a calcium-free HBSS (Gibco). DRGs were digested at 37° C. in a humidified 02 incubator for 120 min with collagenase Type II (Worthington, 285 units/mg, 12 mg/mL final concentration) and dispase II (Roche, 1 unit/mg, 20 mg/mL) in HBSS buffer. DRGs were mechanically dissociated using fire-polished pipettes, filtered through a 100 μM nylon mesh and centrifuged (500×g for 5 min). The pellet was resuspended, plated on 0.5 mg/mL poly-D-lysine-coated glass coverslips, and cells were grown in Neurobasal medium supplemented with 10% FBS, 2% B-27 supplement, and 1% penicillin/streptomycin. Patch clamp recordings were conducted in small-diameter (<55 μm) DRG neurons (PMID: 26479925).

Whole-Cell Patch-Clamp Recordings in HEK293 Cells and DRG Neurons.

Whole-cell patch-clamp recordings were conducted at room temperature. Patch pipettes pulled from borosilicate capillaries (World Precision Instruments, Inc., Sarasota, FL) were used to record transient Na currents with an Axopatch-200B amplifier with a Digidata 1440A (Axon Instruments, Sunnyvale CA). The resistance was set to 3-4 MΩ when filled with pipette solution. The pipette solution contained (in mmol/L): CsCl 130, NaCl 9, MgCl$_2$ 1, EGTA 10, HEPES 10, adjusted to pH 7.3 with CsOH. The external solution for recording transient Na$^+$ currents contained (in mmol/L): NaCl 131, TEACl 10, CsCl 10, CaCl$_2$) 1, MgCl$_2$ 2, CdCl$_2$ 0.3, 4-aminopyridine 3, HEPES 10, glucose 10, adjusted to pH 7.4 with NaOH. The recording chamber (300 μL) was continuously superfused at 3-4 mL/min. Series resistance was compensated (>80%) and leak subtraction was performed. Data were low-pass-filtered at 2 kHz and sampled at 10 kHz. pClamp10 (Axon Instruments) software was used during experiments and analysis. In voltage-clamp experiments, transient Na+ currents were evoked by a test pulse to 0 mV from the holding potential (−70 mV).

Formalin-Induced Nociceptive Behavioral Test.

The formalin test was conducted following our previously published protocol (Chen, Ji, et al. 2018; *Neurosci Bull;* 34: 98-108). The animals were acclimatized in a transparent acrylic observation chamber for 2 days before test. Vehicle or active compound were administered intrathecally, intraperitoneally, or intraplantarly, 30 min later followed by an intraplantar injection of 20 μL of 5% formalin. After the formalin injection, mice were immediately placed back in the observation chamber, and videoed for 40 min. The videos were analyzed after experiments in a double blinded way. We assessed formalin-evoked spontaneous pain by measuring the time (in seconds) mice spent on licking or flinching the affected paw every 5 min for 45 min. Phase I and Phase II were defined as periods of 0-10 min and 10-40 min, respectively.

For intrathecal injection, spinal cord puncture was made by a Hamilton microsyringe (Hamilton Company, Reno, Nevada) with a 30-G needle between the L5 and L6 level to deliver reagents (5 µL) to the cerebral spinal fluid. For intraperitoneal injection, Vehicle or drug was injected into peritoneal with a 30-G needle. For intraplantar injection, 20 µL vehicle or drug was injected into the surface of the hind paw.

Paclitaxel (PTX) Induced Neuropathic Pain Model.

Intraperitoneal injection of paclitaxel (PTX, 2 mg/kg for multiple injections at day 0, 2, 4, and 6) was given to generate chemotherapy-associated neuropathic pain. Neuropathic pain behavior was tested 3 weeks after PTX injection using a von Frey test. Briefly, animals were habituated to the testing environment daily for at least 2 days before the baseline testing. Animals were confined in boxes placed on an elevated metal mesh floor and the hind paws were stimulated with a series of von Frey hairs with logarithmically increasing stiffness (0.02-2.56 g, Stoelting), presented perpendicularly to the central plantar surface. The 50% paw withdrawal threshold was determined by an up-down method.

Histamine-Induced Itch Model.

Itch behavior was tested blindly. Mice were habituated to the testing environment daily for at least two days before testing. Animals were shaved at the back of the neck in an area of approximately 15×10 mm on the day before the injection of pruritic agent. Animals were put in small plastic chambers (14×18×12 cm) on an elevated metal mesh floor and allowed 30 min for habituation before examination. Mice were then briefly removed from the chamber and given an intradermal injection (50 µL) of 500 µg of histamine in the nape of the neck. After the injection, mouse behaviors were video-recorded and the number of scratches in every 5 min for 30 min was counted. A scratch was counted when a mouse lifted its hindpaw to scratch the shaved region and returned the paw to the floor or to the mouth.

Mouse CTCL Xenograft Model of Chronic Itch.

We used a murine xenograft model of cutaneous T cell lymphoma (CTCL) using immune-deficient mice (NOD.CB17-Prkdcscid, 8-10 weeks old, male). CD4+ MyLa cell line was purchased from Sigma (Catalog #95051032). The cell line was established from a plaque biopsy of an 82-year old male with mycosis fungoides stage II by inclusion of IL-2 and IL-4 in the culture medium. CTCL was generated via intradermal injection of CD4+ Myla cells ($1 \times 10^5$ cells/µL, 100 µL) on the nape of the neck. Itch behavior was tested on Day 50 after inoculation of CTCL cells.

Statistical Methods.

The sample size for each experiment was based on our previous studies that used the same experimental design. See, e.g., Xu, Li, et al. 2013; *Ann Neurol;* 74: 490-5. Therefore, no formal statistical power calculation was conducted. Residual plots and Q-Q plots were used to assess the normality assumption required by parametric tests. Outliers were identified using a robust regression followed by outlier identification method (Motulsky et al. 2006; *BMC bioinformatics.* 7: 123). If outliers were present, results were reported for data including and excluding the outliers. There were no missing data; all data endpoints were collected from each animal as planned by the protocol and accounted for in the statistical analyses. Repeated measures two-way ANOVA was used to model data obtained from repeated measurements over time. For electrophysiology experiments, the overall time×treatment interaction was evaluated. If statistically significant (P<0.05), then pairwise comparisons of all treatments with control at the last timepoint (the primary outcome) were evaluated using a t-statistic with Bonferroni correction. For behavioral experiments, if the overall time×treatment interaction for the time course was statistically significant, then pairwise comparisons with control at each timepoint were performed using a t-statistic, Bonferroni corrected for the number of active treatment groups. Inflammatory pain model data were analyzed stratified by Phase (where the effect of treatment in Phase II was considered the primary outcome). Reported p-values are adjusted for multiple testing. The criterion for statistical significance was P<0.05. All statistical hypotheses were two-tailed unless noted otherwise. All data were expressed as means±SD.

B. Results

Virtual Screening Identifies 9 New Compounds as Potential Inhibitors of Nav1.7.

A tiered approach was utilized to identify selective inhibitors of Nav1.7, which included similarity search, followed by docking and molecular dynamic simulation (FIG. 1). Similarity search of the ChemDiv database (ChemDiv Inc, San Diego, CA) containing 1.5 million pre-synthetized compounds yielded a set of 2000 compounds structurally similar to the query molecules—known inhibitors of Nav1.7. This set of compounds was subjected to docking to predict the predominant binding mode(s) of a ligand with the target protein. Crystal structure of the homotetrameric NavAb/Nav1.7 chimera was utilized to model the extracellular loops of voltage sensor domain 4 (VSD4). Each of the 2000 compounds was docked into a binding site and assessed for ligand affinity. Without wishing to be bound by any particular theory, it is believed that binding of a compound to the VSD4 site can promote or stabilize an inactivated state of Nav1.7, thus preventing it from transition to a closed/resting state which is necessary for propagating a new depolarization in pain-sensing neurons. Isoform-specific binding to VSD4 of Nav1.7 can limit the risk of side effects associated with blockage of other isoforms.

The top 25 compounds with highest affinity scores were selected to perform molecular dynamic simulations (MDS). MDS were performed for 100 ns, with the starting point of the ligand being docked into the binding site. Root Mean Square Deviation (RMSD) was used to measure the average change in displacement of atoms for a particular frame with respect to a reference frame. A total of 13 complexes showed stable positioning during MDS. Of those, 9 compounds with unique scaffolds and sufficient quantity (1 mg or more) available in stock were selected and purchased from ChemDiv for in vitro and in vivo activity assessment.

Patch-Clamp Recordings of Nav1.7 in HEK293 Cells Identifies a Lead Compound.

Figures 3, 4A:
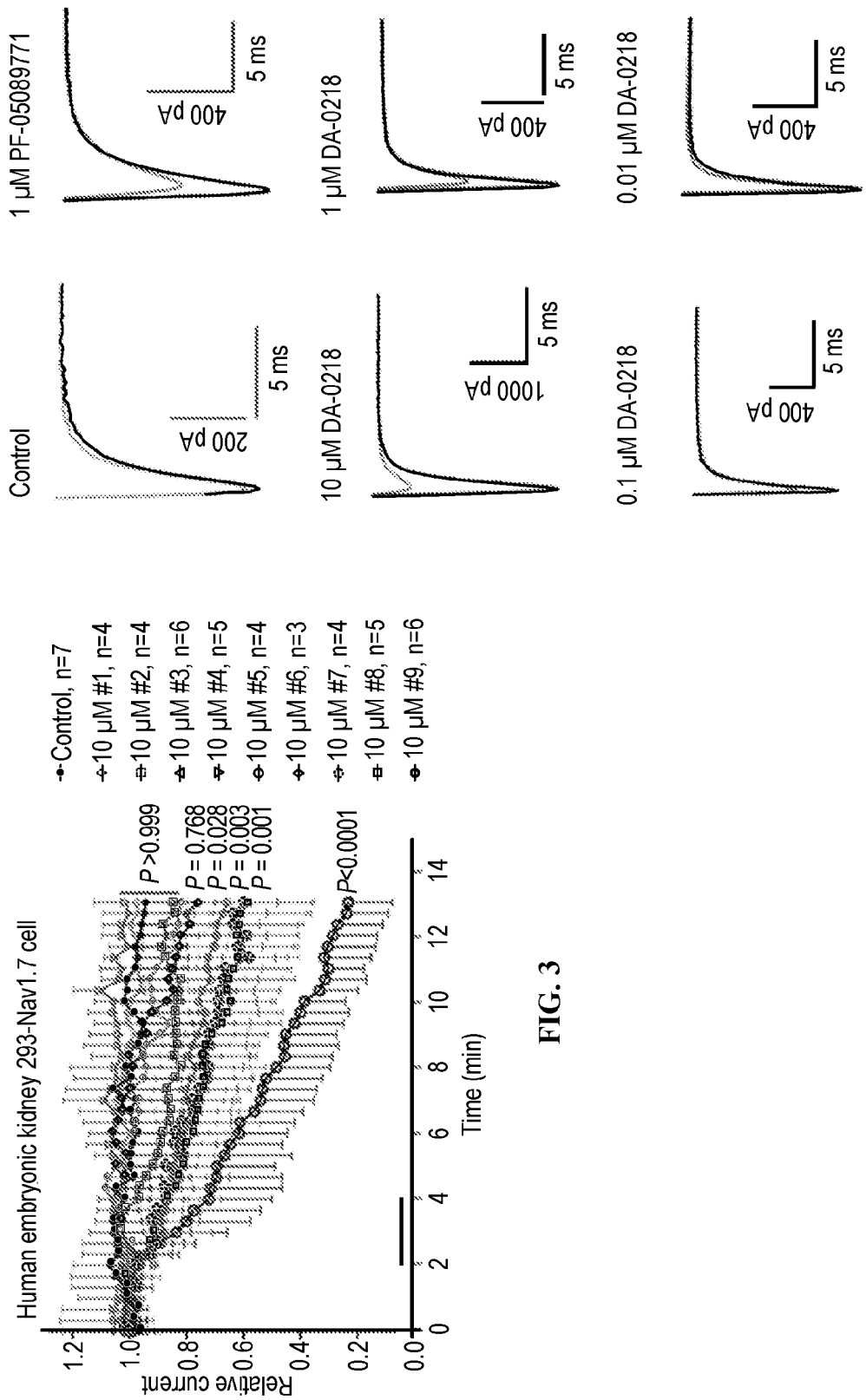
FIG. 3 is a graph showing the effects of compounds 1-9 in sodium channels in HEK293-Nav1.7 cells in accordance with one embodiment of the present disclosure.
FIG. 4A shows traces of sodium currents in Nav1.7-expressing HEK293 cells, indicating that compound 9 (DA-0218) inhibits Nav1.7 in a dose-dependent manner in accordance with one embodiment of the present disclosure. PF-05089771 was included as a positive control.

The effects of the 9 selected compounds on Nav1.7 channel activities were tested using patch-clamp recordings on human Nav1.7 expressing HEK293 cells (FIG. 3, FIG. 4). In each cell, sodium currents were recorded for 13 min, and candidate inhibitors (10 µM) were incubated for 2 min after 2 min baseline recording (FIG. 3). Compound was applied at the beginning of the second minute for two minutes (denoted as a horizontal line above the X-axis). Sodium currents were recorded at equal intervals (every 20 seconds, 40 recordings per compound per cell). Data was analyzed with a two-way repeated measures ANOVA, followed by a post-hoc test of the last timepoint Bonferroni-corrected for 9 pairwise comparisons (each compound was compared with control). The time×treatment interaction term was statistically significant (ANOVA F(351, 1482)=3.710, P<0.0001). At the last measurement, statistically significant difference in relative current from the control group was observed for compound 9 (0.71, 95% CI 0.47 to 0.95, P<0.0001), compound 8 (0.36, 95% CI 0.11 to 0.61, P=0.001), compound 7 (0.35, 95% CI 0.08 to 0.61, P=0.003), and compound 5 (0.29, 95% CI 0.02 to 0.55, P=0.028). The other compounds were not significantly different from control (P=0.768 for compound 6; P>0.999 for compounds 1-4). Sample size n=3 to 7 cells per group. Out of nine tested compounds, compounds 5, 7, 8, and 9 showed significant inhibition of sodium currents in Nav1.7-expressing cell line (29%, p<0.05, or better, FIG. 3).

Figure 4B:
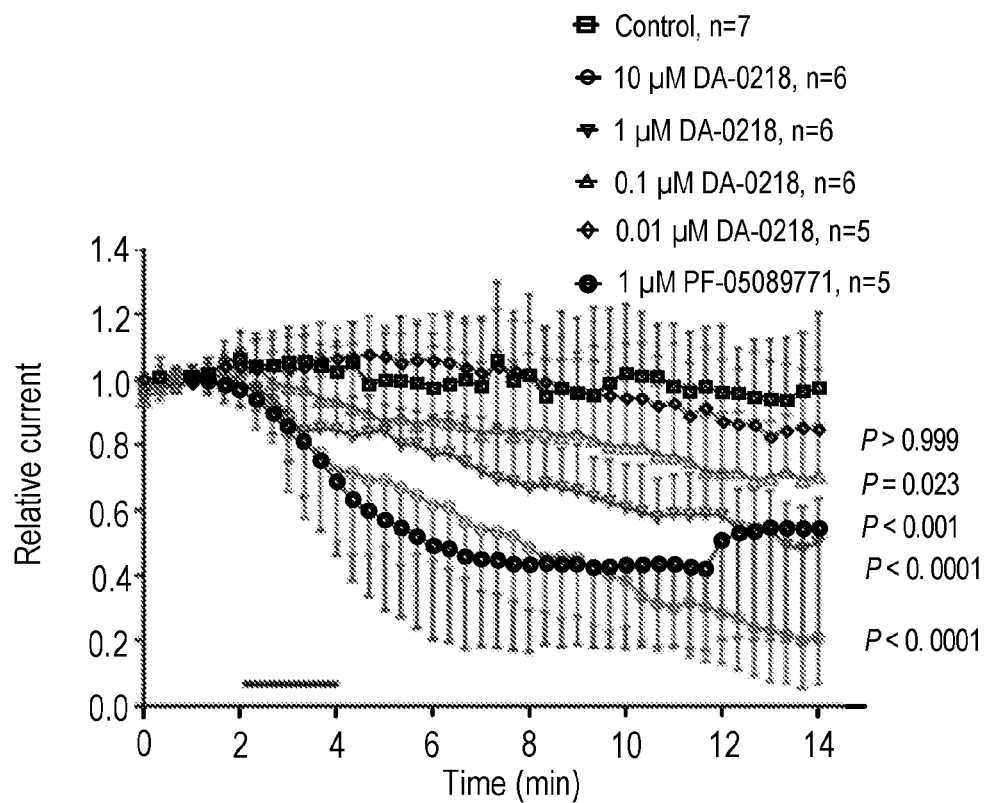
FIG. 4B shows the time course of sodium currents in Nav1.7-expressing HEK293 cells.
Figure 4C:
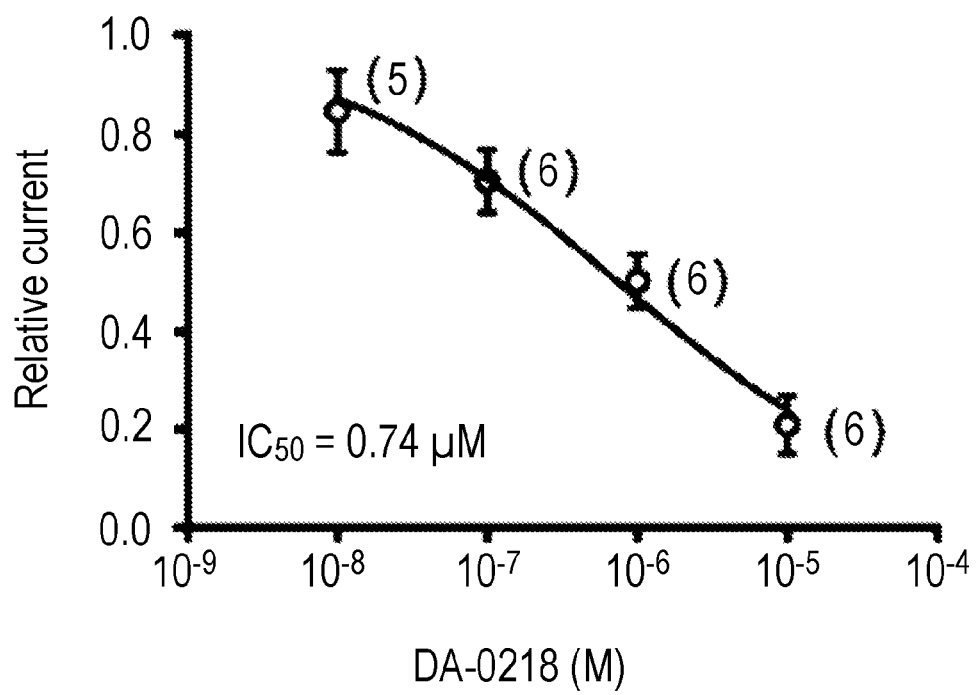
FIG. 4C shows normalized currents at 14 min treatment of Nav1.7-expressing HEK293 cells with DA-0218.

Specifically, the top-performing compound 9 (also referred to herein as DA-0218) at the concentration of 10 μM reduced the sodium current by 80% (FIG. 3). A dose-response analysis revealed that the 50% inhibition concentration (IC50) for DA-0218 was 0.74 μM (95% CI 0.35 to 1.56 μM; FIG. 4A-C). As a positive control, PF-05089771 (1 μM) showed fast and significant inhibition of sodium currents in Nav1.7-expressing cell line (43% inhibition vs. control, FIG. 4A, B), which is similar to the effects of 1 μM DA-0218 (47% inhibition vs. control). For FIG. 4C, sample size was n=5 to 7 cells per group. Compound was applied at the beginning of the second minute for two minutes (denoted as a horizontal line above the X-axis). Sodium currents were recorded every 20 seconds. Data was analyzed with a two-way repeated measures ANOVA, followed by a post-hoc test of the last timepoint Bonferroni-corrected for 5 pairwise comparisons (each concentration of DA-0218 and PF-05089771 was compared with control). The time×treatment interaction term was statistically significant (ANOVA F(210, 1218)=6.813, P<0.0001). At the last measurement, statistically significant difference in relative current from the control group was observed for compound 9 at 10 μM (0.76, 95% CI 0.52 to 1.00, P<0.0001), 1 μM (0.47, 95% CI 0.23 to 0.72, P<0.0001), 0.1 μM (0.27, 95% CI 0.02 to 0.52, P=0.023), but not at 0.01 μM (0.13, 95% CI −0.13 to 0.39, P>0.999). PF-05089771 effect at 1 μM was also significantly different from control (0.43, 95% CI 0.17 to 0.69, P<0.001). D-E: DA-0218 had no effect on sodium currents in Nav1.5-expressing HEK293 cells. Compounds 5, 7, and 8 also showed statistically significant inhibitory activity (30-40%), although to a lower degree than DA-0218 (FIG. 3).

Figure 4D:
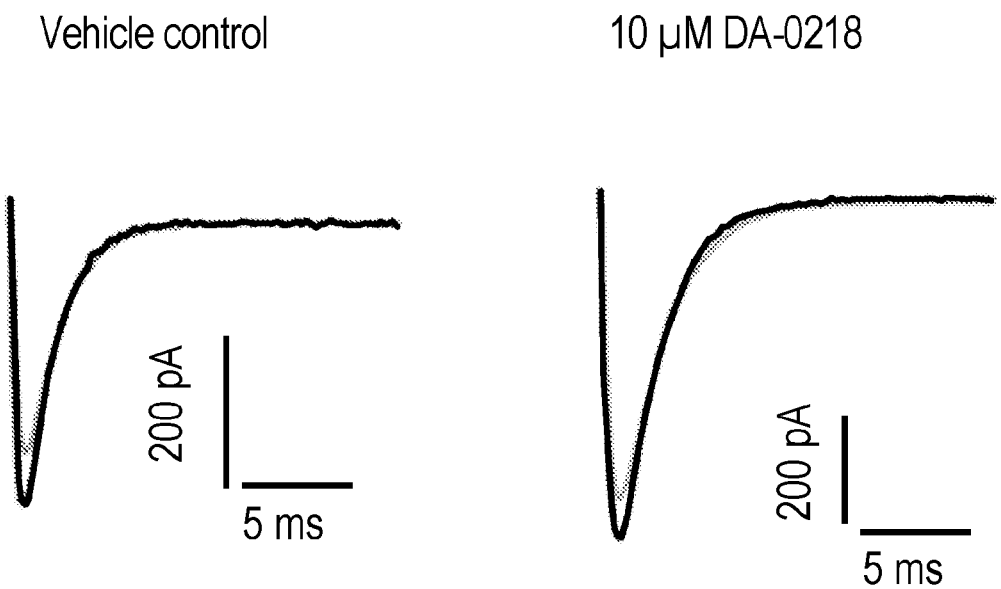
FIG. 4D shows traces of sodium currents in Nav1.5-transfected HEK290 cells.
Figure 4E:
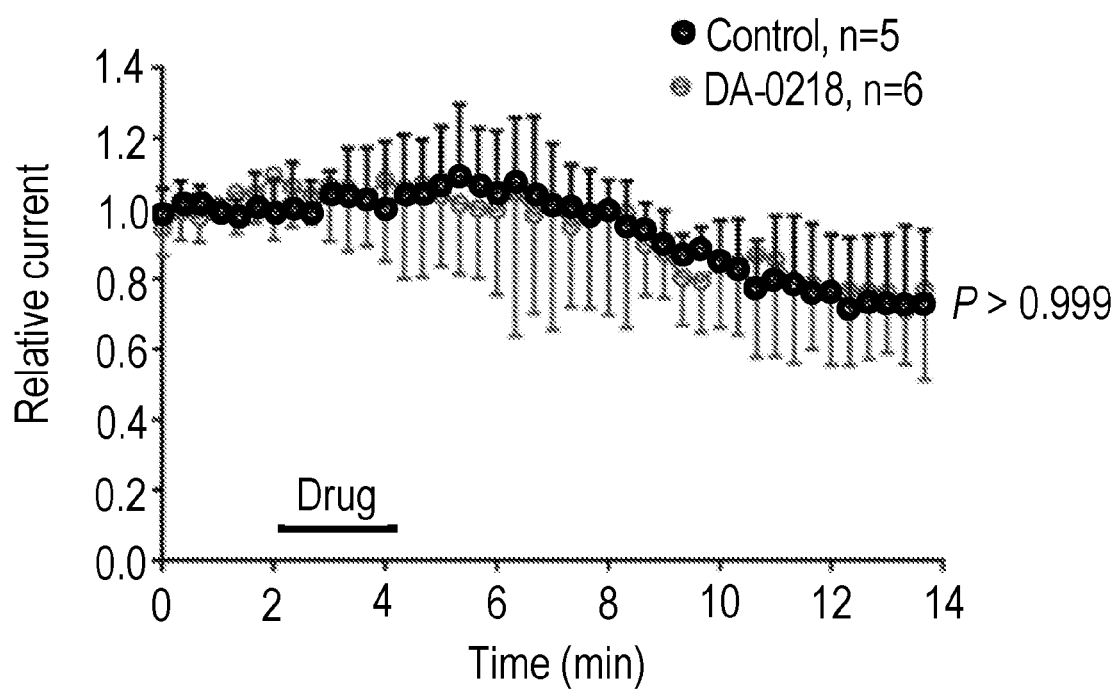
FIG. 4E shows the time course of sodium currents in Nav1.5-transfected HEK290 cells.

Based on these results, DA-0218 (3-(1-benzyl-1H-indol-3-yl)-3-(3-phenoxyphenyl)-N-(2-(pyrrolidin-1-yl)ethyl)propanamide) was selected as a lead compound for further investigation of selectivity against Nav1.5 and assessment of its activity in vivo. Notably, DA-0218 had no effect on sodium currents in Nav1.5-transfected HEK-293 cells in patch-clamp experiments (FIG. 4D, E).

DA-0218 Inhibits Sodium Currents in Mouse and Human DRG Neurons.

Figure 5A:
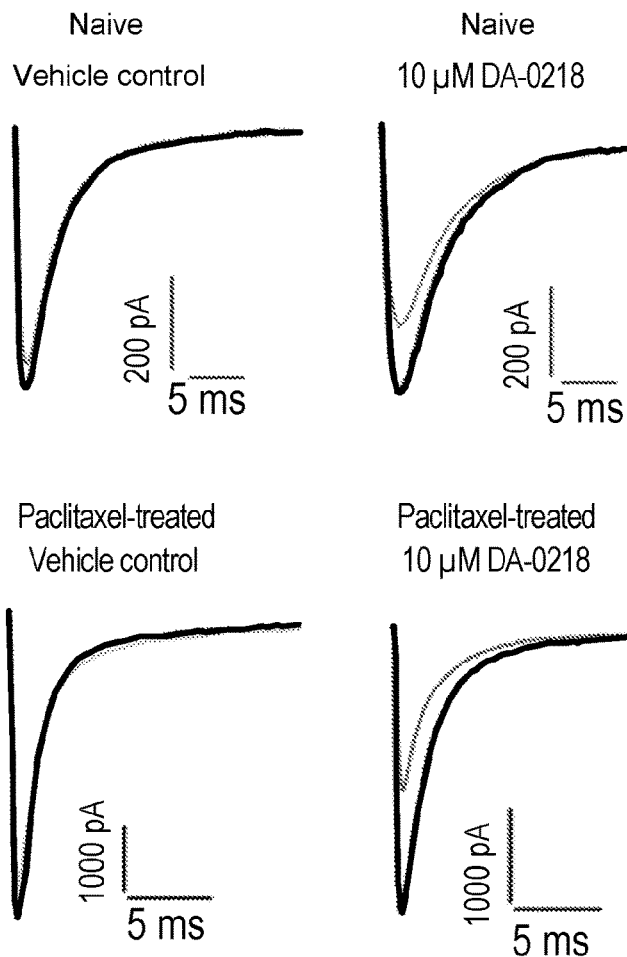
FIG. 5A shows traces of sodium currents in isolated naïve and paclitaxel-pretreated mouse dorsal root ganglion (DRG) neurons, showing that DA-0218 inhibits transient sodium currents in accordance with one embodiment of the present disclosure.
Figure 5B:
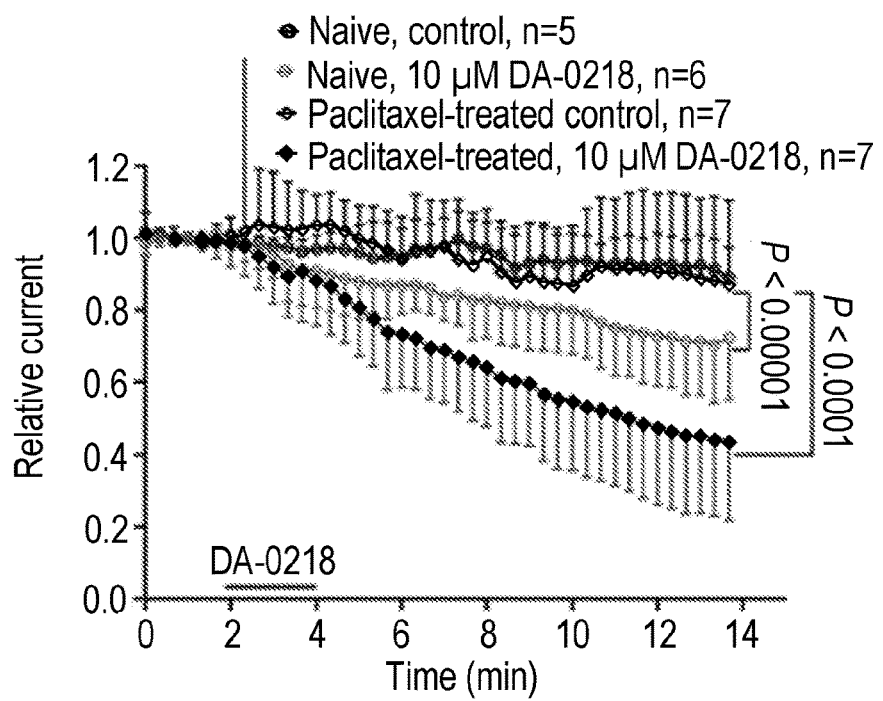
FIG. 5B shows the time course of sodium currents in isolated naïve and paclitaxel-pretreated mouse DRG neurons. (1 µM, 16-24 h). A statistically significant effect of 10 µM DA-0218 on sodium current was observed in naïve (two-way repeated measures ANOVA time×treatment interaction $F(41, 369)=4.072$, $P<0.0001$) and paclitaxel-treated dorsal root ganglion neurons ($F(41, 492)=7.147$, $P<0.0001$).
Figure 5C:
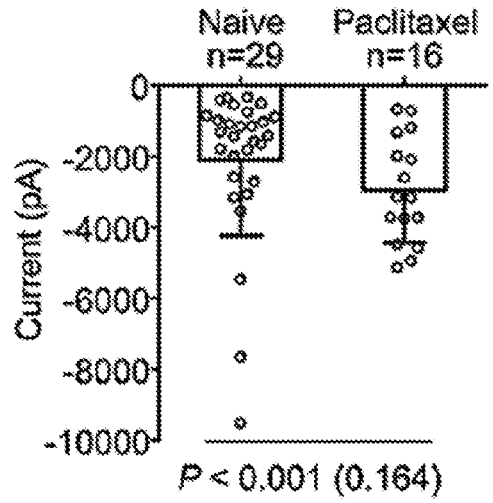
FIG. 5C shows that paclitaxel treatment increased transient sodium currents in cultured mouse DRG neurons. ($t(43)=1.416$, $P=0.1640$ with outliers (solid circles) and $t(40)=4.023$, $P<0.001$ without outliers). Sample size is n=16 to 29 neurons per group from 3-6 mice.
Figure 5D:
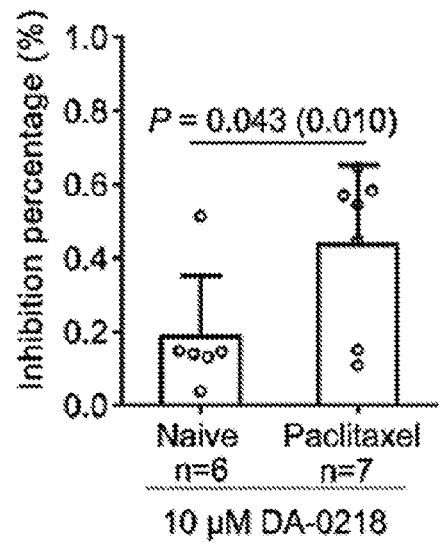
FIG. 5D shows that DA-0218 produced more potent inhibition in paclitaxel pretreated mouse dorsal root ganglion neurons ($t(11)=2.292$, $P=0.043$ with outlier and $t(10)=3.148$, $P=0.010$ without outlier). Sample size is n=7 neurons/group from 3 mice.
Figure 5E:
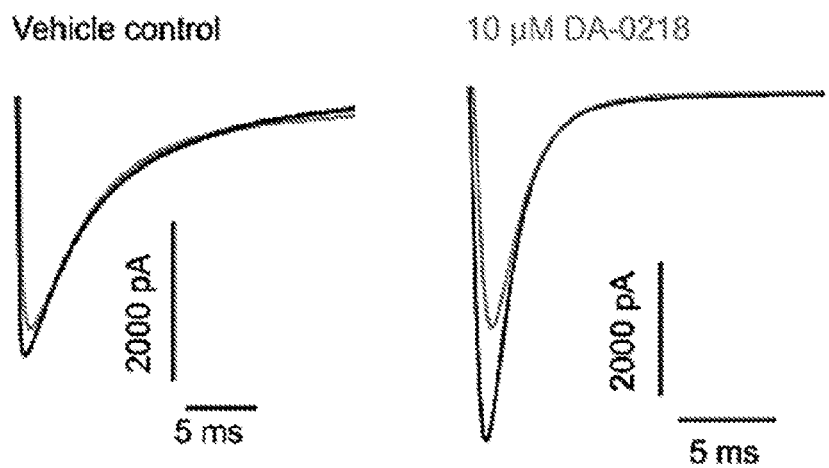
FIG. 5E shows traces of sodium currents in isolated naïve and paclitaxel-pretreated human DRG neurons.
Figure 5F:
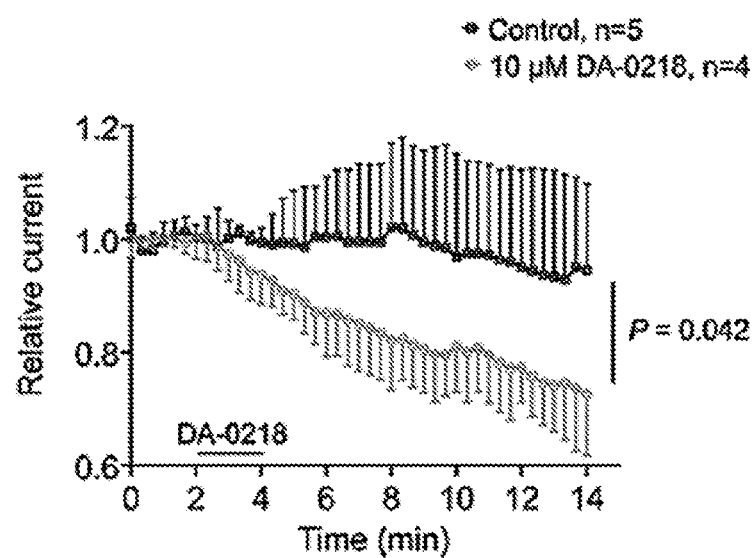
FIG. 5F shows the time course of sodium currents in isolated naïve and paclitaxel-pretreated human DRG neurons. Sample size is n=4 to 5 neurons per group from 2 donors. Mean relative current at the last measurement was 73% of the baseline in human dorsal root ganglion neurons and 72% (43% in paclitaxel-treated) in mouse dorsal root ganglion after DA-0218 treatment.

Because NaV1.7 is highly expressed by small-sized nociceptive DRG neurons, we examined whether DA-0218 would also modulate transient sodium currents ($I_{Na}T$) in dissociated small sized DRG neurons from mice and human donors. DA-0218 (10 uM) produced a modest (17%, 95% CI 6% to 28%) but statistically significant (two-way repeated measures ANOVA time×treatment interaction F(41, 369)= 4.072, P<0.0001) inhibition of peak $I_{Na}T$ in mouse DRG neurons (FIG. 5A, B). Notably, the kinetics of inhibition was slow, reaching a peak inhibition 10 min after the drug incubation (FIG. 5B). Of further note, paclitaxel pretreatment could significantly increase the amplitude of sodium currents, and furthermore, DA-0218 (10 μM) produced a more potent inhibition of sodium currents in paclitaxel pretreated mouse DRG neurons (44% in treated vs. 17% in non-treated group, t=2.292, df=11, P=0.043) (FIG. 5D). These important findings suggest that DA-0218 produces state-dependent inhibition of sodium currents, as previously shown for other sodium channel inhibitors such as carbamazepine. As expected, the amplitude of transient sodium currents was 5-10 fold larger in human DRG neurons than that in mouse DRG neurons (FIG. 5A-E). DA-0218 (10 uM) also produced a moderate (relative current difference 0.22, 95% CI 0.08 to 0.35) but statistically significant (P=0.0071) inhibition of peak $I_{Na}T$ in human DRG neurons (FIG. 5E, F).

Figure 6A:
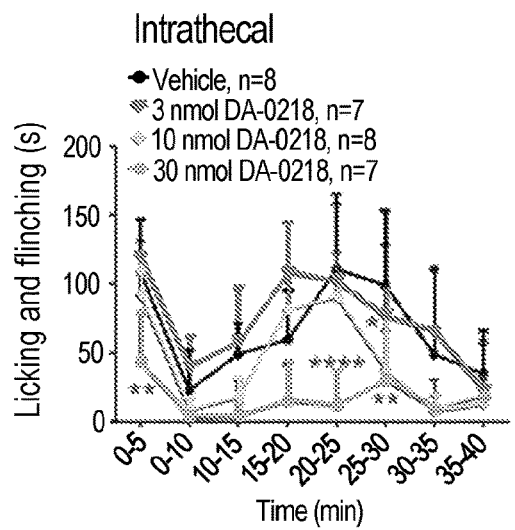
FIG. 6A shows graphs indicating that DA-0218 shows analgesic activity predominately in Phase II in formalin-induced inflammatory pain upon intrathecal administration in accordance with one embodiment of the present disclosure.
Figure 6A:
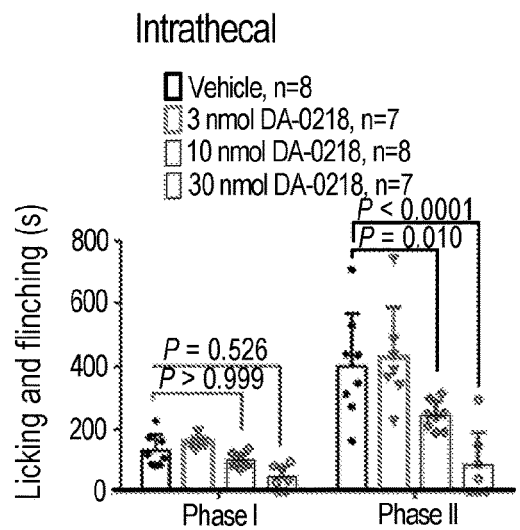

DA-0218 Reduces Inflammatory and Neuropathic Pain in Mice. After confirming that DA-0218 is a potent inhibitor of sodium current in DRG neurons, we next tested whether DA-0218 could attenuate formalin induced inflammatory pain following spinal intrathecal (i.t.) route via lumbar puncture. Formalin induced a bi-phasic spontaneous pain, as characterized as Phase I (0-10 min) and Phase II (10-40 min) (FIG. 6A). Intrathecal administration of DA-0218 (3, 10 and 30 nmol) produced a substantial and dose-dependent inhibition of the second-phase pain by 80% (95% CI 68% to 92%) (FIG. 6A). Intrathecal DA-0218 at the highest dose (30 nmol) also reduced Phase I response (FIG. 6A, left panel). DA-0218 dose had a statistically significant effect on licking and flicking behavior (two-way repeated measures ANOVA time×treatment interaction F(21, 182)=2.437, P=0.001). After Bonferroni correction, there was a statistically significant difference between vehicle and 30 nmol DA-0218 at 5 min (P=0.008), 25 min (P<0.0001) and 30 min (P=0.004), and 10 nmol at 30 min (P=0.011). The effect was present in Phase II (two-way repeated measures ANOVA phase×treatment interaction F(3, 26)=5.601, P=0.004; pairwise comparison P-values are Bonferroni-corrected for 6 tests).

Figure 6B:
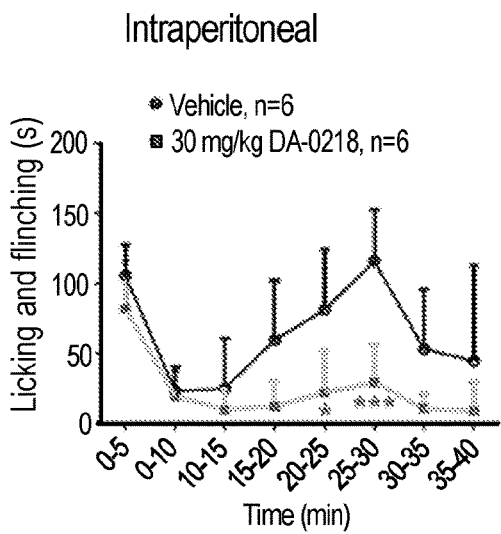
FIG. 6B shows graphs indicating that DA-0218 shows analgesic activity predominately in Phase II in formalin-induced inflammatory pain upon intraperitoneal administration in accordance with one embodiment of the present disclosure.
Figure 6B:
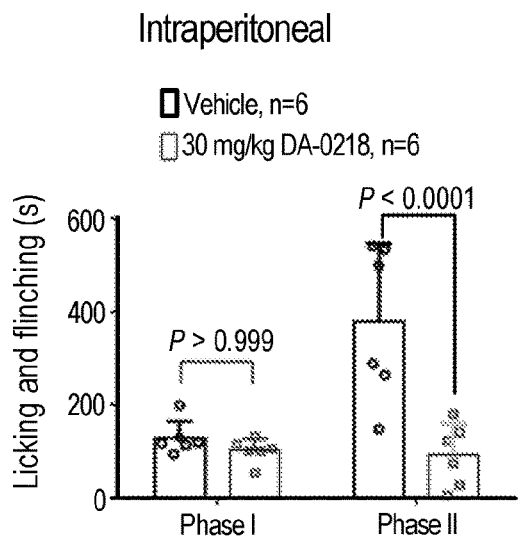

Intraperitoneal injection of DA-0218 (30 mg/kg) also inhibited formalin-induced pain in Phase II by 76% (95% CI 48% to 100%) (FIG. 6B). DA-0218 effect on mouse behavior did not reach statistical significance (two-way repeated measures ANOVA time×treatment interaction F(7, 70)=2.008, P=0.066). In the phase-stratified analysis, the effect was present in Phase II (two-way repeated measures ANOVA phase×treatment interaction F(1, 10)=9.708, P=0.011; pairwise comparison P-values are Bonferroni-corrected for 2 tests).

Figure 6C:
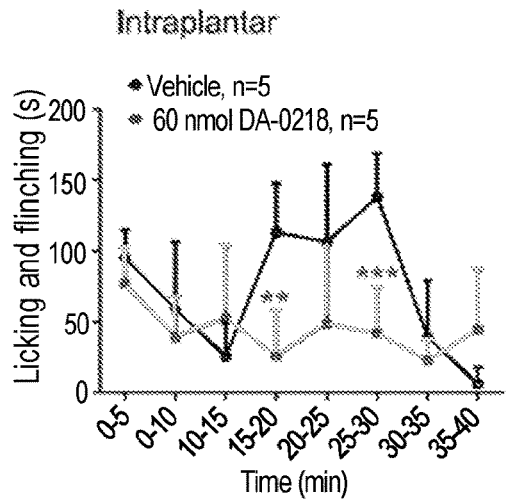
FIG. 6C shows graphs indicating that DA-0218 shows analgesic activity predominately in Phase II in formalin-induced inflammatory pain upon intraplantar administration in accordance with one embodiment of the present disclosure.
Figure 6C:
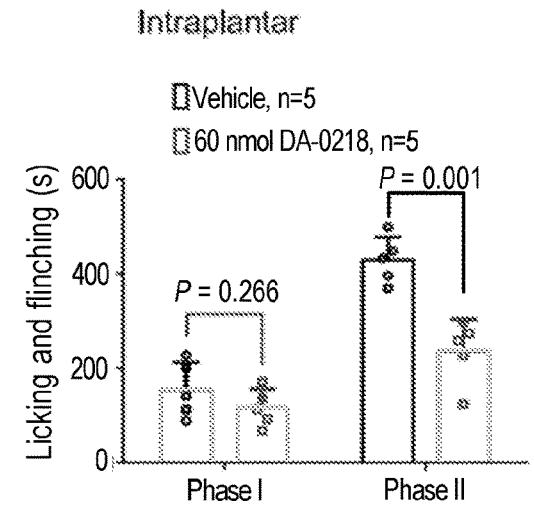

Intraplantar injection of 60 nmol of DA-0218 resulted in significant inhibition of formalin induced pain in Phase II (FIG. 6C). DA-0218 had a statistically significant effect on behavior (two-way repeated measures ANOVA time×treatment interaction F (7, 56)=4.145, P=0.001). After Bonferroni correction, there was a statistically significant difference between vehicle and DA-0218 at 20 min (P=0.003) and 30 min (*P=0.001). The effect was present in Phase II (two-way repeated measures ANOVA phase×treatment interaction F(1, 8)=8.039, P=0.022; pairwise comparison P-values are Bonferroni-corrected for 2 tests). Shown experimental data include n=5-8 mice per group. The data in FIG. 6 indicate that either systemic (intraperitoneal) or local (intrathecal or intraplantar) treatment of DA-0218 could effectively inhibit inflammatory pain via peripheral (intraplantar) or central (intrathecal) modulation.

Figure 7A:
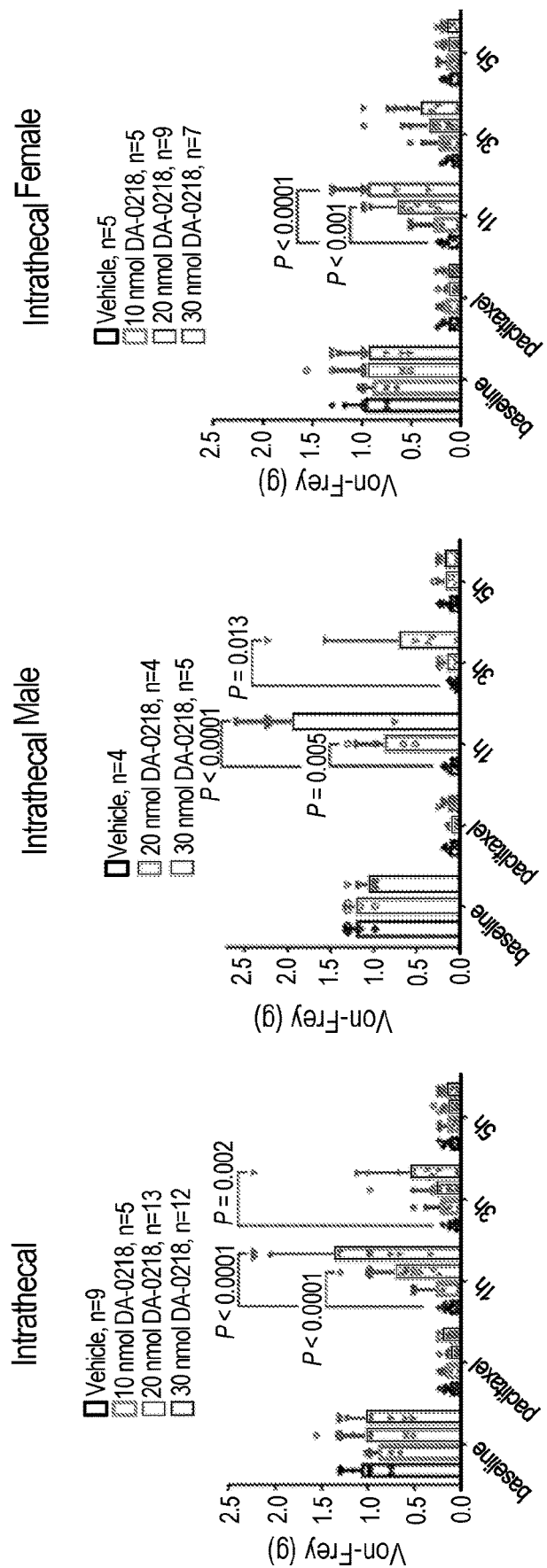
FIG. 7A shows graphs indicating that intrathecal DA-0218 produced statistically significant anti-allodynia effects in paclitaxel-induced neuropathic pain in a mixture of male and female mice upon intrathecal administration, indicating that DA-0218 is effective against paclitaxel (PTX)-induced neuropathic pain symptom mechanical allodynia in mice in accordance with one embodiment of the present disclosure.

We further tested the efficacy of DA-0218 in neuropathic pain induced by paclitaxel. DA-0218 transiently but completely reversed paclitaxel-induced mechanical allodynia for several hours when administered intrathecally (FIG. 7A, left panel; two-way repeated measures ANOVA time×treatment interaction F(12, 140)=8.519, P<0.0001; posthoc pairwise P-values are Bonferroni-corrected for 3 tests; shown experimental data include 5-13 mice per group). Specifically, the dose response effect was evident at 1 hr and 3 hrs after the injection, but not at 5 hrs. DA-0218 showed effective anti-allodynia in both male and female mice after intrathecal injection (FIG. 7A, middle and right panels). FIG. 7A, center panel, shows data for male mice (two-way repeated measures ANOVA time×treatment interaction F (8, 40)=8.998, P<0.0001; posthoc pairwise P-values are Bonferroni-corrected for 2 tests). FIG. 7A, left panel, shows data for female mice (two-way repeated measures ANOVA time×treatment interaction F (12, 88)=3.575, P<0.001; posthoc pairwise P-values are Bonferroni-corrected for 3 tests).

Repeated injections of DA-0218 after the $2^{nd}$ and $3^{rd}$ injection did not produce any analgesic effect tested at one hour after each injection (FIG. 7B; repeated measures one-way ANOVA F (1.968, 13.78)=46.56; P<0.0001; posthoc pairwise P-values are Bonferroni-adjusted for 4 tests). Experimental sample size n=8 mice.)

We also tested the effects of PF-05089771 on paclitaxel-induced neuropathic pain behavior, but intrathecal injection of PF-05089771 (10 nmol and 30 nmol) failed to produce any anti-allodynic effect in the paclitaxel model (FIG. 7C; repeated measures two-way ANOVA time×treatment interaction F (4, 48)=0.036, P=0.991; posthoc pairwise P-values are Bonferroni-corrected, n=6, 8 mice per group). Interestingly, no effect on allodynia was observed when the compound was administered intraperitoneally (30 mg/kg, FIG. 7D; repeated measures two-way ANOVA time×treatment interaction F (8, 48)=0.244, P>0.999; posthoc pairwise P-values are Bonferroni-corrected; n=5 mice per group). Notably, this dose was very effective in reducing formalin-induced inflammatory pain (FIG. 6B).

We further tested the efficacy of DA-0218 in neuropathic pain induced by paclitaxel. DA-0218 transiently but completely reversed paclitaxel-induced mechanical allodynia for several hours when administered intrathecally (FIG. 7A, left panel). Specifically, the dose response effect was evident at 1 hr and 3 hrs after the injection, but not at 5 hrs. Interestingly, no effect on allodynia was observed when the compound was administered intraperitoneally (30 mg/kg, FIG. 7B, center panel). Notably, this dose was very effective in reducing formalin-induced inflammatory pain (FIG. 5E, F).

Figure 8A:
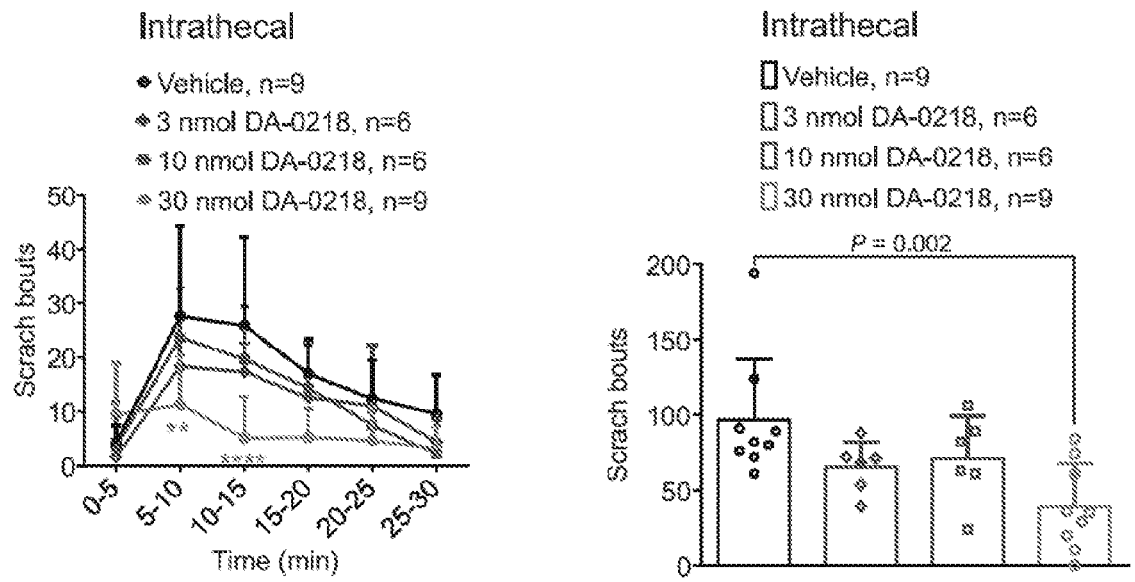
FIG. 8A shows graphs indicating that DA-0218 (30 nmol, i.t.) is effective against histamine-induced itch in mice in accordance with one embodiment of the present disclosure.

After establishing the effectiveness of DA-0218 in models of inflammatory and neuropathic pain, we tested if DA-0218 is also effective against acute and chronic itch. Firstly, intradermal injection of 500 µg histamine induced acute itch starting at 5 min but declining at 30 min after application (FIG. 8A, left panel). Intrathecal injected of DA-0218 resulted in a dose-dependent reduction of scratch bouts induced by histamine (FIG. 8A). FIG. 8A, left panel shows the time course of acute itch. DA-0218 dose had a statistically significant time-dependent effect on itch (repeated measures two-way ANOVA time×dose interaction F (15, 130)=2.847, P=0.001; P=0.001, **P<0.0001). P-values are Bonferroni-corrected. FIG. 8A, right panel, shows the same data presented as the count of scratch bouts over 30 min. One way ANOVA F(3, 26)=5.207, P=0.006). Post-hoc pairwise comparisons show that intrathecal 30 nmol DA-0218 resulted in a statistically significant reduction of histamine-induced scratches in comparison to vehicle. Experimental sample size is n=6-9 mice per group.

Figure 8B:
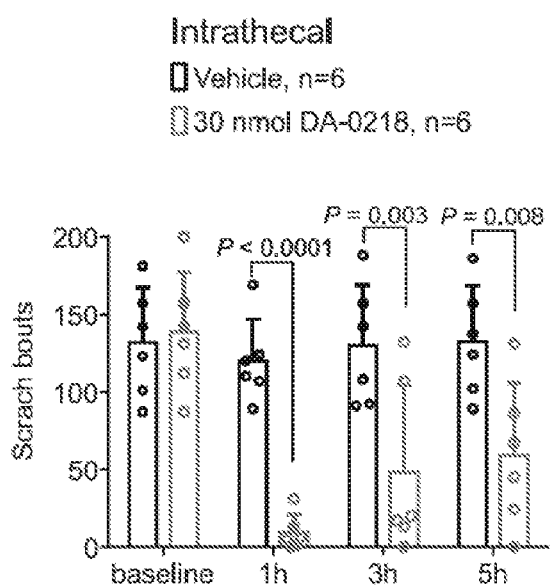
FIG. 8B shows a graph indicating that DA-0218 (30 nmol, i.t.) is effective against lymphoma-induced itch in mice in accordance with one embodiment of the present disclosure.

Secondly, lymphoma induced chronic itch in mice as described previously. At day 50, lymphoma caused a robust spontaneous itch, showing >100 bouts per hour (FIG. 8B, repeated measures two-way ANOVA time×treatment interaction F(3, 30)=5.716, P=0.003), suggesting this is an animal model of chronic itch. Post-hoc pairwise comparisons show that the effect is present at 1 h (P<0.0001), 3 h (P=0.003), and 5 h (P=0.008), Bonferroni-corrected for 4 tests. Experimental sample size was n=6 mice per group. DA-0218 was also effective in suppressing chronic itch after intrathecal injection. At the dose of 30 nmol, this compound resulted in a significant reduction of scratch (P<0.01 at 1 h and 3 h) and the anti-itch effect remained after 5 h (P<0.01).

C. Discussion

In this study, we have identified several new small molecule Nav1.7 inhibitors using a computer-aided drug design approach. DA-0218 has a different binding mechanism than previously described sulfonamide-based Nav1.7 inhibitors, even though it binds within the same pocket of VSD4 of the channel. Our results show that DA-0218 inhibits sodium currents in Nav1.7-expressing cell line at $IC_{50}$ of 0.74 µM and that systemic, intrathecal, and intraplantar administration of DA-0218 substantially reduced formalin-induced inflammatory pain. Moreover, DA-0218 was effective in reducing paclitaxel-induced neuropathic pain and lymphoma-induced chronic itch in mouse models. Thus, DA-0218 may represent a new class of Nav1.7 inhibitors showing both in vitro and in vivo activities.

Notably, compounds 5, 7, 8, and 9 (DA-0218) that show Nav1.7 inhibitory activity in vitro are all derivatives of 3-(1-benzyl-1H-indol-3-yl)-3-(3-methoxyphenyl)-N-methylpropanamide. Members of this class of compounds share a similar structure motif which consist of three moieties: propanamide, methoxyphenyl and benzyl indolyl. Our docking experiments showed that these three moieties each occupy a specific area of the binding site: the propanamide moiety is docked in the selectivity pocket, methoxyphenyl moiety is in the lipid-exposed pocket, and benzyl indolyl (aryl indole) moiety occupies the anion-binding pocket of the binding site. DA-0218 (3-(1-benzyl-1H-indol-3-yl)-3-(3-phenoxyphenyl)-N-(2-(pyrrolidin-1-yl)ethyl) propanamide) also possesses a pyrrolidine group as its major difference from the other explored compounds.

Figure 9:
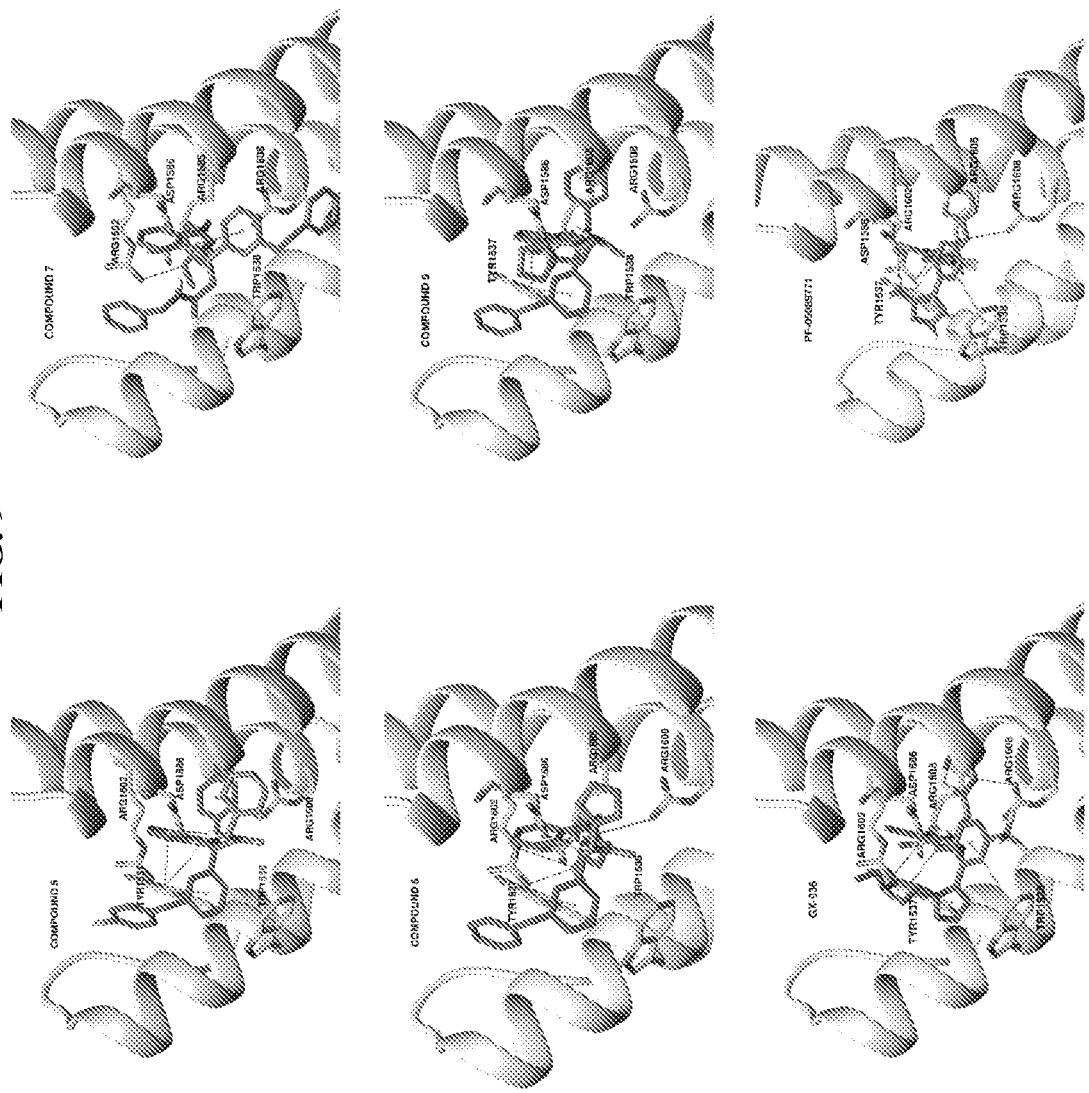
FIG. 9 are schematics showing the predicted binding modes of compounds in the VSD4 peptide pocket in accordance with one embodiment of the present disclosure as well as comparator compounds.

Comparison of the docking modes of the compounds in the binding pocket reveals features that may be critical for compound activity. As illustrated in FIG. 9 and Table 1, the predicted binding mode for DA-0218 is very similar to that of GX-936. The two pi-pi stacking interactions between TYR1537 and two aromatic rings of DA-0218 seem to be critical for the positioning of the ligand. Anchoring of DA-0218 is further stabilized by an H-bonding of ASP1586 with the amine of the pyrrolidine ring. In compound 5, there are three pi-pi stacking interactions between TYR1537 and indole and benzene rings, as well as an H-bond between ASP1586 and propanamide group of compound 5. These interactions might help for positioning and anchoring of compound 5. Thus, compounds 5 and 9 are exhibiting a similar pattern of interactions with VSD4 peptide chains. These two compounds show an H-bond interaction with ASP1586, which is not observed in the rest of explored compounds. This new feature in ligand recognition suggests the role of ASP1586 in ligand recognition in compounds 5 and 9. The pi-pi interactions present here are significant for maintaining stable conformation of the molecule.

TABLE 1

Comparison of binding mechanisms across nine new compounds and two known Nav1.7 inhibitors

| Compound Name | Binding aminoacid residue in VSD4 | | | | | |
|---|---|---|---|---|---|---|
| | TYR1537 | TRP1538 | PHE1583 | ASP1586 | ARG1602 | ARG1608 |
| Compound 1 | Pi-Pi | Pi-Pi | | | H-bond | H-bond |
| Compound 2 | Pi-Pi | Pi-Pi | | | H-bond | H-bond |
| Compound 3 | | Pi-Pi | | | H-bond | |
| Compound 4 | Pi-Pi | | Pi-Pi | | | Pi-Cation |
| Compound 5 | Pi-Pi | | | H-bond | | Pi-Cation |
| Compound 6 | Pi-Pi | | Pi-Pi | | | |
| Compound 7 | | | | | H-bond | Pi-Cation |
| Compound 8 | Pi-Pi | | | H-bond | H-bond | Pi-Cation |
| Compound 9 | Pi-Pi | | | H-bond | | |
| GX-936 | Pi-Pi | Pi-Pi | | | H-bond | H-bond |
| PF-05089771 | Pi-Pi | Pi-Pi | | H-bond | H-bond | H-bond |

Notes:
Pi-Pi denotes attractive non-covalent interaction between aromatic rings; H-bond denotes an attractive force between a hydrogen and another electronegative atom; Pi-cation denotes an interaction between an aromatic ring and a cation.

The absence of a sulfonamide group in our compounds 5 and 9 explains an absence of the H-bonds with ARG1602 and ARG1608 via oxygen and the nitrogen atom on the sulfonamide group, typically observed in sulfonamide-based Nav1.7 inhibitors. Without the sulfonamide moiety, our compounds are docked deep into the active site. As opposed to an anionic "warhead" of sulfonamides (Ahuja et al. 2015; Science. 350: aac5464), the head group of compounds 5 and 9 is hydrophobic in nature; compound 5 is making a pi-cation interaction with ARG1608 instead of an H-bond formation.

Compound 8 has two H-bonds that seem to be crucial for its binding. One such bond is between ASP1586 and propanamide group and the second one is with ARG1602. As with compounds 5 and 9, a pi-pi stacking with TYR1537 was observed, as well as a pi-cation interaction with ARG1608. In contrast with compounds 5 and 9, compound 8's indole group formed no interaction with the peptide. Compound 7, despite showing an inhibitory profile in HEK-293 cells very similar to compound 8, has a very different binding pattern within the protein pocket. Specifically, compound 7 has one H-bond with ARG1602 (but not with ASP1586) and a pi-cation interaction with ARG1608.

Compound 5 had lower activity compared to DA-0218 in patch-clamp experiments likely due to the shorter pyridine moiety which is not as favorable for compound activity as the propanamide with pyrrolidine in DA-0218. Similarly, the furan ring in compound 8 results in some activity but less than the pyrrolidine in DA-0218. All three compounds have a phenoxyphenyl group as a common feature which is also deemed to favor their activity. A negative impact on the activity of compound 4 and 6 is likely due to the presence of piperazine in their structure. Further, structure activity relationship study will help us to find a clue of possible optimization options.

DA-0218 transiently but completely reversed paclitaxel-induced mechanical allodynia for several hours when administered intrathecally. A surprising result in our study was the acute tolerance induced after repeated injections of DA-0218 in the paclitaxel model. This result suggests the difficulty of developing Nav1.7-selective inhibitors for the treatment of chronic pain. This acute antinociceptive tolerance may be related to unique pharmacokinetics and/or pharmacodynamics of the compound and to a particular pain model. It may also result from desensitization of the channel or the compensation of other sodium channels (e.g., Nav1.6, Nav1.8, and Nav1.9) after the inhibitor treatment. It is possible that a pan-sodium channel inhibitor (avoiding Nav1.5) could be more effective. Notably, loss of Nav1.7 resulted in upregulation of opioid receptor signaling. It will be of great interest to investigate the additive analgesic effects of DA-0218 and a non-addictive opioid (e.g., buprenorphine). Interestingly, DA-0218 appears to be more effective in inhibiting chronic itch (effect duration >5 h) than inhibiting chronic pain (effect duration 3 h).

Compared to Nav1.7-expressing HEK293 cells, DA-0218 produced much less inhibition of sodium currents in DRG neurons (20% vs. 80%, FIG. 4, FIG. 5). This discrepancy may result from the fact that DRG nociceptor neurons express different subtype of sodium channels (e.g, Nav1.6; Nav1.8, Nav1.9). Notably, DA-0218 has a similar inhibition rate (around 20%) in both mouse and human DRG neurons. It is important to point out that this inhibitor targets the voltage sensor of the sodium channel and, therefore, its efficacy may depend on the activation states of Nav. For example, cabamezepine, a non-selective sodium channel inhibitor for treating trigeminal neuralgia, was shown to inhibit sodium currents in an activity-dependent manner (PMID: 29333591, PMID: 16550174). Nav1.7 expression and function in human DRG neurons is upregulated in neuropathic pain conditions, such as paclitaxel-induced neuropathic pain (PMID: 28424991; PMID: 29255002). Indeed, in our experiments paclitaxel pretreatment increased the amplitude of sodium currents, and furthermore, DA-0218 produced a more potent inhibition of sodium currents in paclitaxel pretreated mouse DRG neurons compared to non-treated controls. These important findings corroborate the hypothesis that DA-0218 produces state-dependent inhibition of sodium currents, as previously shown for other sodium channel inhibitors such as carbamazepine. These findings suggest that DA-0218 may produce more profound inhibition of sodium currents and pain in chronic pain conditions. than in acute pain states.

Interestingly, we found that intrathecal injection but not systemic injection of DA-0218 could reduce paclitaxel-induced mechanical allodynia (FIG. 7). This result suggested that either the central action of the Nav1.7 inhibitor is critical for the analgesic efficacy in neuropathic pain, or different modes of administration result in different concentrations of DA-0218 at the central terminal of the nociceptor.

In contrast, systemic injection of DA-0218 was sufficient to reduce inflammatory pain, suggesting that different mechanisms might underlie inflammatory pain vs. neuropathic pain or acute pain vs. chronic pain. It is also possible that spontaneous pain or spontaneous itch is more sensitive to the Nav1.7 inhibition than evoked pain (e.g., mechanical allodynia), given a critical contribution of Nav1.7 to the generation of action potentials and spontaneous discharges. Future study is needed to define the CNS penetration of DA-0218.

Example 2. Assessment of Nav1.7 Inhibitors in Neuropathic Pain Models

CCI Model.

Neuropathic pain is produced by chronic constriction injury (CCI) of the sciatic nerve. Mice are anesthetized with isoflurane, and three ligatures are 7-0 prolene placed around the nerve proximal to the trifurcation (1 mm between ligatures). The ligatures are loosely tied until a short flick of the ipsilateral hind limb is observed (Chen, Ji, et al. 2015; *J Clin. Invest.* 125(8):3226-3240).

SNI model. Neuropathic pain is produced by spared nerve injury (SNI). SNI surgery is conducted with a 5.0 silk tight ligation of the tibial and common peroneal nerves followed by transection and removal of a 3-5 mm nerve portion. Notably, the third peripheral branch of the sciatic nerve, the sural nerve, remains intact, and any contact or stretch to this nerve is carefully avoided (Chen, Ji, et al., supra).

Animals in the neuropathic pain models are dosed with N-substituted indoles according to the present disclosure [N-(methylsulfonyl)-3-(3-oxo-1-(3-phenoxyphenyl)-3-((2-(pyrrolidin-1-yl)ethyl)amino)propyl)-1H-indole-1-carboxamide (10); (Z)-N-(5-((3-(3-oxo-1-(3-phenoxyphenyl)-3-((2-(pyrrolidin-1-yl)ethyl)amino)propyl)-1H-indol-1-yl)sulfonyl)-1,3,4-thiadiazol-2-yl)acetimidic acid (11); and 3-(3-phenoxyphenyl)-N-(2-(pyrrolidin-1-yl)ethyl)-3-(1-(thiazol-2-ylsulfonyl)-1H-indol-3-yl)propanamide (12)]. The compounds are synthesized according to the route outlined in Scheme 1 and are administered intrathecally at a dose of 30 mg/kg. Reduction of pain is observed after injection of the test compounds.

Example 3. Assessment of Nav1.7 Inhibitors in Itch Models

Acute Itch Model.

Mice are habituated to the testing environment daily for at least two days before analysis. Mice are shaved at the back of the neck the day before injection. Mice are left in small plastic chambers (14×18×12 cm) on an elevated metal mesh floor and allowed 30 min for habituation before examination. To elicit acute itch, pruritic agent 48/80 or chloroquine are injected intradermally in the nape of the neck and the number of scratched are counted every 5 min for 30 min after the injection. A scratch is counted when a mouse lifts its hindpaw to scratch the shaved region and returns the paw to the floor or to the mouth for the licking (Liu, et al. 2012; *J Cin. Invest.* 122(6):2195-2207).

Dry Skin Chronic Itch Model.

To induce chronic itch, the neck skin is painted with acetone and diethyl ether (1:1) followed by water twice a day for 4 days, and spontaneous itch is examined by counting the number of scratches for 60 minutes on day 5. (Liu, et al. 2012, supra).

Allergic Contact Dermatitis (ACD) Chronic Itch Model.

Chronic itch is induced by applying the hapten 1-fluoro-2,4-dinitrobenzene (DNFB) onto the back skin. (Liu, Ji, et al. 2016; *Pain.* 157(4):806-817; Zhao, et al. 2013; *J Clin. Invest.* 123(11):4769-4780). DNFB is dissolved in a mixture of acetone:olive oil (4:1) for sensitization and challenge. One day before sensitization, the surface of the abdomen and the nape of the neck are shaved. Mice are sensitized with 0.5% DNFB solution (50 µL) by topical application to a ~2 cm² area of abdomen skin. Five days later, mice are challenged with 0.2% DNFB solution (30 µL) by painting the shave neck area, then every other day for one week. Spontaneous scratching behaviors are videoed for 1 hour, at 24 hours after each challenge. The behavioral tests of itch are performed blindly.

Animals in the itch models are dosed with N-substituted indoles 10, 11, and 12, which are administered intrathecally at a dose of 30 mg/kg. Reduction of scratching is observed after injection of the test compounds.

One skilled in the art will readily appreciate that the present disclosure is well adapted to carry out the objects and obtain the ends and advantages mentioned, as well as those inherent therein. The present disclosure described herein are presently representative of preferred embodiments, are exemplary, and are not intended as limitations on the scope of the present disclosure. Changes therein and other uses will occur to those skilled in the art which are encompassed within the spirit of the present disclosure as defined by the scope of the claims.

No admission is made that any reference, including any non-patent or patent document cited in this specification, constitutes prior art. In particular, it will be understood that, unless otherwise stated, reference to any document herein does not constitute an admission that any of these documents forms part of the common general knowledge in the art in the United States or in any other country. Any discussion of the references states what their authors assert, and the applicant reserves the right to challenge the accuracy and pertinence of any of the documents cited herein. All references cited herein are fully incorporated by reference, unless explicitly indicated otherwise. The present disclosure shall control in the event there are any disparities between any definitions and/or description found in the cited references.

What is claimed is:

1. A method of treating a condition selected from the group consisting of itch, pain, and combinations thereof, the method comprising administering a therapeutically effective amount of a Nav1.7 inhibitor to a subject in need thereof, wherein the Nav1.7 inhibitor is an N-substituted indole, wherein the N-substituted indole is a compound according to Formula I:

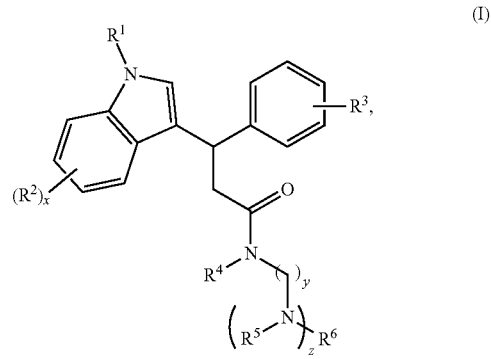

or a pharmaceutically acceptable salt thereof, wherein:

$R^1$ is -$L^1$-$R^{1a}$;

-$L^1$- is selected from the group consisting of —$(CH_2)_n$—, —$NHS(O)_2$—, —$NHC(O)$—, and —$S(O)_2$—, wherein subscript n is 1, 2, 3, 4, 5, or 6;

$R^{1a}$ is selected from the group consisting of $C_{6-14}$ aryl, $C_{3-8}$ cycloalkyl, 5- to 10-membered heteroaryl, 3- to 10-membered heterocyclyl, ($C_{6-14}$ aryl) sulfonyl, ($C_{1-8}$ alkyl) sulfonyl, ($C_{3-8}$ cycloalkyl)sulfonyl, $C_{2-8}$ alkyl, $C_{2-8}$ alkenyl, and $C_{2-8}$ alkynyl, each of which is optionally substituted with one or more $R^{1b}$;

each $R^{1b}$ is independently selected from the group consisting of halogen, —CN, —$NO_2$, —$NHR^{1c}$, —N=C(OH)$R^{1d}$, —$N_3$, —OH, —SH, —$SO_3H$, $C_{1-8}$ alkyl, $C_{1-8}$ alkoxy, $C_{2-8}$ alkenyl, $C_{2-8}$ alkynyl, $C_{3-10}$ cycloalkyl, —$COOR^{1c}$, —$C(O)NHR^{1c}$, and —$C(O)R^{1d}$, wherein each $R^{1c}$ is independently selected from the group consisting of H and $C_{1-4}$ alkyl and each $R^{1d}$ is independently $C_{1-4}$ alkyl;

subscript x is 0, 1, 2, 3, or 4;

each $R^2$ is independently selected from the group consisting of halogen, —CN, —$NO_2$, —$NHR^{1c}$, —$N_3$, —OH, —SH, —$SO_3H$, $C_{1-8}$ alkyl, $C_{1-8}$ alkoxy, —$COOR_{1c}$, —$C(O)NHR^{1c}$, and —$C(O)R^{1d}$;

$R^3$ is -$L^3$-$R^{3a}$;

-$L^3$- is selected from the group consisting of a bond, —O—, —$O(CH_2)_n$—, —$(CH_2)_n$—, —NHC(O)—, —$NHS(O)_2$—, and —$S(O)_2$—, wherein subscript n is 1, 2, 3, 4, 5, or 6;

$R^{3a}$ is selected from the group consisting of $C_{6-14}$ aryl, $C_{3-8}$ cycloalkyl, 5- to 10-membered heteroaryl, 3- to 10-membered heterocyclyl, ($C_{6-14}$ aryl)sulfonyl, ($C_{1-8}$ alkyl)sulfonyl, ($C_{3-8}$ cycloalkyl)sulfonyl, $C_{1-8}$ alkyl, $C_{2-8}$ alkenyl, and $C_{2-8}$ alkynyl, each of which is optionally substituted with one or more $R^{3b}$;

each $R^{3b}$ is independently selected from the group consisting of halogen, —CN, —$NO_2$, —$NHR^{3c}$, —$N_3$, —OH, —SH, —$SO_3H$, $C_{1-8}$ alkyl, $C_{1-8}$ alkoxy, —$COOR^{3c}$, —$C(O)NHR^{3c}$, and —$C(O)R^{3d}$, wherein each $R^{3c}$ is independently selected from the group consisting of H and $C_{1-4}$ alkyl and each $R^{3d}$ is independently $C_{1-4}$ alkyl;

$R^4$ is selected from the group consisting of H and $C_{1-6}$ alkyl;

subscript y is 2, 1, 3, 4, 5, or 6;

subscript z is 0 or 1;

$R^5$ is selected from the group consisting of H and $C_{1-6}$ alkyl;

alternatively, $R^4$ and $R^5$ are taken together to form 4- to 10-membered heterocyclylene;

$R^6$ is selected from the group consisting of 5- to 10-membered heterocyclyl, 3- or 4-membered heterocyclyl, 5- to 10-membered heteroaryl, $C_{3-8}$ cycloalkyl, $C_{6-14}$ aryl, and $C_{7-22}$ arylalkyl, each of which is optionally substituted with one or more $R^{6a}$; and each $R^{6a}$ is independently selected from the group consisting of halogen, —CN, —$NO_2$, —$NHR^{6b}$, —$N_3$, —OH, —SH, —$SO_3H$, $C_{1-8}$ alkyl, $C_{1-8}$ alkoxy, —$COOR^{6b}$, —$C(O)NHR^{6b}$, and —$C(O)R^{6c}$, wherein each $R^{6b}$ is independently selected from the group consisting of H and $C_{1-4}$ alkyl and each $R^{6c}$ is independently $C_{1-4}$ alkyl.

2. The method of claim 1, wherein -$L^1$- is -$CH_2$-, and $R^{1a}$ is phenyl which is optionally substituted with one or more $R^{1b}$.

3. The method of claim 1, wherein -$L^3$- is selected from the group consisting of —O— and —$OCH_2$—, and $R^{3a}$ is phenyl which is optionally substituted with one or more $R^{3b}$.

4. The method of claim 1, wherein subscript y is 1 or 2.

5. The method of claim 1, wherein $R^4$ is H.

6. The method of claim 1, wherein $R^6$ is selected from the group consisting of pyrrolidin-1-yl, furan-2-yl, phenyl, pyridin-4-yl, and benzhydryl, each of which is optionally substituted with one or more $R^{6a}$.

7. The method of claim 1, wherein subscript x is 0.

8. The method of claim 1, wherein subscript z is 1 and $R^4$ and $R^5$ are taken together to form piperazin-1,4-diyl.

9. The method of claim 1, wherein the Nav1.7 inhibitor is selected from the group consisting of:

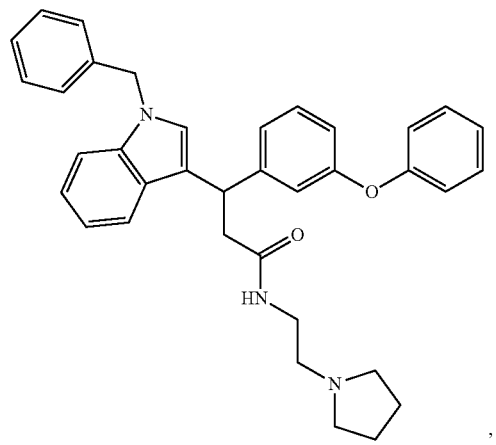

,

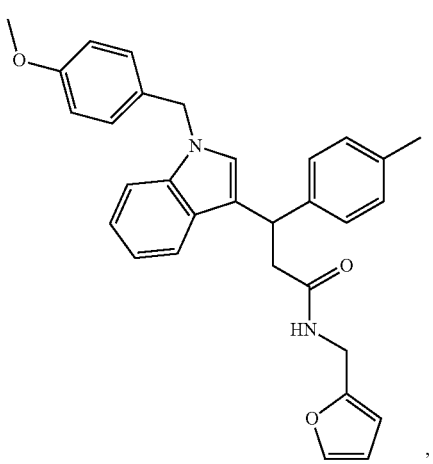

,

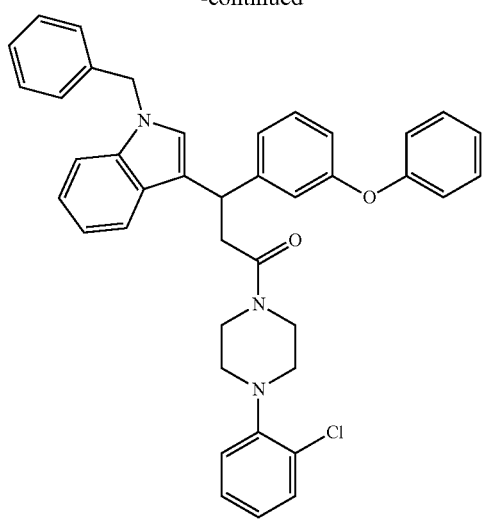
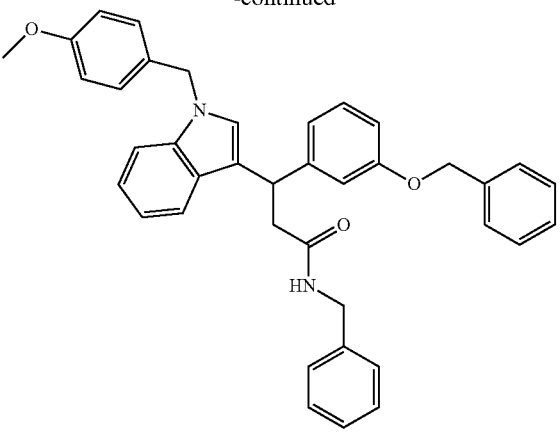
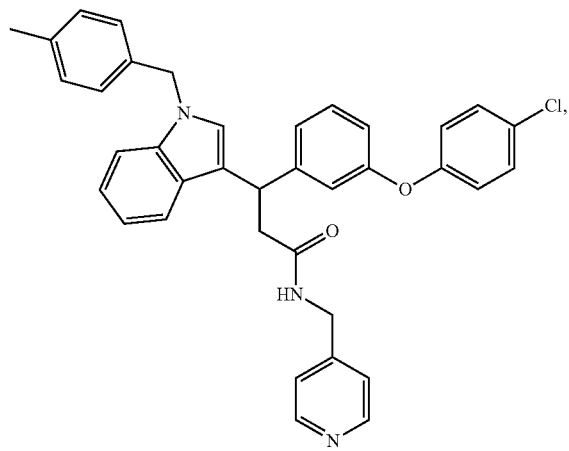
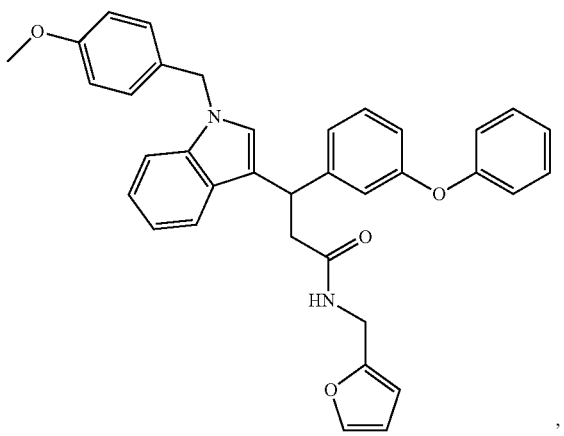
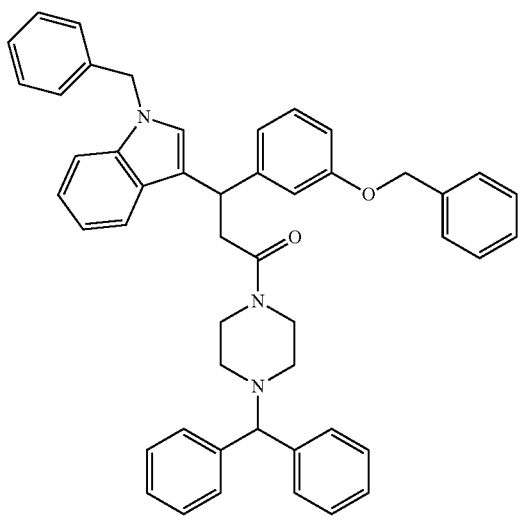
and pharmaceutically acceptable salts thereof.
10. The method of claim 1, wherein the Nav1.7 inhibitor is selected from the group consisting of:
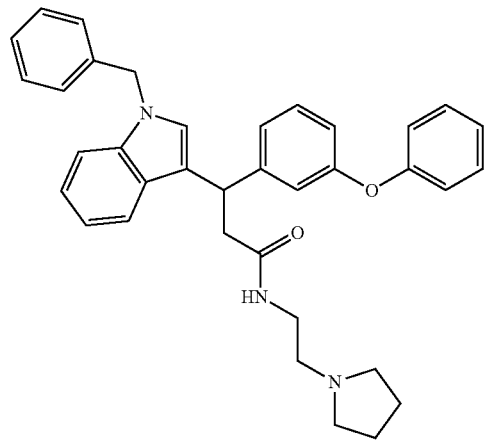

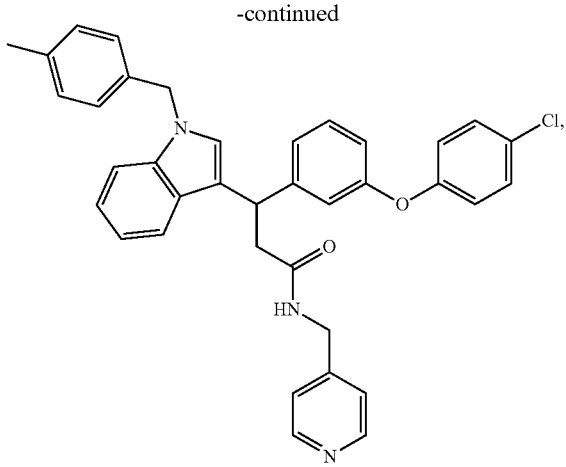

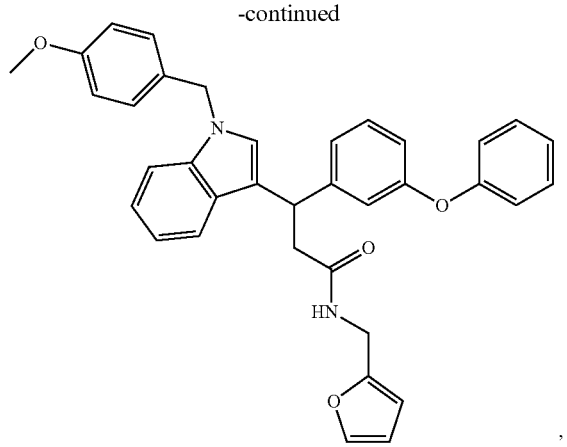

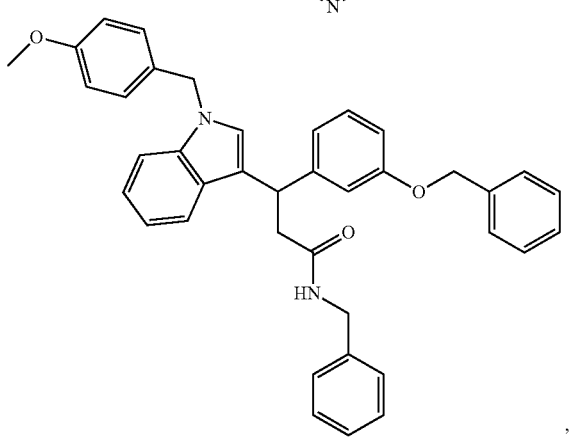

and pharmaceutically acceptable salts thereof.

11. The method of claim 1, wherein the condition is itch.

12. The method of claim 11, wherein the itch comprises histamine-induced acute itch, lymphoma-induced chronic itch, allergic itch, infection-induced itch, liver- or kidney-induced itch, diabetes-induced itch, skin disorder-induced itch, opioid-induced itch, itch associated with Nav1.7 gain-of function mutations, or a combination thereof.

13. The method of claim 1, wherein the condition is pain.

14. The method of claim 13, wherein the pain comprises neuropathic pain, inflammatory pain, cancer pain, or a combination thereof.

15. The method of claim 1, wherein the Nav1.7 inhibitor is administered intrathecally or intraperitoneally.

* * * * *